US012769168B2

(12) United States Patent
Harrold et al.

(10) Patent No.: US 12,769,168 B2
(45) **Date of Patent: *Oct. 20, 2026**

(54) TOUCH SCREEN FOR PRIVACY DISPLAY

(71) Applicant: RealD Spark, LLC, Boulder, CO (US)

(72) Inventors: Jonathan Harrold, Leamington Spa (GB); Graham J. Woodgate, Henley-on-Thames (GB)

(73) Assignee: RealD Spark, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/941,744

(22) Filed: Nov. 8, 2024

(65) Prior Publication Data

US 2025/0306423 A1 Oct. 2, 2025

Related U.S. Application Data

(63) Continuation of application No. 17/529,782, filed on Nov. 18, 2021, now Pat. No. 12,169,339, which is a (Continued)

(51) Int. Cl.

*G02F 1/1343* (2006.01)
*G02F 1/13* (2006.01)

(Continued)

(52) U.S. Cl.

CPC ........ *G02F 1/13439* (2013.01); *G02F 1/1323* (2013.01); *G02F 1/13338* (2013.01); *G02F 1/133536* (2013.01); *G02F 1/13363* (2013.01); *G06F 3/0412* (2013.01); *G06F 3/0416* (2013.01); *G06F 3/044* (2013.01);

(Continued)

(58) Field of Classification Search

CPC ............... G02F 1/1323; G02F 1/13338; G02F 1/133531; G02F 1/133536; G02F 1/13363; G02F 1/133634; G02F 1/13439; G02F 2413/01; G02F 2413/02; G02F 2413/05; G02F 2413/06; G02F 2413/08; G02F 1/1336; G02F 1/137; G02F 1/13471;

(Continued)

(56) References Cited

U.S. PATENT DOCUMENTS

2003/0222857 A1* 12/2003 Abileah .............. G02F 1/13338 345/173
2007/0008471 A1* 1/2007 Wang .................. G02F 1/13363 349/114

(Continued)

FOREIGN PATENT DOCUMENTS

JP H1184131 A 3/1999

*Primary Examiner* — Richard J Hong
(74) *Attorney, Agent, or Firm* — Foley & Lardner LLP

(57) ABSTRACT

A touch input display device includes a spatial light modulator (SLM), a display polariser, an additional polariser, a switchable liquid crystal retarder including a layer of liquid crystal material, switchable retarder control electrodes arranged to apply a voltage for controlling a state of the switchable liquid crystal retarder, at least one touch electrode array arranged in a layer on an output side of the switchable retarder control electrodes, and an output transparent support substrate where the at least one touch electrode array is arranged between the switchable retarder control electrodes and the output transparent support substrate.

20 Claims, 39 Drawing Sheets

Related U.S. Application Data continuation of application No. 17/018,420, filed on Sep. 11, 2020, now Pat. No. 11,187,945, which is a continuation of application No. 16/256,754, filed on Jan. 24, 2019, now Pat. No. 10,802,356.

(60) Provisional application No. 62/699,906, filed on Jul. 18, 2018, provisional application No. 62/691,896, filed on Jun. 29, 2018, provisional application No. 62/676,576, filed on May 25, 2018, provisional application No. 62/622,001, filed on Jan. 25, 2018.

(51) Int. Cl.

| | |
|---|---|
| ***G02F 1/1333*** | (2006.01) |
| ***G02F 1/1335*** | (2006.01) |
| ***G02F 1/13363*** | (2006.01) |
| ***G06F 3/041*** | (2006.01) |
| ***G06F 3/044*** | (2006.01) |

(52) U.S. Cl.

CPC .................. *G02F 1/133531* (2021.01); *G02F 1/133634* (2013.01); *G02F 2413/01* (2013.01); *G02F 2413/02* (2013.01); *G02F 2413/05* (2013.01); *G02F 2413/06* (2013.01); *G02F 2413/08* (2013.01); *G06F 2203/04107* (2013.01)

(58) Field of Classification Search

CPC ......... G06F 2203/04107; G06F 3/0412; G06F 3/0416; G06F 3/044; G06F 3/0446; H10K 59/40

See application file for complete search history.

(56) References Cited

U.S. PATENT DOCUMENTS

| | | | | |
|---|---|---|---|---|
| 2009/0040426 | A1* | 2/2009 | Mather | G02F 1/1336 349/65 |
| 2009/0174843 | A1* | 7/2009 | Sakai | G02F 1/13471 349/74 |
| 2012/0169400 | A1 | 7/2012 | Liu | |
| 2015/0355490 | A1* | 12/2015 | Kao | G02F 1/13338 349/12 |
| 2016/0216816 | A1* | 7/2016 | Yang | G06F 3/0446 |
| 2017/0168633 | A1* | 6/2017 | Kwak | G02F 1/13338 |
| 2018/0210243 | A1* | 7/2018 | Fang | G02F 1/137 |
| 2019/0123112 | A1* | 4/2019 | Lee | H10K 59/40 |
| 2019/0196236 | A1* | 6/2019 | Chen | G02F 1/1323 |

* cited by examiner

TOUCH SCREEN FOR PRIVACY DISPLAY

CROSS-REFERENCE TO RELATED APPLICATIONS

This application is a continuation of U.S. patent application Ser. No. 17/529,782, filed Nov. 18, 2021, now U.S. Pat. No. 12,169,339, which is a continuation of U.S. patent application Ser. No. 17/018,420, filed Sep. 11, 2020, now U.S. Pat. No. 11,187,945, which is a continuation of U.S. patent application Ser. No. 16/256,754, filed Jan. 24, 2019, now U.S. U.S. Pat. No. 10,802,356, which claims the benefit of and priority to U.S. Provisional Patent Application No. 62/699,906, filed Jul. 18, 2018, U.S. Provisional Patent Application No. 62/691,896, filed Jun. 29, 2018, U.S. Provisional Patent Application No. 62/673,576, filed May 18, 2018, and U.S. Provisional Patent Application No. 62/622,001, filed Jan. 25, 2018, each of which are incorporated herein by reference in their entirety and for all purposes.

TECHNICAL FIELD

This disclosure generally relates to touch input for display devices with control of angular illumination for use in privacy display and low stray light displays.

BACKGROUND

Privacy displays provide image visibility to a primary user (that is typically in an on-axis position) and reduced visibility of image content to a snooper, that is typically in an off-axis position. A privacy function may be provided by micro-louvre optical films that transmit a higher luminance from a display in an on-axis direction with lower luminance in off-axis positions, however such films are not electrically switchable, and thus the display is limited to privacy only function.

Switchable privacy displays may be provided by control of the off-axis optical output.

Control of off-axis privacy may be provided by means of contrast reduction, for example by adjusting the liquid crystal out-of-plane tilt in an In-Plane-Switching LCD.

Control may be further provided by means of off-axis luminance reduction. Luminance reduction may be achieved by means of switchable backlights for a liquid crystal display (LCD) spatial light modulator (SLM). Off-axis luminance reduction may also be provided by switchable liquid crystal retarders, polarisers and compensation retarders arranged to modulate the input and/or output directional luminance profile of a SLM.

Touch screens are arranged to receive input locations from observer fingers or a stylus and may comprise capacitive touch, resistive touch, electro-magnetic resonance and other known touch sensing technologies.

BRIEF SUMMARY

According to a first aspect of the present disclosure, there is provided a touch input display device comprising: a spatial light modulator (SLM) arranged to output light; a display polariser arranged on the output side of the SLM, wherein the display polariser is a linear polariser; an additional polariser arranged on the output side of the display polariser, wherein the additional polariser is a linear polariser; a switchable liquid crystal retarder comprising a layer of liquid crystal material arranged between the display polariser and the additional polariser, wherein the switchable liquid crystal retarder is a polar control retarder that is arranged, in a switchable state of the switchable liquid crystal retarder, simultaneously to introduce no net relative phase shift to orthogonal polarisation components of light passed by the display polariser along an axis along a normal to the plane of the switchable liquid crystal retarder and introducing a relative phase shift to orthogonal polarisation components of light passed by the display polariser along an axis inclined to a normal to the plane of the switchable liquid crystal retarder; switchable retarder control electrodes arranged to apply a voltage for controlling the state of the switchable liquid crystal retarder; and at least one touch electrode array arranged in a layer on the output side of the switchable retarder control electrodes. Advantageously touch sensing may be provided for a switchable directional display that may have a first mode that has high contrast and luminance for a wide range of viewing positions and with a second mode that has high contrast and luminance for a head-on user and low luminance for off-axis viewing positions. Such a display may provide a switchable privacy operation or may provide switchable stray light for example for use in night time operation.

The touch input display device may further comprise at least one passive retarder arranged between the switchable liquid crystal retarder and the additional polariser. The at least one passive retarder may be a polar control retarder that simultaneously introduces no net relative phase shift to orthogonal polarisation components of light passed by the display polariser along an axis along a normal to the plane of the switchable liquid crystal retarder and introducing a relative phase shift to orthogonal polarisation components of light passed by the display polariser along an axis inclined to a normal to the plane of the switchable liquid crystal retarder. Advantageously the polar angular range for which high image visibility is achieved in the first mode may be increased and the polar angular range for which high visual security levels are achieved in the second mode may be increased.

The touch electrode array in the case that the display device comprises one touch electrode array, or one of the touch electrode arrays in the case that in the case that the display device comprises more than one touch electrode array, may be formed on a surface of the passive retarder in the case that the display device comprises one passive retarder or on a surface of one of the passive retarders in the case that the display device comprises more than one passive retarder. The touch sensing structure may be formed in a single electrode conductor deposition process and add little or no thickness to the directional display and advantageously may have low cost.

The at least one touch electrode array may comprise a pair of touch electrode arrays arranged in layers separated by at least one dielectric layer. Advantageously the electrode routing topology may be simplified in comparison to the pair of touch electrodes arranged in a single layer, reducing complexity and improving accuracy performance the touch electrode arrays.

Each of the pair of touch electrode arrays may be formed on a respective surface of the passive retarder in the case that the display device comprises one passive retarder or a respective surface of one of the passive retarders in the case that the display device comprises more than one passive retarder. Advantageously low cost fabrication methods may be provided for forming the electrode arrays. The passive retarders may be flexible for curved, bendable and foldable displays. Little or no added thickness is provided and cost is minimised.

Said at least one dielectric layer may comprise the passive retarder in the case that the display device comprises one passive retarder or comprises at least one of the passive retarders in the case that the display device comprises more than one passive retarder. The number of layers is reduced, advantageously reducing thickness, complexity and cost.

The display device may comprise more than one passive retarder and said at least one dielectric layer may comprise at least two passive retarders. The passive retarder may be formed conveniently on A-plate retarders, advantageously reducing cost. Further the passive retarders may be provided by materials which are suitable for forming electrodes thereon.

Said at least one dielectric layer may comprise at least one additional layer that is not a retarder. Advantageously the dielectric layer may be adjusted to provide appropriate electrical properties independently of the selection of retarder materials and thicknesses.

The at least one passive retarder may comprise a passive uniaxial retarder having an optical axis perpendicular to the plane of the passive uniaxial retarder. The number of retarders may be reduced, advantageously reducing thickness.

The at least one passive retarder may comprise a pair of passive uniaxial retarders having optical axes in the plane of the passive uniaxial retarders that are crossed. Electrode arrays may be formed on one side of each of the retarders, reducing the complexity of electrode formation. Advantageously fabrication cost may be reduced.

The at least one touch electrode array may comprise a pair of touch electrode arrays formed on facing surfaces of respective ones of the pair of passive uniaxial retarders, and said at least one dielectric layer may comprise at least one additional layer arranged between the pair of passive uniaxial retarders. Said at least one dielectric layer may comprise an adhesive layer arranged between the pair of touch electrode arrays. Advantageously a low cost structure may be provided. The dielectric properties may be selected by selection of the additional layer material and thickness to achieve improved sensitivity of touch sensing.

The at least one touch electrode array may comprise a pair of touch electrode arrays formed on outer surfaces of respective ones of the pair of passive uniaxial retarders, and said at least one dielectric layer may comprise the pair of passive uniaxial retarders. The pair of retarders may be solvent bonded advantageously reducing surface reflections and thickness.

The touch input display device may further comprise input and output transparent support substrates, the layer of liquid crystal material being arranged between the input and output transparent support substrates, and the at least one touch electrode array being arranged on the output side of the output transparent support substrate. The touch input display device may further comprise input and output transparent support substrates, the layer of liquid crystal material being arranged between the input and output transparent support substrates, and the at least one touch electrode array being arranged between the switchable retarder control electrodes and the output transparent support substrate. The touch sensing structure may be shielded from the control of the SLM advantageously increasing sensitivity.

The at least one touch electrode arrays may be arranged between the switchable retarder control electrodes and the additional polariser. Advantageously the visibility of reflections from the touch electrode arrays may be reduced. Further the touch electrode arrays may be integrated with the retarder structure, advantageously reducing thickness and cost.

The at least one touch electrode array may be separated from the switchable retarder control electrodes. The switchable retarder control electrodes may be arranged on both sides of the layer of liquid crystal material. Advantageously the switchable retarder may be switched independently of the control of the touch electrode arrays.

The touch input display device may further comprise a control system, wherein the control system may be arranged to apply a drive voltage to the switchable retarder control electrodes for controlling the switchable liquid crystal retarder, and the control system may be arranged to address the at least one touch electrode array for capacitive touch sensing. Advantageously control of a switchable directional display and touch control can be achieved in the same device.

The drive voltage may have a waveform including periods where the drive voltage is constant, and the control system may be arranged to address the at least one touch electrode array during at least one of the periods where the drive voltage is constant. Advantageously the signal to noise ratio of the touch signal is greater and the sensitivity of the touch system is improved.

The drive voltage may have a waveform including periods where the drive voltage is constant but of respectively different levels, and the control system may be arranged to address the at least one touch electrode array during at least one of the periods where the drive voltage is constant and at the same level. The signal to noise ratio of the touch signal is increased, and advantageously the sensitivity of the touch system is improved.

The waveform of the drive voltage may include a positive addressing phase including at least one pulse of positive polarity and a negative addressing phase including at least one pulse of negative polarity, the peaks of the at least one pulse of positive polarity and the peaks of the at least one pulse of negative polarity being said periods where the drive voltage is constant. The average voltage across the switchable liquid crystal retarder is maintained at zero, i.e. no net DC voltage across the switchable liquid crystal retarder, and the number of sampling periods in which the touch signal is acquired is increased. Advantageously the lag and accuracy of the touch position determination is improved.

The waveform of the drive voltage may include a positive addressing phase including at least one pulse of positive polarity and at least one additional period and a negative addressing phase including at least one pulse of negative polarity and at least one additional period, the at least one additional period of the positive addressing phase and the at least one additional period of the negative addressing phase being said periods where the drive voltage is constant and has a level intermediate the maximum level of the at least one pulse of positive polarity and the minimum level of the at least one pulse of negative polarity. The number of sampling periods is increased and the common mode voltage range in the touch signal processing circuit is reduced. Advantageously the cost and performance of the touch signal processing circuit is improved.

The at least one additional period of the positive addressing phase and the at least one additional period of the negative addressing phase may have a level of zero volts. The number of sampling periods is increased and the common mode voltage range in the touch signal processing circuit is further reduced. Advantageously the cost and performance of the touch signal processing circuit is improved.

The at least one additional period of the positive addressing phase and the at least one additional period of the negative addressing phase may have a level of non-zero magnitude. The number of sampling periods is increased and the common mode voltage range in the touch signal processing circuit is reduced. Advantageously the touch signal position lag is reduced and the cost of the touch signal processing circuit is improved.

The drive voltage may have a waveform having a root mean square value that provides a constant liquid crystal optical alignment state of the liquid crystal retarder and having arithmetic average of zero. There is no average net DC voltage across the liquid crystal retarder. The liquid crystal material does not degrade electrochemically, and advantageously the operating lifetime of the liquid crystal material is improved.

The control system may be further arranged to address the SLM. The integration of the control systems advantageously saves cost and complexity.

The drive voltage that the control system is arranged to apply to the switchable retarder control electrodes may be synchronised with respect to the addressing of the SLM. The relative timing of the electric fields produced by the electrodes of the switchable liquid crystal retarder and SLM is fixed. Advantageously any appearance of screen artefacts including but not limited to a “slow scanning bar” is reduced.

The control system may be arranged to address the SLM using an addressing scheme including a vertical blanking interval, and the control system being arranged to address the at least one touch electrode array during the vertical blanking interval. During the vertical blanking interval reduced high frequency signal transitions on the drive electrode to the SLM are achieved. The electrical field radiation from those transitions is reduced and advantageously the touch sensitivity of the screen is improved.

The waveform of the drive voltage may comprise an addressing sequence comprising a first addressing positive voltage phase with a positive maximum voltage; and a second addressing negative voltage phase with a negative minimum voltage. The waveform of the drive voltage in the first phase may comprise more than one positive voltage level; and the waveform of the drive voltage in the second phase may comprise more than one negative voltage level; or the waveform of the drive voltage in the first phase may comprise at least one positive voltage level and a zero voltage level; and the waveform of the drive voltage in the second phase may comprise at least one negative voltage level and a zero voltage level. The touch input display device may further comprise a third addressing phase comprising an intermediate drive voltage level intermediate the positive maximum voltage and negative minimum voltage. The intermediate voltage level may be zero. The root mean square value of the waveform of the drive voltage may be arranged to provide a constant liquid crystal optical alignment state of the liquid crystal retarder; and wherein the arithmetic average of the waveform of the drive voltage may be zero. The signal applied to and measured from the touch electrode arrays may be provided when the drive voltage is at a constant level. The switchable liquid crystal retarder may be DC balanced so that lifetime of operation of the retarder is extended. Advantageously noise in the touch measurement system is reduced and improved accuracy may be achieved.

The signal applied to and measured from the touch electrode arrays may be provided when the drive voltage is at the same constant level. Advantageously the cost and complexity of the touch sensing apparatus may be improved.

The waveform applied to the switchable liquid crystal retarder may be synchronised with respect to the addressing of the SLM. The addressing of the SLM may comprise a vertical blanking interval and the signal applied to and measured from the touch electrode arrays is provided during the vertical blanking interval. Advantageously electrical noise from the SLM in the touch signal detector is minimised and accuracy and speed of touch measurement increased.

The touch input display device may further comprise a control system, wherein the control system may be arranged to apply a drive voltage to the switchable retarder control electrodes for controlling the switchable liquid crystal retarder, and the control system may be arranged to address the at least one touch electrode array for capacitive touch sensing. Advantageously interference between the touch electrode arrays and switchable retarder control electrodes may be reduced.

The drive voltage may have a waveform including periods where the drive voltage is constant, and the control system may be arranged to address the at least one touch electrode array during at least one of the periods where the drive voltage is constant. The drive voltage may have a waveform including periods where the drive voltage is constant but of respectively different levels, and the control system may be arranged to address the at least one touch electrode array during at least one of the periods where the drive voltage is constant and at the same level. The waveform of the drive voltage may include a positive addressing phase including at least one pulse of positive polarity and a negative addressing phase including at least one pulse of negative polarity, the peaks of the at least one pulse of positive polarity and the peaks of the at least one pulse of negative polarity being said periods where the drive voltage is constant.

The waveform of the drive voltage may include a positive addressing phase including at least one pulse of positive polarity and at least one additional period and a negative addressing phase including at least one pulse of negative polarity and at least one additional period, the at least one additional period of the positive addressing phase and the at least one additional period of the negative addressing phase being said periods where the drive voltage is constant and has a level intermediate the maximum level of the at least one pulse of positive polarity and the minimum level of the at least one pulse of negative polarity.

The at least one additional period of the positive addressing phase and the at least one additional period of the negative addressing phase may have a level of zero volts. The at least one additional period of the positive addressing phase and the at least one additional period of the negative addressing phase may have a level of non-zero magnitude. The drive voltage may have a waveform having a root mean square value that provides a constant liquid crystal optical alignment state of the liquid crystal retarder and having arithmetic average of zero. The control system may be further arranged to address the SLM. The drive voltage that the control system is arranged to apply to the switchable retarder control electrodes may be synchronised with respect to the addressing of the SLM. The control system may be arranged to address the SLM using an addressing scheme including a vertical blanking interval, and the control system being arranged to address the at least one touch electrode array during the vertical blanking interval.

The touch input display device may further comprise a reflective polariser arranged between the display polariser and the switchable liquid crystal retarder. Advantageously when used as a privacy display in ambient light, increased off-axis reflectivity may be provided to achieve reduced off-image contrast to a snooper. In public mode, reduced reflectivity is achieved so that a high contrast public mode may be provided for a wide field of view.

According to a second aspect of the present disclosure there is provided a touch input display device comprising: a SLM; a display polariser arranged on the output side of the SLM, wherein the display polariser is a linear polariser; an additional polariser arranged on the output side of the display polariser, wherein the additional polariser is a linear polariser; plural retarders arranged between the display polariser and the additional polariser; wherein the plural retarders comprise: a switchable liquid crystal retarder arranged between input and output transparent support substrates; and at least one passive polar control retarder arranged between the switchable liquid crystal retarder and the additional polariser; further comprising first and second touch input electrode arrays arranged between the output transparent support substrate and the additional polariser.

The first and second input electrode arrays may be provided on at least one surface of at least one passive polar control retarder. The at least one passive polar control retarder may comprise a pair of retarders arranged in series, each passive polar control retarder comprising a touch electrode array arranged on one surface; wherein the touch electrode arrays face each other and a dielectric material is arranged between the touch electrode arrays. The pair of retarders may comprise: a pair of passive uniaxial retarders each having its optical axis perpendicular to the plane of the retarder; or a pair of passive uniaxial retarders having optical axes in the plane of the retarders that are crossed. The dielectric material may comprise an adhesive material.

The touch input display device may further comprise a control system; wherein the control system may be arranged to control the drive voltage applied to the switchable liquid crystal retarder; and to control the signal applied to and measured from the touch electrode arrays. Advantageously a touch location measurement may be provided with low thickness, low cost, high accuracy and high speed.

According to a second aspect of the present disclosure, there is provided a method of controlling a touch input display device comprising: a SLM arranged to output light; a display polariser arranged on the output side of the SLM; an additional polariser arranged on the output side of the display polariser; a switchable liquid crystal retarder comprising a layer of liquid crystal material arranged between the display polariser and the additional polariser; at least one passive retarder arranged between the switchable liquid crystal retarder and the additional polariser; switchable retarder control electrodes arranged to apply a voltage for controlling the switchable liquid crystal retarder; and at least one touch electrode array arranged in a layer on the output side of the switchable retarder control electrodes, wherein the method comprises: applying a drive voltage to the switchable retarder control electrodes for controlling the switchable liquid crystal retarder, wherein the drive voltage has a waveform including periods where the drive voltage is constant; and addressing the at least one touch electrode array for capacitive touch sensing during at least one of the periods where the drive voltage is constant. Advantageously a switchable directional display may be provided with touch sensing that has high sensitivity, high accuracy and low lag. Low thickness and cost may be achieved.

Embodiments of the present disclosure may be used in a variety of optical systems. The embodiment may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
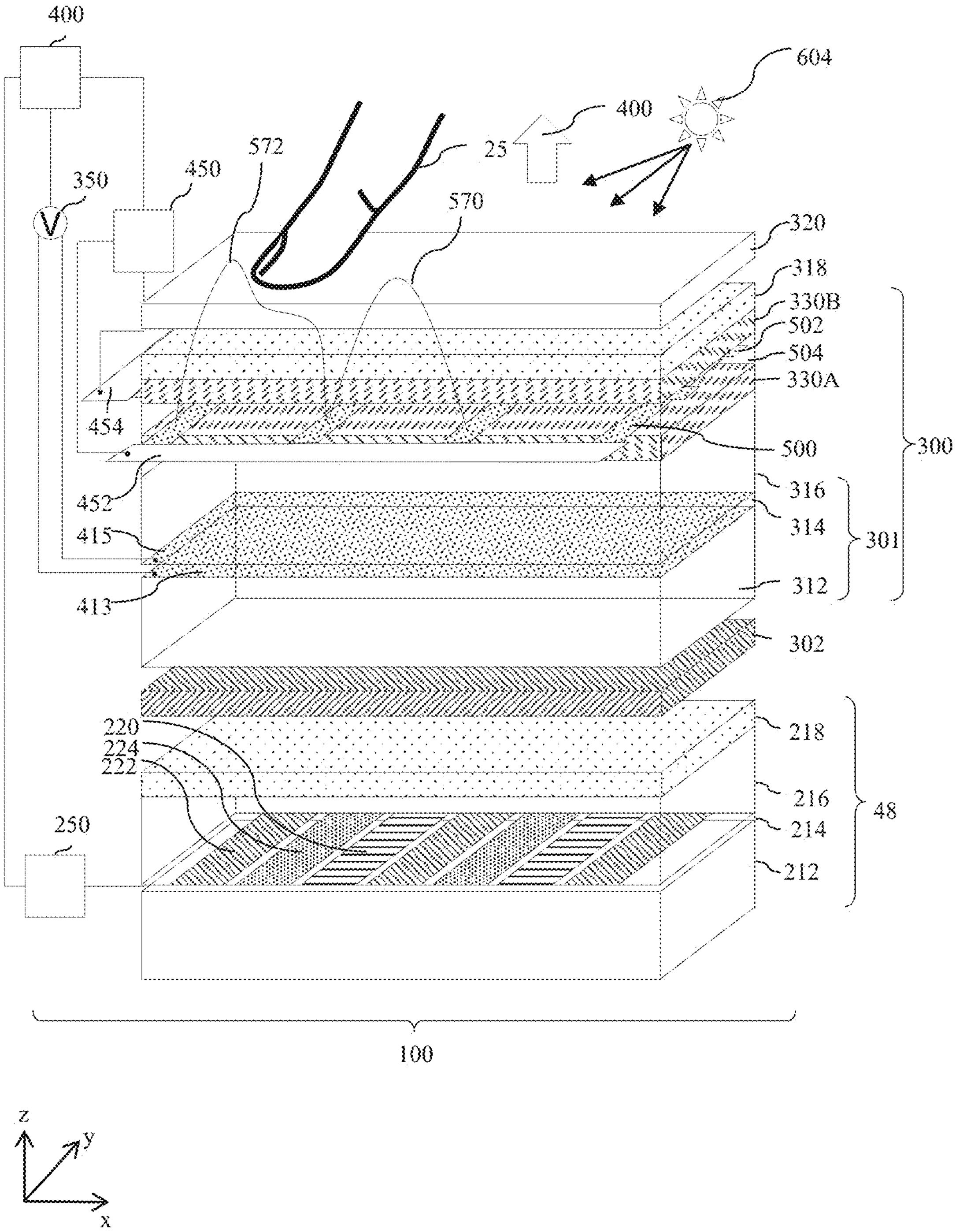
FIG. 1A is a diagram illustrating in perspective side view a touch input display device comprising a SLM, reflective polariser and switchable liquid crystal retarder wherein touch electrode arrays are provided on facing surfaces of first and second passive polar control retarders.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a relative phase shift between two orthogonal polarization components of the light wave incident thereon and is characterized by the amount of relative phase, Γ, that it imparts on the two polarization components. In some contexts, the term "phase shift" is used without the word "relative" but still meaning relative phase shift. The relative phase shift is related to the birefringence Δn and the thickness d of the retarder by:

$$\Gamma = 2\cdot\pi\cdot\Delta n\cdot d/\lambda_0 \quad \text{eqn. 1}$$

In eqn. 1, Δn is defined as the difference between the extraordinary and the ordinary index of refraction, i.e.

$$\Delta n = n_e - n_o \quad \text{eqn. 2}$$

For a half-wave retarder, the relationship between d, Δn, and $\lambda_0$ is chosen so that the phase shift between polarization components is $\Gamma=\pi$. For a quarter-wave retarder, the relationship between d, Δn, and $\lambda_0$ is chosen so that the phase shift between polarization components is $\Gamma=\pi/2$.

The term half-wave retarder herein typically refers to light propagating normal to the retarder and normal to the spatial light modulator (SLM).

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective linear polarisers are multilayer polymeric film stacks such as DBEF™ or APF™ from 3M Corporation, or wire grid polarisers such as ProFlux™ from Moxtek.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive Δn.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive Δn. A 'negative C-plate' refers to a negatively birefringent C-plate, i.e. a C-plate with a negative Δn.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive Δn.

Achromatic retarders may be provided wherein the material of the retarder is provided with a retardance Δn·d that varies with wavelength λ as $$\Delta n \cdot d/\lambda = \kappa \quad \text{eqn. 3}$$

where κ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by Δn·d where Δn is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in SLMs typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in equation 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pretilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive SLMs may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$VSL = (Y + R)/(Y - K) \quad \text{eqn. 4}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C = Y/K \quad \text{eqn. 5}$$

For high contrast optical LCD modes, the white state transmission remains substantially constant with viewing angle. In the contrast reducing liquid crystal modes of the present embodiments, white state transmission typically reduces as black state transmission increases such that $$Y + K \sim P \cdot L \quad \text{eqn. 6}$$

The visual security level may then be further given as:

$$VSL = \frac{\left(C + I \cdot \rho/\pi \cdot (C+1)/(P \cdot L)\right)}{(C-1)} \quad \text{eqn. 7}$$

where off-axis relative luminance, P is typically defined as the percentage of head-on luminance, L at the snooper angle and the display may have image contrast ratio C and the surface reflectivity is ρ.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$VSL = 1 + I \cdot \rho/(\pi \cdot P \cdot L) \quad \text{eqn. 8}$$

In comparison to privacy displays, desirably wide angle displays are easily observed in standard ambient illuminance conditions. One measure of image visibility is given by the contrast sensitivity such as the Michelson contrast which is given by:

$$M = (I_{mix} - I_{min})\ (I_{mix} + I_{min}) \quad \text{eqn. 9}$$

and so:

$$M = ((Y+R)-(K+R))/((Y+R)+(K+R)) = (Y-K)/(Y+K+2.R) \quad \text{eqn. 10}$$

Thus the visual security level (VSL), is equivalent (but not identical to) 1/M. In the present discussion, for a given off-axis relative luminance, P the wide angle image visibility, W is approximated as $$W = 1/VSL = 1\left(1 + I \cdot \rho/(\pi \cdot P \cdot L)\right) \quad \text{eqn. 11}$$

It would be desirable to provide touch panel functionality for a switchable directional display apparatus comprising a switchable liquid crystal retarder arranged between a display output polariser and an additional polariser for use in displays such as privacy displays and low stray light displays such as displays for night time use.

Figure 1B:
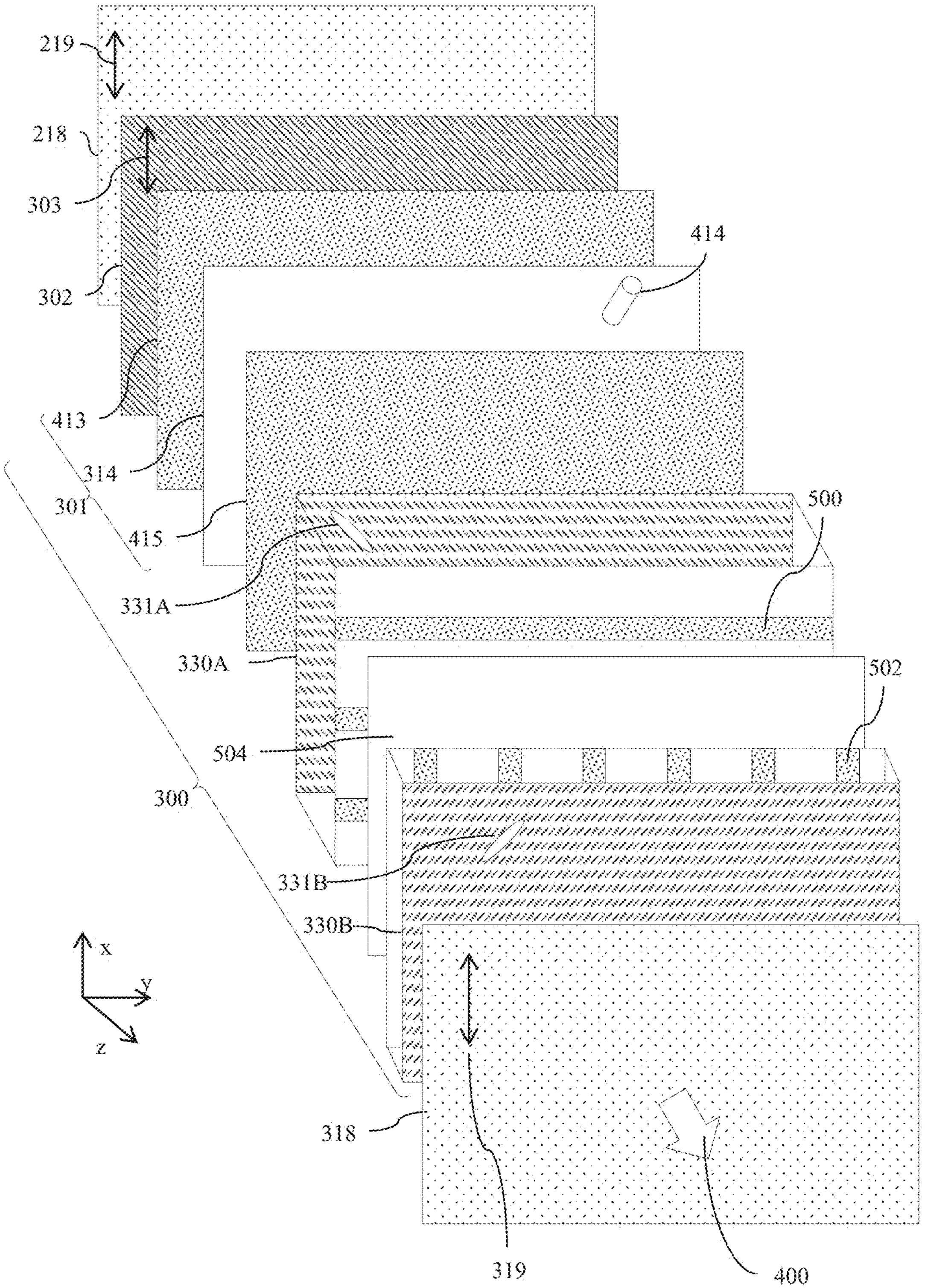
FIG. 1B is a diagram illustrating in front view alignment of optical layers and electrode layers in the optical stack of FIG. 1A.

FIG. 1A is a schematic diagram illustrating in perspective side view a touch input display device 100 comprising a spatial light modulator (SLM) 48, reflective polariser 302 and switchable liquid crystal retarder 301 wherein touch electrode arrays 500, 502 are provided on facing surfaces of first and second passive polar control retarders 330A, 330B; and FIG. 1B is a schematic diagram illustrating in front view alignment of optical layers and electrode layers in the optical stack of FIG. 1A.

In the present disclosure finger 25 location is detected by means of the touch electrode arrays 500, 502 and control system 400, 450, 250, 350 as will be described further hereinbelow.

A touch input display device 100 comprises: a SLM 48 arranged to output light 400; a display polariser 218 arranged on the output side of the SLM 48; an additional polariser 318 arranged on the output side of the display polariser 218; a switchable liquid crystal retarder 301 comprising a layer 314 of liquid crystal material 414 arranged between the display polariser 218 and the additional polariser 318; passive polar control retarders 330A, 330B arranged between the switchable liquid crystal retarder 301 and the additional polariser 318; switchable retarder control electrodes 413, 415 arranged to apply a voltage, V for controlling the switchable liquid crystal retarder 301; and touch electrode arrays 500, 502 arranged in a layer on the output side of switchable retarder control electrodes 413, 415.

The display polariser 218, reflective polariser 302 and additional polariser 318 are linear polarisers with electric vector transmission directions 219, 303, 319 respectively.

The switchable liquid crystal retarder 301 comprises transparent support substrates 312, 316. Electrodes 413, 415 and alignment layers (not shown) are arranged on the facing surfaces of support substrates 312, 316 respectively in order to provide alignment and electrical control to the layer 314 of liquid crystal material 414. The switchable retarder control electrodes 413, 415 are arranged on both sides of the layer 314 of liquid crystal material 414.

Each of the pair of touch electrode arrays 500, 502 are formed on a respective surface of one of the passive polar control retarders 330A, 330B in the case of FIGS. 1A-B that the display device comprises more than one passive retarder. The touch electrode array 500, is formed on a surface of the passive polar control retarder 330A and the touch electrode array 502 is formed on a surface of the passive polar control retarder 330B.

The touch electrode arrays comprise a pair of touch electrode arrays 500, 502 formed on facing surfaces of respective ones of the pair of passive polar control retarders that are uniaxial retarders 330A,330B and said at least one dielectric layer 504 comprises at least one additional layer arranged between the pair of passive uniaxial retarders. The pair of touch electrode arrays 500, 502 are arranged in layers separated by dielectric layer 504. The dielectric layer 504 is arranged between the switchable liquid crystal layer 314 and the additional polariser 318. The first and second touch electrode arrays 500, 502 are arranged on the dielectric layer 504 and on opposite sides of the dielectric layer 504.

The touch electrode arrays 500, 502 are arranged between the switchable retarder control electrodes 413, 415 and the additional polariser 318 and are separated from the switchable retarder control electrodes 413, 415.

The touch input display device 100 further comprises a control system 400, wherein the control system 400 is arranged to apply a drive voltage V to the switchable retarder control electrodes 413, 415 for controlling the switchable liquid crystal retarder 301 by means of driver 350. The control system 400 is further arranged to address the touch electrode arrays 500, 502 for capacitive touch sensing.

Optional reflective polariser 302 is arranged between the display polariser 218 and the polar control retarder 300. Polar control retarder 300 is arranged between the reflective polariser 302 (or output polariser 218 if reflective polariser 302 is omitted) and the additional polariser 318. The electric vector transmission direction 303 of the reflective polariser 302 is parallel to the electric vector transmission direction 219 of the display polariser 218 and electric vector transmission direction 319 of the additional polariser 318.

In the embodiment of FIGS. 1A-B, the polar control retarder 300 comprises passive polar control retarder 330 and switchable liquid crystal retarder 301, but in general may be replaced by other configurations of at least one retarder, some examples of which are present in the devices described below.

The present embodiments provide a switchable privacy display that is switchable between a privacy mode with a wide polar region in which high visual security level is achieved and a public mode of operation with a wide polar region in which high image visibility is achieved. The operation of said privacy display is provided by polar control retarder 300 as will now be described.

The at least one polar control retarder 300 comprises the switchable liquid crystal retarder 301 that is arranged in a switchable state of the switchable liquid crystal retarder 301, simultaneously to introduce no net relative phase shift to orthogonal polarisation components of light passed by the reflective polariser 302 along an axis along a normal to the plane of the at least one polar control retarder 300 and to introduce a net relative phase shift to orthogonal polarisation components of light passed by the reflective polariser 302 along an axis inclined to a normal to the plane of the at least one polar control retarder 300.

Polar control retarder 300 further comprises at least one passive polar control retarder 330 that in FIGS. 1A-B comprises a pair of passive uniaxial retarders 330A. 330B having optical axes in the plane of the passive uniaxial retarders that are crossed. The passive polar control retarders 330A. 330B provide a polar control retarder 300 that simultaneously introduces no net relative phase shift to orthogonal polarisation components of light passed by the display polariser 218 and reflective polariser 302 along an axis along a normal to the plane of the switchable liquid crystal retarder 301 and introduce a relative phase shift to orthogonal polarisation components of light passed by the display polariser along an axis inclined to a normal to the plane of the switchable liquid crystal retarder.

The polar control retarder 300 does not affect the luminance of light passing through the reflective polariser 302, the polar control retarder 300 and the additional polariser 318 along an axis along a normal to the plane of the polar control retarder 300 but the polar control retarder 300 does reduce the luminance of light passing therethrough along an axis inclined to a normal to the plane of the polar control retarder 300, at least in one of the switchable states of the switchable retarder 301. The principles leading to this effect are described in greater detail below with reference to FIGS. 33A-35E and arises from the presence or absence of a phase shift introduced by the polar control retarder 300 to light along axes that are angled differently with respect to the liquid crystal material of the polar control retarder 300. A similar effect is achieved in all the devices described below.

The control system 400 is further arranged to address the SLM 48. The control system comprises a system controller 400 that is arranged to (i) provide image data to the SLM 48 by means of SLM controller 250 (ii) provide control of the voltage driver 350 to control the drive voltage applied to the switchable liquid crystal retarder and (iii) and to control the signal applied to and measured from the touch electrode arrays 500, 502 by means of touch controller 450 and touch drivers 452, 454.

The operation of the polar control retarder 300 will now be further described.

Figure 2A:
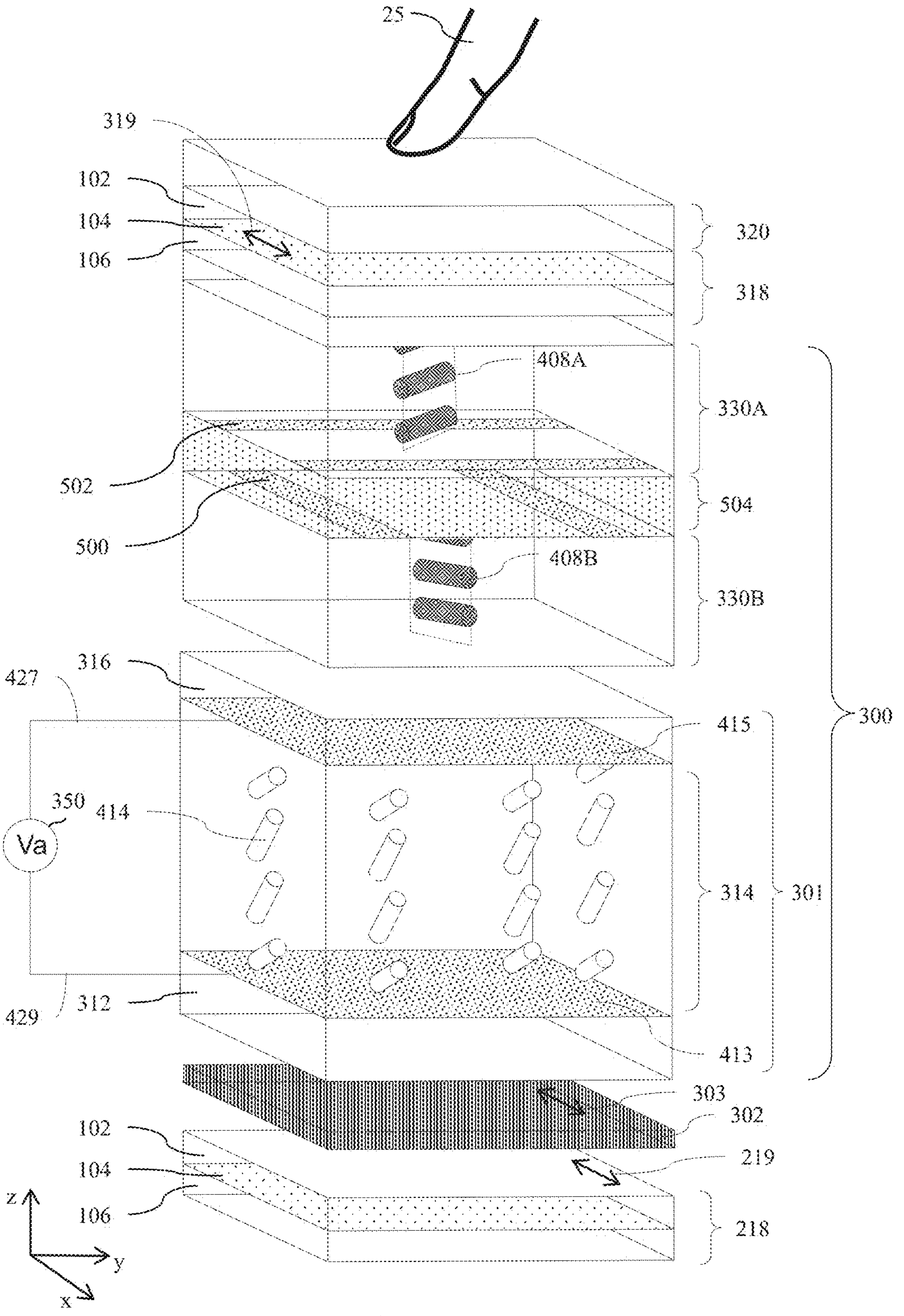
FIG. 2A and FIG. 2B are diagrams illustrating in a different perspective side view the touch input display device of FIG. 1A in privacy and public modes respectively.
Figure 2B:
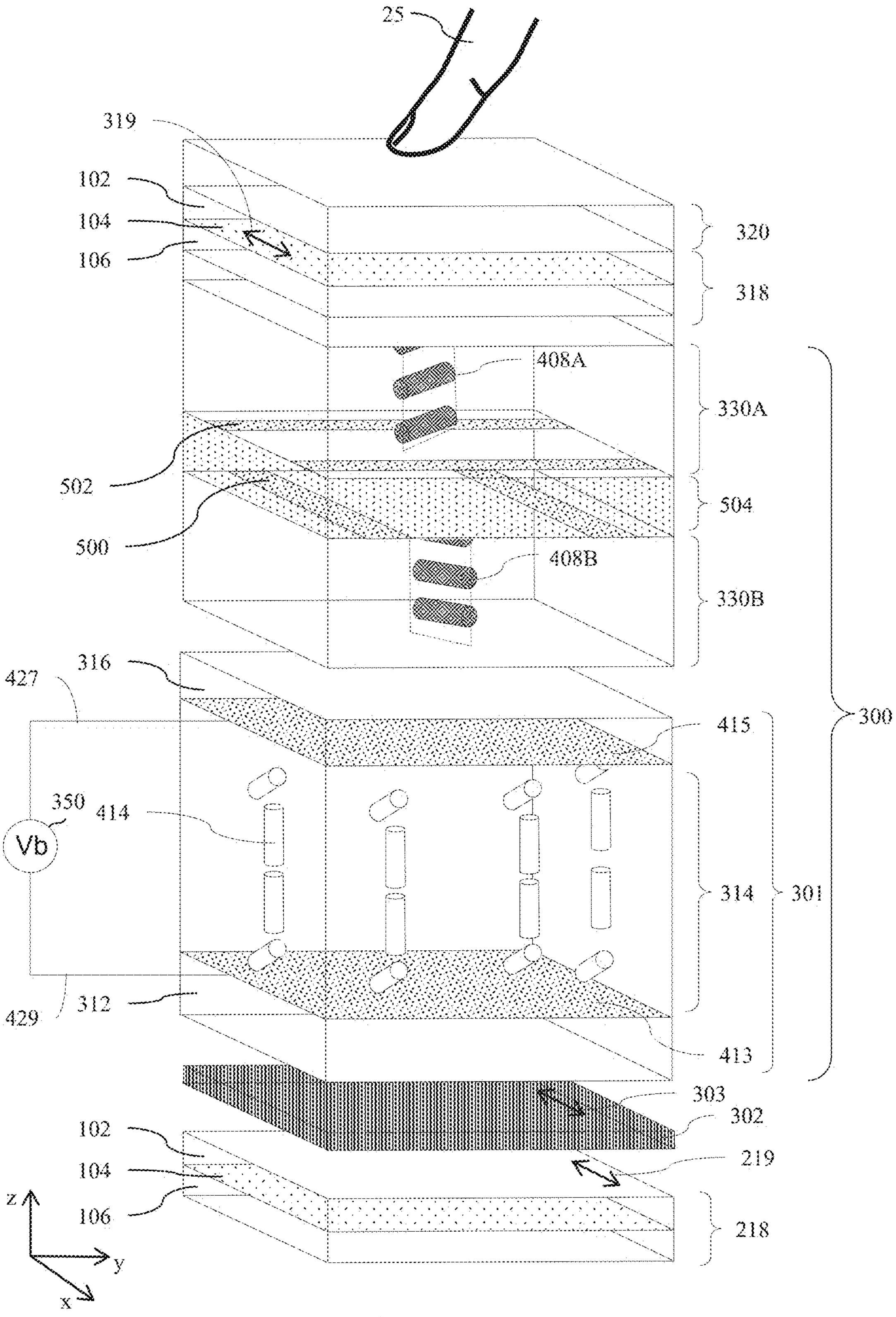

FIGS. 2A-B are schematic diagrams illustrating in a different perspective side view the touch input display device of FIG. 1A for operation in a privacy and public modes of operation respectively. Features of the embodiment of FIGS. 2A-B not discussed in further detail may be assumed to correspond to the features with equivalent reference numerals as discussed above, including any potential variations in the features.

The touch electrode arrays are arranged on the facing surfaces of the pair of passive uniaxial retarders 330A, 330B. The dielectric layer 504 comprises an adhesive layer provided between the touch electrode arrays arranged on the facing surfaces of the pair of passive uniaxial retarders. The dielectric layer 504 may comprise for example an optically clear adhesive (OCA) or pressure sensitive adhesive (PSA), or may be provided by another dielectric material.

Touching finger 25 may be near or in contact with substrate 320 that may be a glass cover with oleophobic hard coating to achieve mechanical robustness and resistance to finger grease. Touch control may also be provided by a pen or stylus.

In operation the layer 314 of liquid crystal material 414 is driven by voltage driver 350 with a first voltage waveform Va to provide a first liquid crystal alignment for privacy operation in FIG. 2A and is driven by voltage driver 350 with a second voltage waveform Vb to provide a second liquid crystal alignment for wide angle operation in FIG. 2B.

The at least one passive polar control retarder 330 comprises a pair of retarders 330A, 330B arranged in series, each passive polar control retarder 330A, 330B comprising touch electrode array 500 or touch electrode array 502 arranged on one surface; wherein the touch electrode arrays 500, 502 face each other and a dielectric material 504 is arranged between the touch electrode arrays 500, 502.

Touch electrode arrays 500, 502 may comprise transparent conductors for example ITO, silver nanowires or conductive polymers. They may be formed by know techniques including physical vapour deposition, sputtering, evaporation, ink-jet printing or contact printing. They may be patterned by the use of masks or photo resists and etching. When the electrodes are formed on the flexible retarder substrates, for example PC or COC/COP, then the type and temperature of the electrode deposition process may be controlled to avoid melting or the substrate. Inherently low temperature processes such as ink-jet and contact printing can produce electrode layers without exceeding the glass transition temperature of the substrates.

The topology of routing of the touch electrode arrays 500, 502 formed on separate substrates may have more options and be simpler than the routing topology if the electrodes are provided on a single surface of a retarder. When formed as a single layer the two electrodes arrays cannot have crossing electrode traces (without extra processing steps to add intermediate insulating bridges or an intermediate dielectric layer). For example intermediate dielectric layers may be provided between layers of the electrode layers 500, 502 if the electrode arrays 500, 502 are formed on a single surface. The fabrication of such arrays requires alignment during the electrode array formation process increasing cost. Advantageously the cost of electrode array 500, 502 formation may be reduced when the electrode arrays 500, 502 are formed on different substrates that are the retarders 300A, 300B.

The visual appearance of an illustrative embodiment similar to that shown in FIGS. 2A-B will now be described.

Figure 3A:
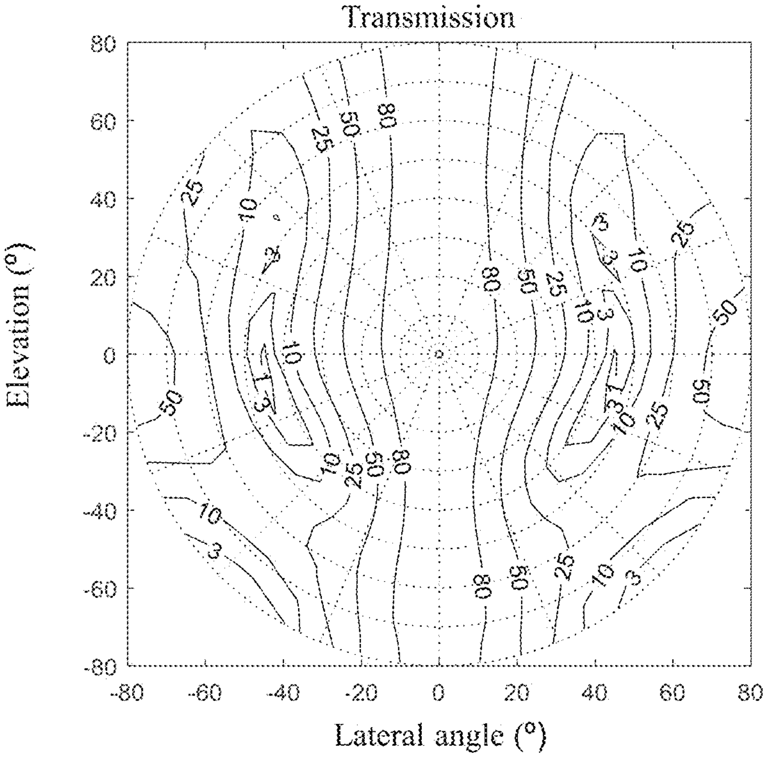
FIG. 3A is a graph illustrating the variation of output luminance with polar direction for transmitted light rays in FIG. 1A in a privacy mode.
Figure 3B:
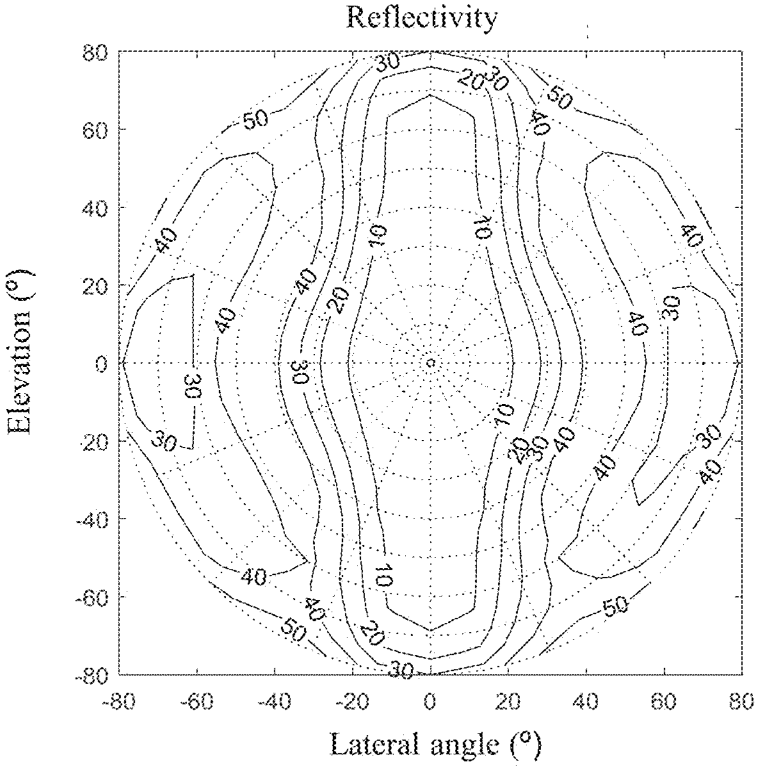
FIG. 3B is a graph illustrating the variation in reflectivity with polar direction for reflected light rays in FIG. 1A in a privacy mode.
Figure 3C:
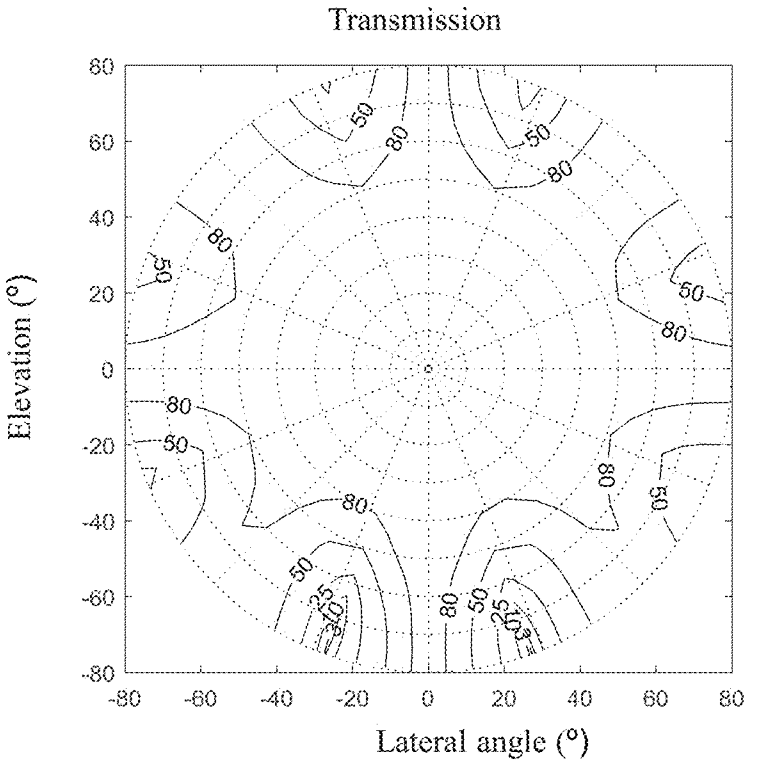
FIG. 3C is a graph illustrating the variation of output luminance with polar direction for transmitted light rays in FIG. 1A in a public mode.
Figure 3D:
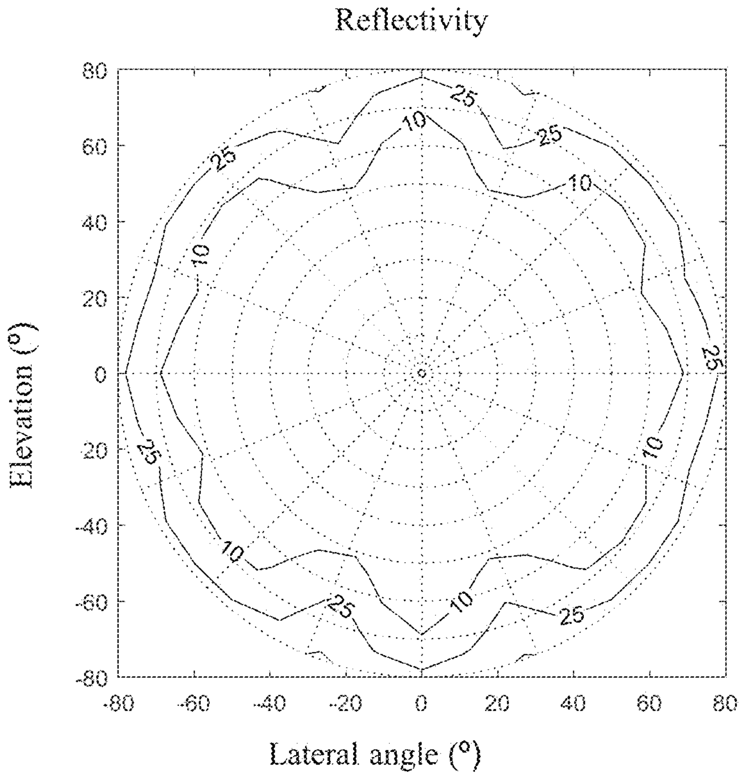
FIG. 3D is a graph illustrating the variation in reflectivity with polar direction for reflected light rays in FIG. 1A in a public mode.

FIG. 3A is a schematic graph illustrating the variation of output luminance with polar direction for transmitted light rays in FIG. 1A and FIG. 2A in a privacy mode of operation; FIG. 3B is a schematic graph illustrating the variation in reflectivity with polar direction for reflected light rays in FIG. 1A and FIG. 2A in a privacy mode of operation; FIG. 3C is a schematic graph illustrating the variation of output luminance with polar direction for transmitted light rays in FIG. 1A and FIG. 2B in a public mode of operation; and FIG. 3D is a schematic graph illustrating the variation in reflectivity with polar direction for reflected light rays in FIG. 1A and FIG. 2B in a public mode of operation comprising the embodiments illustrated in TABLE 1.

TABLE 1

| | Passive polar control retarder 330A & 330B | | Active LC polar control retarder 301 | | | | |
|---|---|---|---|---|---|---|---|
| Mode | Type | Δn · d/ nm | Alignment layers | Pretilt/ deg | Δn · d/ nm | Δε | Voltage/ V |
| Public | Crossed A | +500 @ 45° | Homogeneous | 2 | 750 | 13.2 | 10 |
| Privacy | | +500 @ 135° | Homogeneous | 2 | | | 2.3 |

In the present embodiment, the switchable liquid crystal retarder 301 comprises two surface alignment layers (not shown) disposed adjacent to the layer 314 of liquid crystal material 414 and on opposite sides thereof. Each alignment layer is arranged to provide homogeneous alignment in the adjacent liquid crystal material 414. The layer 314 of liquid crystal material 414 of the switchable liquid crystal retarder 301 comprises a liquid crystal material 414 with a positive dielectric anisotropy. The layer of liquid crystal material 414 has a retardance for light of a wavelength of 550 nm in a range from 500 nm to 900 nm, preferably in a range from 600 nm to 850 nm and most preferably in a range from 700 nm to 800 nm. The at least one retarder 330 further comprises a pair of passive retarders 308A, 308B which have optical axes in the plane of the retarders that are crossed, each passive retarder of the pair of passive retarders having a retardance for light of a wavelength of 550 nm in a range from 300 nm to 800 nm, preferably in a range from 350 nm to 650 nm and most preferably in a range from 450 nm to 550 nm.

In the present embodiments, 'crossed' refers to an angle of substantially 90° between the optical axes of the two retarders in the plane of the retarders. The passive retarders may be provided using stretched films to advantageously achieve low cost and high uniformity. To reduce cost of retarder materials, it is desirable to provide materials with some variation of retarder orientation due to stretching errors during film manufacture for example.

Thus, in a public mode of operation as illustrated in FIGS. 3C and 3D, substantially a high luminance output and low reflectivity is provided over a wide viewing freedom. In comparison, as illustrated in FIGS. 3A and 3B the luminance is increased and reflectivity is reduced for observers located in off-axis viewing positions.

Switchable directional display apparatuses for use in privacy display for example and comprising plural retarders arranged between a display polariser and an additional polariser are described further in U.S. Pat. No. 10,126,575 and in U.S. patent application Ser. No. 16/131,419 titled "Optical stack for switchable directional display", filed Sep. 14, 2018, both of which are herein incorporated by reference in their entireties. Directional display apparatuses further comprising reflective polarisers arranged between the display polariser and retarders are described in U.S. Patent Publ. No. 2018-0329245, which is herein incorporated by reference in its entirety. Directional display polarisers comprising passive retarders arranged between a display polariser and an additional polariser are described in U.S. Patent Publ. No. 2018-0321553, which is herein incorporated by reference in its entirety.

Advantageously a switchable privacy display may be provided with a large polar region in which high visual security level is provided in a privacy mode of operation and a large polar region in which high image visibility is provided in a public mode of operation. Touch electrode arrays are provided at low cost and with minimal additional thickness. High image contrast may be provided in privacy mode for the head on display user and for multiple display users in public mode.

The operation of the privacy mode of the display of FIG. 1A and FIGS. 2A-B will now be described further.

Figure 4A:
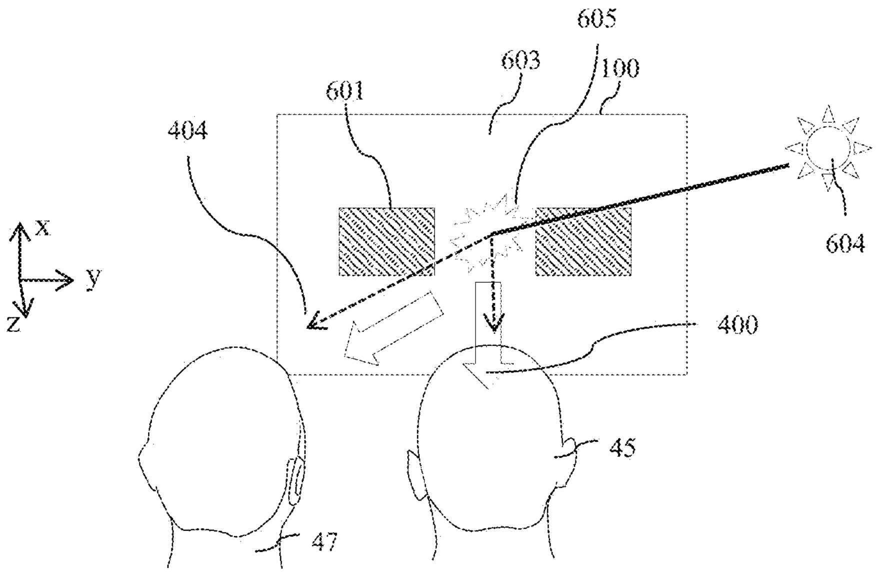
FIG. 4A is a diagram illustrating in front perspective view observation of reflected ambient light from interface surfaces of a display of FIG. 1A in public mode.

FIG. 4A is a schematic diagram illustrating in front perspective view, observation of reflected ambient light from interface surfaces of a display operating in public mode. Some light rays 404 may be reflected by the front surface of the additional polariser 318, or cover glass and other surfaces of the display. Typically, such reflectivity may be 4% for a bonded optical stack at normal incidence and approximately 5% for a bonded optical stack for 45 degrees incidence, due to Fresnel reflections at the air-polariser or air-glass interface. Thus a low luminance reflected image 605 of source 604 may be observed by the snooper on the front of the display 100. Further dark image data 601 and bright image data 603 is seen with high luminance by observer 47, such that image data can be clearly observed. Display output light 400 provides light to both observers 45, 47 so both can see image data and advantageously public mode is provided.

Figure 4B:
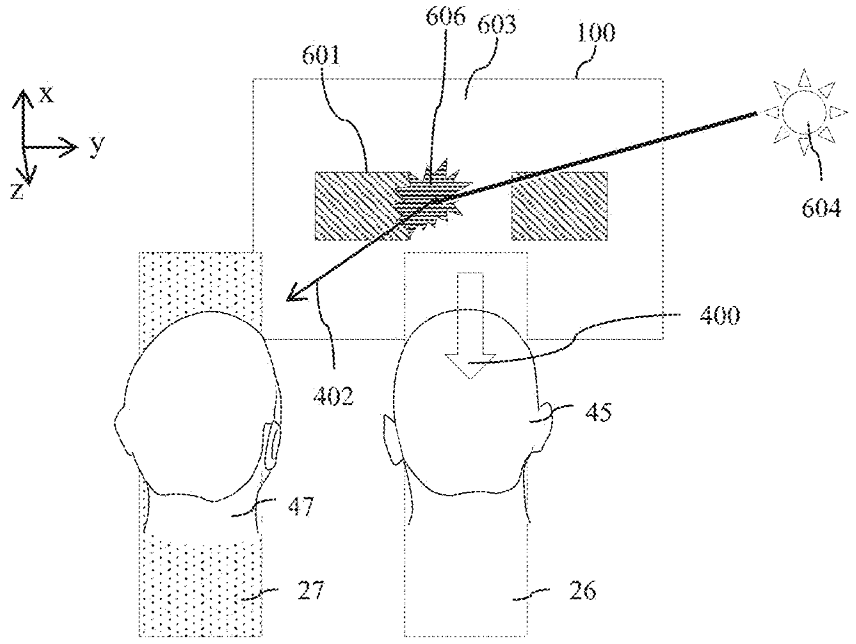
FIG. 4B is a diagram illustrating in front perspective view observation of reflected ambient light for the display of FIG. 1A in privacy mode.

FIG. 4B is a schematic diagram illustrating in front perspective view observation of reflected ambient light for the display of FIG. 1A operating in privacy mode. By way of comparison with FIG. 4A, substantially higher reflected luminance is observable from reflection 606 of source 604 as polarised light off-axis is reflected from reflective polariser 302.

Further image luminance in region 27 occupied by snooper 47 is substantially reduced compared to light to observer 45 in region 26. Image visibility is thus compromised for snooper 47 and a private image is advantageously provided.

The shape and distribution of the reflected image 606 is determined by the spatial distribution of ambient light source 604 but may be further determined by diffusion layers, particularly at the output surface of the additional polariser 318.

It may further be desirable to provide controllable display illumination in an automotive vehicle.

Figure 4C:
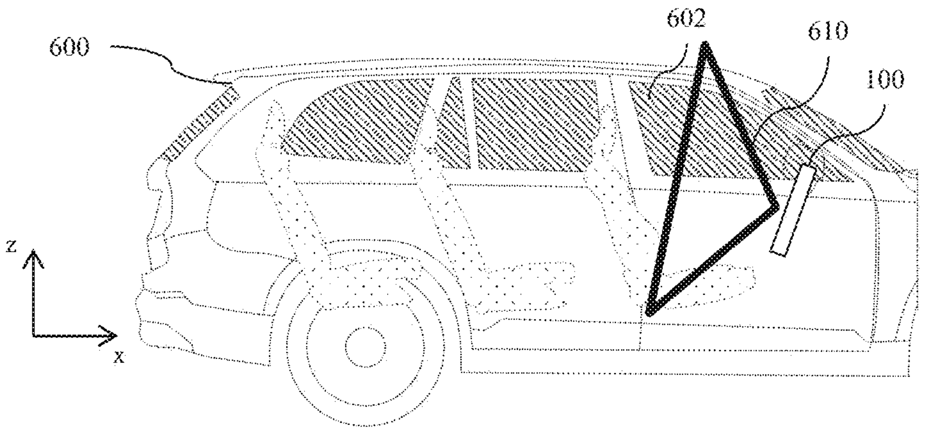
FIG. 4C is a diagram illustrating in side view an automotive vehicle with a switchable directional display arranged within the vehicle cabin for both entertainment and sharing modes.

FIG. 4C is a schematic diagram illustrating in side view an automotive vehicle with a switchable directional display 100 arranged within the vehicle cabin 602 of an automotive vehicle 600 for both entertainment and sharing modes of operation. Light cone 610 (for example representing the cone of light within which the luminance is greater than 50% of the peak luminance) may be provided by the luminance distribution of the display 100 in the elevation direction and is not switchable. Further display reflectivity may be increased compared to head-on reflectivity outside this light cone 610.

Figure 4D:
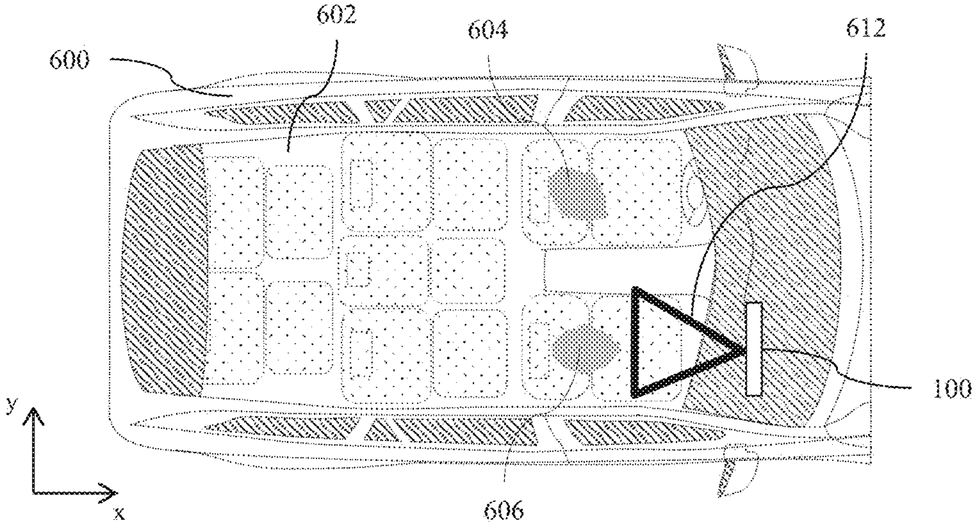
FIG. 4D is a diagram illustrating in top view an automotive vehicle with a switchable directional display arranged within the vehicle cabin in an entertainment mode.

FIG. 4D is a schematic diagram illustrating in top view an automotive vehicle with a switchable directional display 100 arranged within the vehicle cabin 602 in an entertainment mode of operation and operates in a similar manner to a privacy display. Light cone 612 is provided with a narrow angular range such that passenger 606 may see the display 100 whereas driver 604 may not see an image on the display 100 as a consequence of reduced luminance and increased reflectivity. Advantageously entertainment images may be displayed to the passenger 606 without distraction to the driver 604.

Figure 4E:
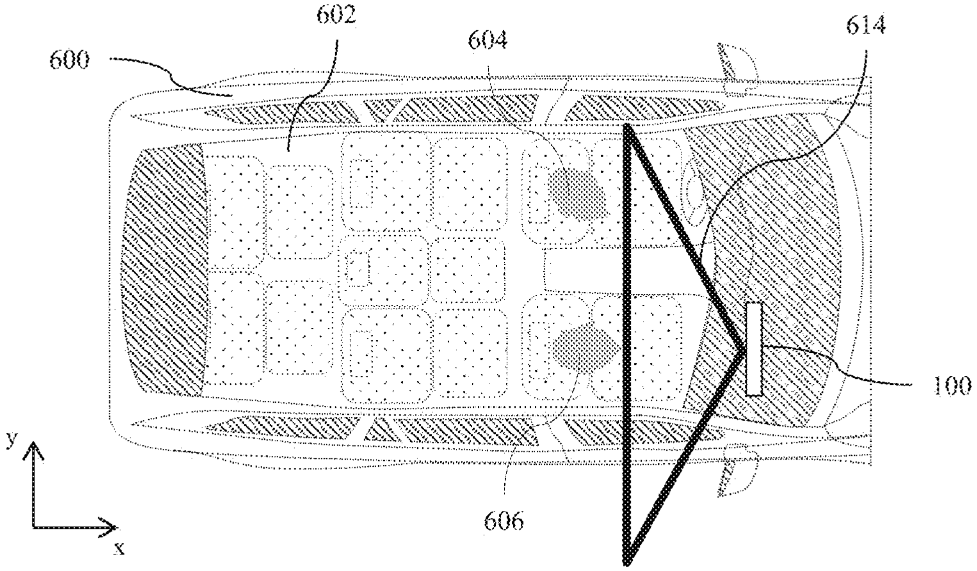
FIG. 4E is a diagram illustrating in top view an automotive vehicle with a switchable directional display arranged within the vehicle cabin in a sharing mode.

FIG. 4E is a schematic diagram illustrating in top view an automotive vehicle with a switchable directional display 100 arranged within the vehicle cabin 602 in a sharing mode of operation. Light cone 614 is provided with a wide angular range such that all occupants may perceive an image on the display 100, for example when the display is not in motion or when non-distracting images are provided.

Further stray light in night-time operation may be reduced, such that distracting internal light in the vehicle cabin is reduced, and driver visibility of objects in the vicinity of the vehicle is advantageously improved. The displays of FIGS. 4A-E may advantageously be provided with touch sensing capability with high sensitivity and with high image quality.

The operation of touch input structures will now be further described.

Figure 5:
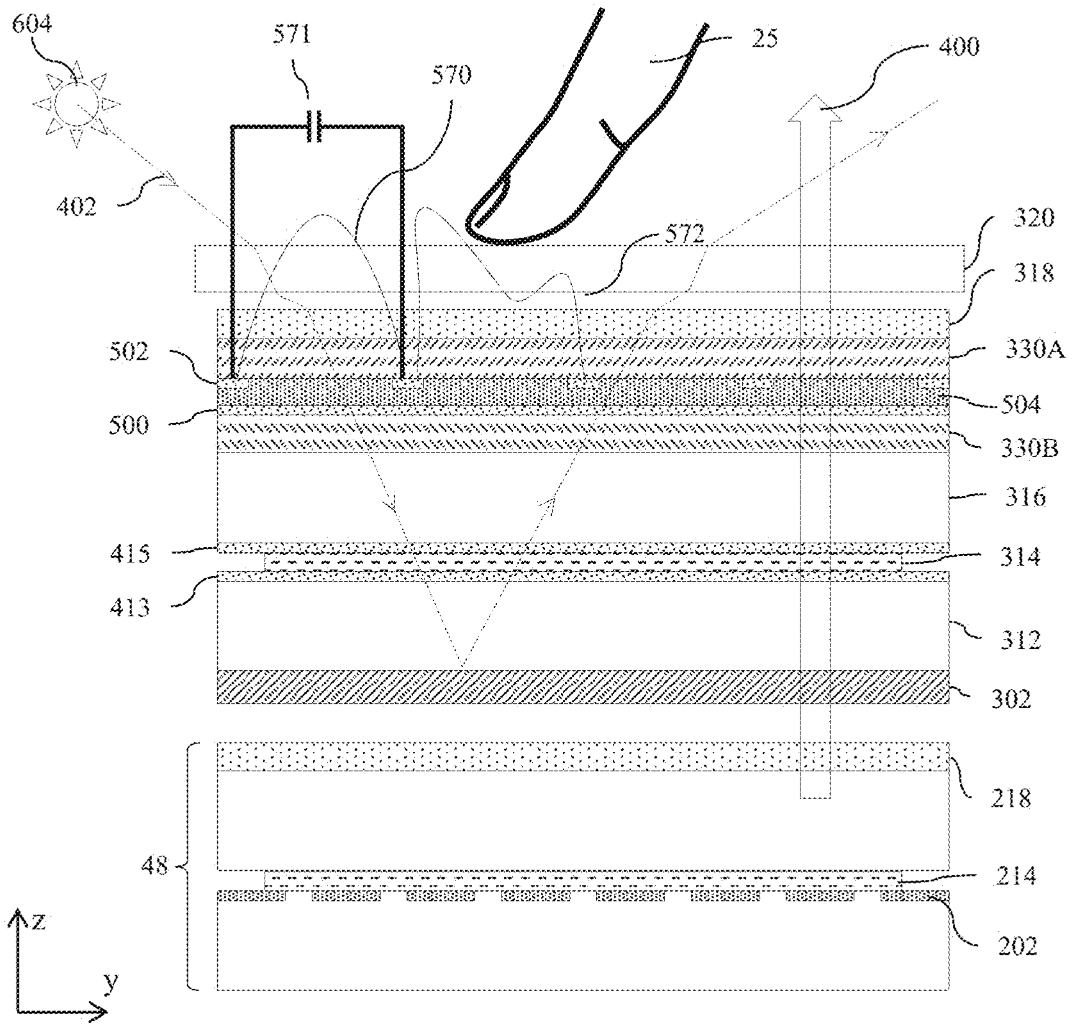
FIG. 5 is a diagram illustrating in side view the touch input display device of FIG. 1A.

FIG. 5 is a schematic diagram illustrating in side view the touch input display device of FIG. 1A. Features of the embodiment of FIG. 5 not discussed in further detail may be assumed to correspond to the features with equivalent reference numerals as discussed above, including any potential variations in the features.

In a touch mode of operation, the signal applied to and measured from the touch electrode arrays 500, 502 provides a projected capacitive field 570 with effective capacitance 571. Finger 25 provides some distortion of the field lines 572, and modifies the capacitance that is measured from the touch electrode arrays 500, 502.

SLM 48 is provided with pixel drive electrodes 202. It would be desirable that the signal provided to the pixels of the SLM 48 is not interfered with by the signals for the touch control system and that the sensitivity of the touch control system is not interfered with by the signal provided to the SLM 48. In the present embodiments, the electrodes 413, 415 provide shielding between the pixel drive electrodes 202 and the touch sensing system. The electrical signal shielding described above increase the signal to noise ratio of the touch signal detection. Advantageously the touch sensitivity is increased and image stability is not degraded. Further the present embodiments do not need to use touch sensing methods at inter-pixel locations in the SLM 48 so that the aperture ratio of the pixels is increased. Advantageously the increased aperture ration allows more light transmission through the display panel. Further advantageously the resolution of the display is not reduced by the integration of touch sensing circuitry at the pixel locations of the SLM 48.

Some known displays use the interaction of the light emission from the display with the finger or touch stylus. When the output angle of light is different in the public and private modes, the sensitivity and performance of the touch system may vary according to the display mode. In the embodiments described where the touch electrodes 500,502 are not located at the pixel plane of SLM 48 and the operation and sensitivity of the touch sensing is independent of whether the display is operating in public or privacy modes.

Arrangements of touch electrode arrays 500, 502 will now be described.

Figure 6A:
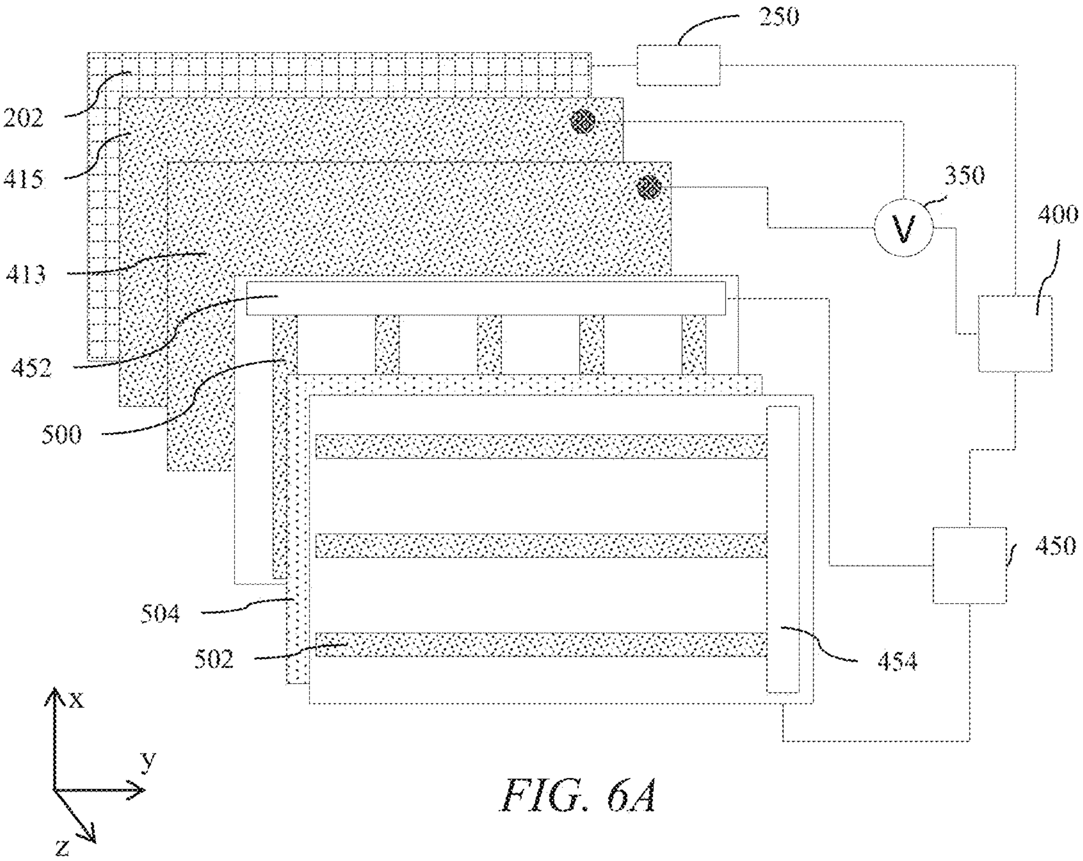
FIG. 6A is a diagram illustrating in perspective front view electrodes and control system for a touch input display device wherein the electrodes are arranged on opposite sides of a dielectric layer.

FIG. 6A is a schematic diagram illustrating in perspective front view electrodes and control system 400, 450, 350, 250 for a touch input display device. Features of the embodiment of FIG. 6A not discussed in further detail may be assumed to correspond to the features with equivalent reference numerals as discussed above, including any potential variations in the features.

The touch electrode arrays 500, 502 are arranged on opposite sides of a dielectric layer 504. System controller 400 enables the voltage driver 350 and touch controller 450 to be synchronised so that driving and measuring the signal from the touch controller may take place during a time in which the drive voltage on the switchable liquid crystal retarder is constant, for example zero. This enables the signal to noise ratio (SNR) of the measuring process to be improved which increases the touch sensitivity and immunity to electrical interference. The variation in capacitance to be measured or detected may be of the order of femto Farads. The measurement circuit may comprise a capacitance to voltage converter circuit and may further comprise analog signal processing circuits. Alternatively or additionally a capacitance to digital circuit can be used and further comprise digital signal processing functions. The measurement circuit may be gated with the waveform 436 to improve the SNR. The measurement circuit may include frequency filtering to discriminate in favour of the frequency band of the touch panel signal driving and discriminate against other frequencies, improving the SNR. The electrodes 415 and 413 may screen the high frequency driving signals to the SLM 48 from the touch electrode arrays 500, 502 so that the SNR of the measuring process may be improved without the need to synchronise to the vertical blanking interval (VBI) of SLM 48. However system controller 400 may also synchronise the touch controller 450 and the SLM 48 for example so that the driving and measuring of the signal for the touch controller occurs during the VBI of the SLM 48 addressing which further improves SNR of the touch measurement.

The drive voltage that the control system 400 is arranged to apply to the switchable retarder control electrodes 413, 415 is synchronised with respect to the addressing of the SLM 48.

In operation, it is desirable to provide (i) driving of image data (ii) control of switchable liquid crystal layer for both wide and privacy modes of operation and (iii) touch input.

Some types of display provide in-cell touch, that is electrodes 202 may further provide touch input function. By way of comparison with the present embodiments if in-cell touch projected field lines 570 were to be provided by some of the electrodes 202 of the SLM 48, the electrodes 413, 415 of the liquid crystal retarder may shield the projected field from such in-cell electrodes and may reduce the signal to noise ratio of the measurement of the signal from the touch electrode arrays 202. Such in-cell touch electrode arrays 202 may thus be ineffective for provision of a touch function in the presence of switchable liquid crystal retarder 314. In operation, the electrodes 413, 415 of the liquid crystal retarder may provide further electric field lines such that the projected field 570 from touch electrode arrays 500, 502 may reduce the signal to noise ratio of the measurement of the signal from the touch electrode arrays 500, 502. It would be desirable to provide a high signal to noise ratio for the touch control system comprising touch drivers 452, 454 and touch control system 450.

It would be desirable to achieve touch input without shielding of the touch signals by the electrodes 413, 415 of the switchable liquid crystal layer 314.

Figure 6B:
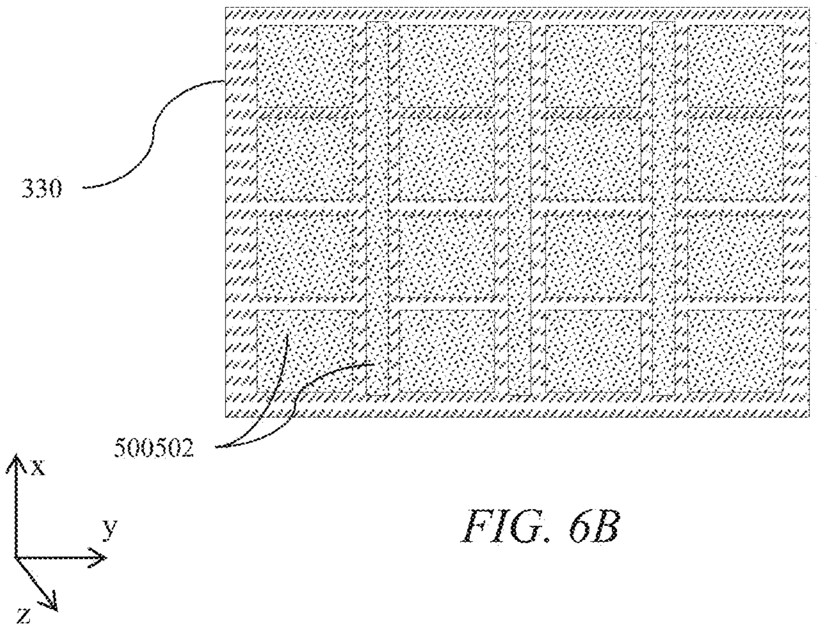
FIG. 6B is a diagram illustrating in perspective front view electrodes for a touch input display device wherein the electrodes are arranged on the same side of a dielectric layer.

FIG. 6B is a schematic diagram illustrating in perspective front view a further electrode arrangement for a touch input display device. In comparison to the arrangement of FIG. 6A, the touch electrode array is a single array 503 that is arranged on a single surface of the compensation retarder 330. Advantageously a simpler structure may be provided. The touch electrode array 503 is formed on a surface of one of the at least one passive polar control retarders 330.

Figure 6C:
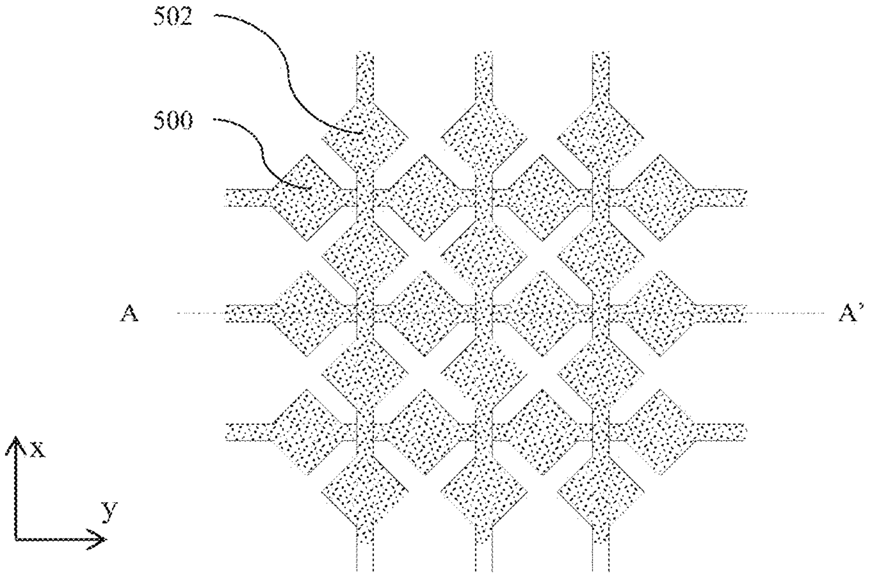
FIG. 6C is a diagram illustrating in perspective front view the electrodes of a further arrangement for a touch input display device.

FIG. 6C is a schematic diagram illustrating in perspective front view the electrode arrays 500, 502 of a further arrangement for a touch input display device. In comparison to FIG. 6B the electrodes on the same surface are insulated from each other by small insulating bridges (not shown) at the cross overs between electrode arrays 500, 502. This arrangement increases the fringe fields between the sets of electrodes and the SNR of the detection and measurement is therefore increased.

Figure 6D:
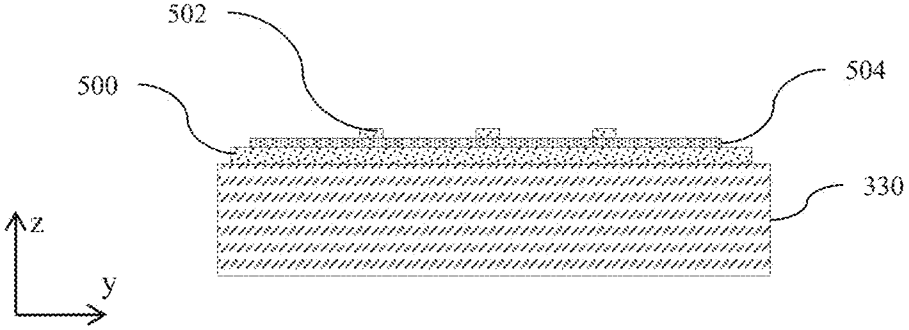
FIG. 6D is a diagram illustrating in cross sectional side view an arrangement corresponding to FIG. 6C.

FIG. 6D is a schematic diagram illustrating in cross sectional side view an arrangement of cross section A-A' in FIG. 6C wherein insulating bridges are replaced by a continuous dielectric layer 504. Features of the embodiments of FIGS. 6C-D not discussed in further detail may be assumed to correspond to the features with equivalent reference numerals as discussed above, including any potential variations in the features.

A control circuit for driving and measuring the signal from a touch sensor will now be described.

Figure 7:
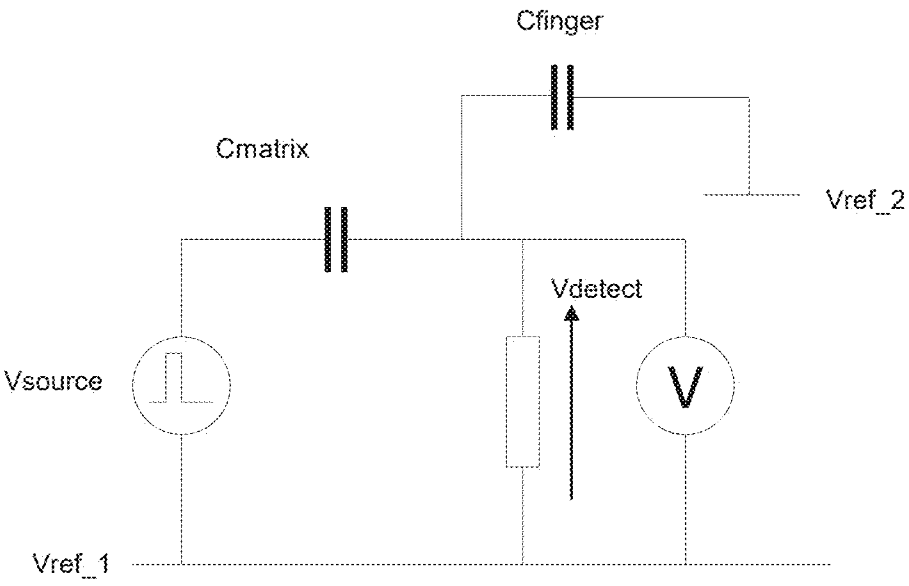
FIG. 7 is a diagram illustrating a circuit diagram for control of a touch input device.

FIG. 7 is a schematic diagram illustrating an equivalent circuit for control of a touch input device. The touch panel system may generate a voltage Vsource with respect to a reference potential Vref_1, which may be a complex waveform as will be described later. Vsource is applied to a first array of the touch panel electrodes as explained below. The first array of electrodes forms a spatial matrix of capacitors, for example Cmatrix, with elements of the second array of electrodes. The second array of electrodes may be on the same side of a substrate, on opposite sides of a substrate or on two separate substrates. When the pulse Vsource is applied to the first array of electrodes, a signal can be detected at the second array of electrodes for example voltage Vdetect. The voltage Vsource and detection voltage Vdetect may be sequentially scanned or connected to one or more of the electrodes comprising the array of first and second electrodes respectively in order to measure a spatial array of capacitances across the display surface. When the panel surface is touched, the presence of a finger distorts the electric field in its proximity and this can be detected as a change in capacitance and may be measured as a change in the voltage Vdetect at each of the associated matrix of capacitances. This change in capacitance is illustrated by Cfinger. For equipment plugged in to mains power, Vref_1 and Vref_2 may be considered to be at ground potential. For battery powered equipment, Vref_1 may be considered as a floating potential.

In the diagrams of this specification, one finger 25 is shown for clarity, however the touch panels of the present embodiments are capable of resolving multiple touches from 1 or more fingers. The finger (or fingers) produces a change in the dielectric applicable to one or more elements of Cmatrix which may be detected as a change in capacitance at Vdetect.

The array of second electrodes may comprise different shaped electrodes. In particular the shape may be designed so that the detection circuit may more easily differentiate between the wanted signal voltage changes to Vdetect caused by the presence of a finger and for example injected noise voltages picked up by the finger acting as an antenna.

Figure 8:
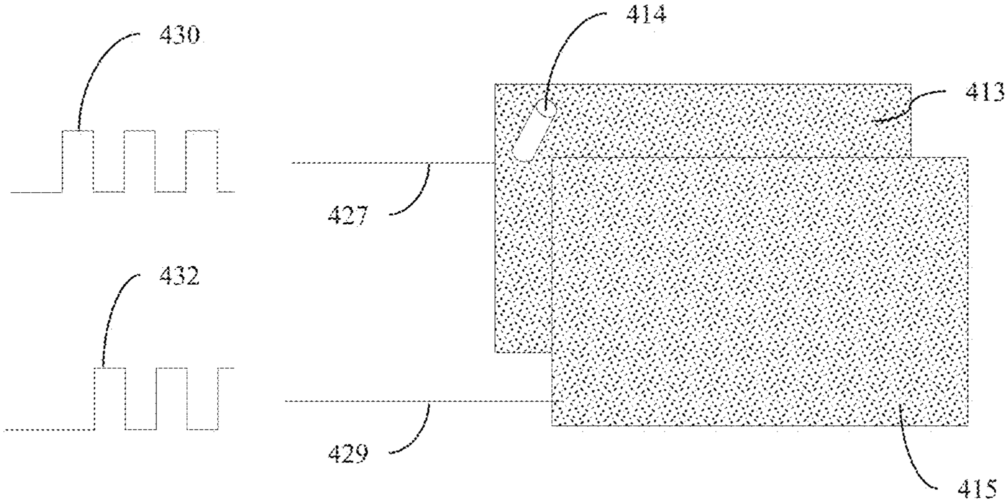
FIG. 8 is a diagram illustrating in perspective front view driving of a switchable liquid crystal retarder with voltage waveforms.

FIG. 8 is a schematic diagram illustrating in perspective front view driving of a switchable liquid crystal retarder with voltage waveforms 430, 432 driven by means of connecting wires 427, 429 to electrodes 413, 415 of the switchable retarder containing liquid crystal layer 314 comprising liquid crystal material 414. Features of the embodiment of FIG. 8 not discussed in further detail may be assumed to correspond to the features with equivalent reference numerals as discussed above, including any potential variations in the features.

Driving waveforms for the switchable liquid crystal retarder and touch controller 450 will now be described.

Figure 9A:
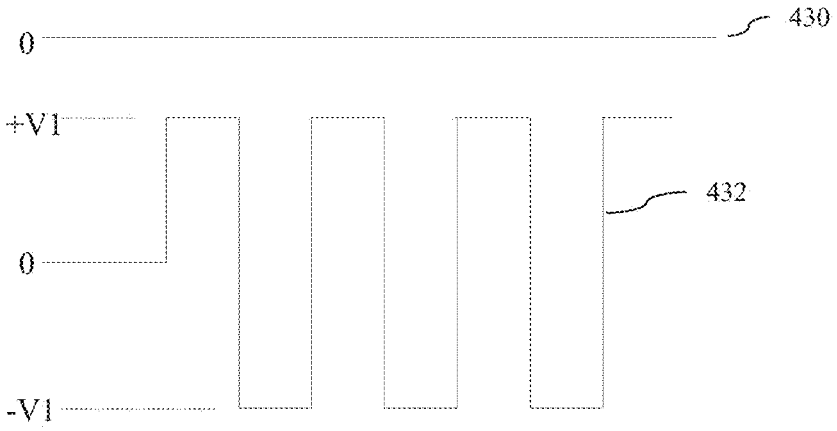
FIG. 9A is a graph illustrating driving waveforms for driving of a switchable liquid electrode.

FIG. 9A is a schematic graph illustrating driving waveforms for driving of a switchable liquid crystal retarder comprising a first voltage waveform 430 provided to electrode 413 that is zero volts and a second voltage waveform 432 provided to electrode 415 that is an alternating voltage waveform, when a dual rail power supply is provided. The voltage waveform 430 may be at ground potential or at a reference potential in battery powered equipment. The voltage waveform 432 may have a first addressing positive voltage phase provided with positive maximum +V1; and a second addressing negative voltage phase with a negative minimum voltage −V1. Using this arrangement, the switchable liquid crystal retarder may be driven by a single drive amplifier. Advantageously the drive circuit complexity is reduced.

Figure 9B:
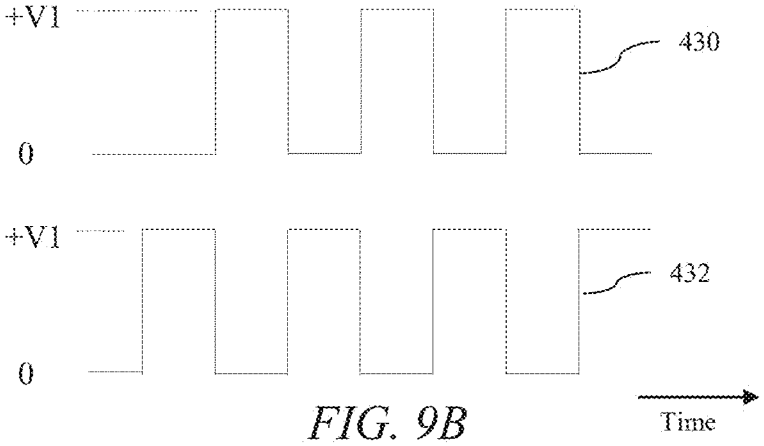
FIG. 9B is a graph illustrating driving waveforms for driving of a switchable liquid crystal retarder comprising two anti-phase driven electrodes.

FIG. 9B is a schematic graph illustrating alternative driving voltage waveforms 430, 432 for driving of a switchable liquid crystal retarder when only a single rail power supply is provided with voltage rail V1. Features of the embodiment of FIG. 9B not discussed in further detail may be assumed to correspond to the features with equivalent reference numerals as discussed above, including any potential variations in the features.

The waveforms 430, 432 are shown driven in anti-phase. Using this arrangement, the switchable liquid crystal retarder may be driven by two drive amplifiers. Advantageously the power supply can be a single rail type and therefore complexity and cost is reduced.

Figure 10:
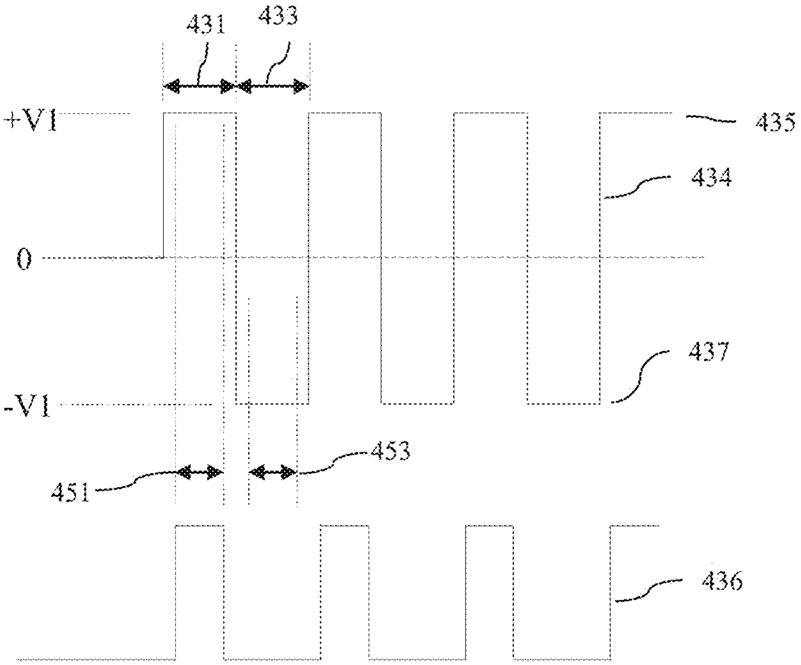
FIG. 10 is a graph illustrating a resultant voltage waveform provided across the liquid crystal retarder for the driving waveforms of FIGS. 9A-B and touch control signal.

FIG. 10 is a schematic graph illustrating a resultant voltage waveform 434 provided across the liquid crystal retarder 301 for the driving waveforms of FIGS. 9A-B, and the waveform 436 for the control signal for the touch controller 450. Features of the embodiment of FIG. 10 not discussed in further detail may be assumed to correspond to the features with equivalent reference numerals as discussed above, including any potential variations in the features.

The waveform 434 of the drive voltage comprises an addressing sequence comprising a first addressing positive voltage phase 431 with a positive maximum voltage level 435; and a second addressing negative voltage phase 433 with a negative minimum voltage level 437. In the waveform 434 for the drive voltage across the layer 314 of liquid crystal material of FIG. 10, the voltage transitions are shown as essentially instantaneous. In practice, some transition time is present. The drive voltage across the layer 314 of liquid crystal material has a waveform 434 including periods 451, 453 where the drive voltage is constant, and the control system 400 is arranged to address the at least one touch electrode array 500, 502 during at least one of the periods 451, 453 where the drive voltage is constant. Thus the waveform 436 is provided during the periods 451. In another embodiment, the waveform 436 may be provided during the periods 453.

The arithmetic average of the waveform 434 of the drive voltage is zero. In other words, the arithmetic average potential experienced by the switchable liquid crystal layer 314 between electrodes 413, 415 is zero. Advantageously the liquid crystal material 414 in the layer 314 of the liquid crystal retarder is DC balanced. Charge migration effects are minimised and cell lifetime and performance is optimised.

FIG. 10 further illustrates the touch control waveform 436 applied to the touch controller 450. When the touch control waveform 436 is in a first low state, no signal is provided to the controller 450 and no touch sensing is provided. When the touch control waveform 436 is in a second high state, a signal is provided to the controller 450, and signals are applied to and measured from touch electrode arrays 500, 502 by means of touch drivers 452, 454.

Thus the signal applied to and measured from the touch electrode arrays 500, 502 is provided when the drive voltage of the resultant voltage waveform 434 is at a constant level.

The active state of the touch control waveform 436 is provided for a period that is less than or equal to the length of a constant voltage level of waveform 434, for example period 431. Further the signal applied to and measured from the touch electrode arrays 500, 502 is provided when the drive voltage of the voltage waveform 434 is at the same constant level 435 each time the signal is applied to and measured in waveform 434.

The signal to noise ratio of detection of touched position may be increased because there is reduced variation of the fringe field experienced by the touch electrode arrays 500, 502 attributed to interference from a changing electric field on the switchable liquid crystal retarder electrodes 413, 415 and therefore the contribution to the variation in capacitance from the proximity of the finger is easier to discriminate. Advantageously the sensitivity of the touch detection may be increased and accuracy improved.

It would be desirable to increase signal to noise ratio of the touch measurement system. Further voltage waveforms 434 and corresponding touch control waveforms 436 will now be described.

FIGS. 11A-D are schematic graphs each illustrating a resultant voltage waveform 434 provided across the liquid crystal retarder layer 314 and corresponding timing of a touch control signal 436 for application to and measurement from the touch electrode arrays 500, 502. Features of the embodiments of FIGS. 11A-D not discussed in further detail may be assumed to correspond to the features with equivalent reference numerals as discussed above, including any potential variations in the features.

Thus the waveform 434 of the drive voltage in the first phase comprises at least one positive voltage level and a zero voltage level; and the waveform of the drive voltage in the second phase comprises at least one negative voltage level and a zero voltage level.

Figure 11A:
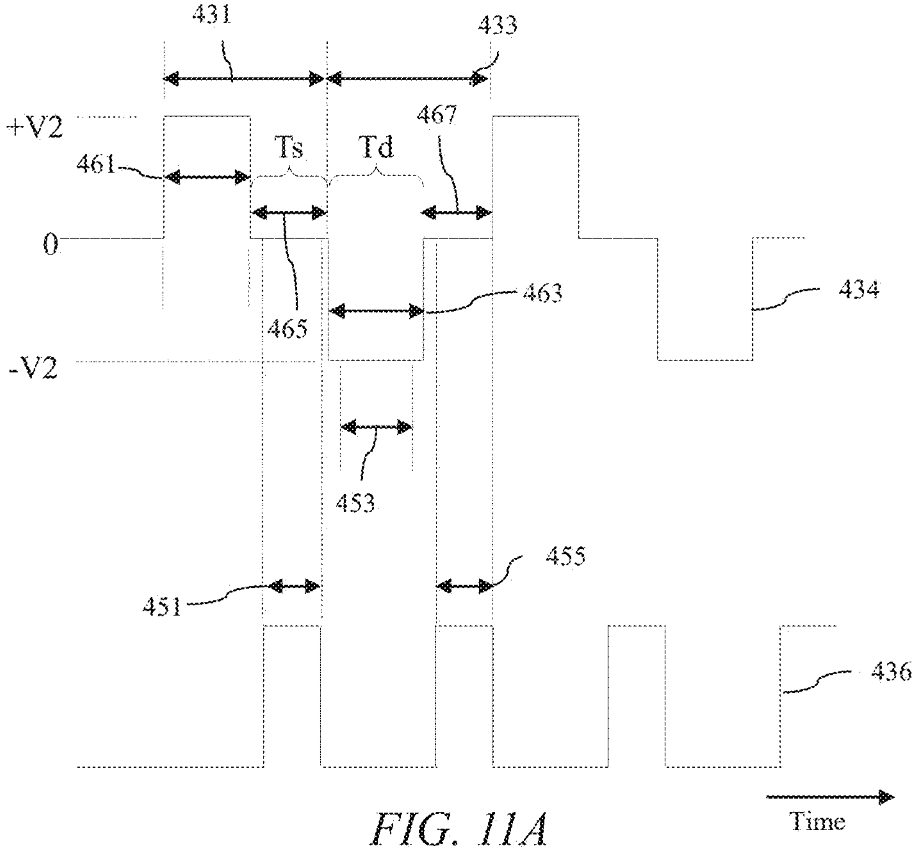
FIG. 11A, FIG. 11B, FIG. 11C, and FIG. 11D are graphs each illustrating a resultant voltage waveform provided across the liquid crystal retarder and corresponding timing of a control signal for application to and measurement from the touch electrode arrays.

In FIG. 11A, the drive voltage across the layer 314 of liquid crystal material 414 has a waveform 434 including periods 451, 453, 455 where the drive voltage is constant, and the control system 400 is arranged to address the at least one touch electrode array 500, 502 during at least one of the periods 451, 455 where the drive voltage is constant. The waveform 434 of the drive voltage includes a positive addressing phase 431 including at least one pulse 461 of positive polarity with level V2 and a negative addressing phase 433 including at least one pulse 463 of negative polarity with level −V2.

The waveform 436 is provided during the periods 451, 455. The drive voltage has a waveform 434 including periods 451, 453, 455 where the drive voltage is constant but of respectively different levels +V2, 0, −V2 and the control system 400 is arranged to address the at least one touch electrode array 500, 502 during at least one of the periods 451, 455 where the drive voltage is constant and at the same level that is zero volts.

In other words, the waveform 434 of the drive voltage includes a positive addressing phase 431 including at least one pulse 461 of positive polarity and at least one additional period 465 and a negative addressing phase 433 including at least one pulse 463 of negative polarity and at least one additional period 467, the at least one additional period 465 of the positive addressing phase 431 and the at least one additional period 467 of the negative addressing phase 433 being said periods 451, 455 where the drive voltage is constant and has a level intermediate the maximum level of the at least one pulse 461 of positive polarity and the minimum level of the at least one pulse 463 of negative polarity. The at least one additional period 465 of the positive addressing phase 431 and the at least one additional period 467 of the negative addressing phase 433 have a level of zero volts.

The drive voltage has a waveform 434 having a root mean square value that provides a constant liquid crystal optical alignment state of the liquid crystal retarder 301 and having arithmetic average of zero.

FIG. 11A illustrates that the touch control signal is applied to and measured from the touch electrode arrays is provided during time that is less than or equal to Ts when the drive voltage waveform 434 is at a constant level and when the voltage waveform 434 is zero volts. The voltage drive waveform 434 may be non-zero at other times for example shown during the time Td.

In comparison to the arrangement of FIG. 10, the signal to noise ratio of detection of touched position may be increased because there is reduced absolute level of the fringe field experienced by the touch electrode arrays 500, 502 attributed to interference from the electric field on the switchable liquid crystal retarder electrodes 413, 415 and therefore the contribution to the variation in capacitance from the proximity of the finger 25 is easier to discriminate. Advantageously the sensitivity of the touch detection may be increased and accuracy improved.

High frequency detection reduces the perceived lag in the recorded position of finger 25. The entire slot Ts or a portion within Ts may be used for the signal being applied to and measured from the touch electrode array.

Alternatively some of the zero voltage time slots in the waveform 434 may be unused for touch measurement, that is some of the pulses of the waveform 436 may be removed. This achieves a lower processing load on the controller 450 of the measurement of the touch signal while allowing the operational frequency of the switchable liquid crystal retarder to be set to a higher level. Advantageously the operating frequency of the switchable liquid crystal retarder may be set freely to suit the material and optical system.

It may be desirable to increase the length of time for which touch measurement is provided.

Figure 11B:
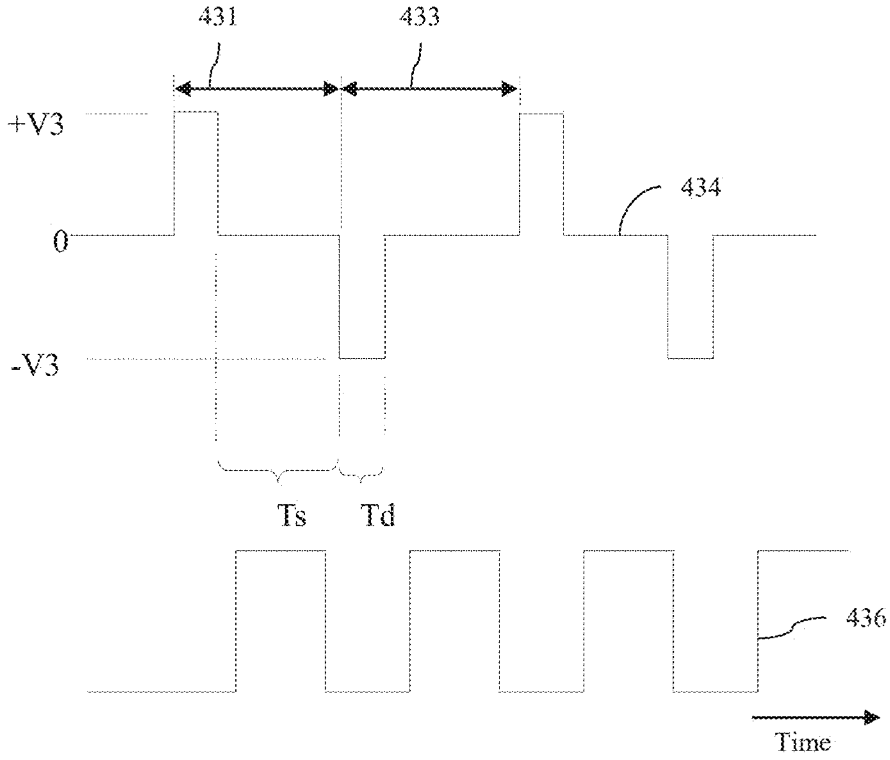

As shown in FIG. 11B, the zero voltage times of waveform 434 may be increased. To maintain the desirable liquid crystal alignment, the negative minimum voltage −V3 and positive maximum voltage +V3 may have greater magnitude than V2 shown in FIG. 11A. The same overall root mean square (RMS) drive to the switchable liquid crystal layer 314 may be provided. Increased detection time enables more electrodes to be measured and this may increase the accuracy of the touch position measurement. The directional output may be advantageously maintained, and the detection time increased such that advantageously sensitivity, response time and accuracy is achieved.

It may be desirable to reduce high frequency temporal signals in the electric field from the switchable liquid crystal retarder electrodes 413, 415.

Figure 11C:
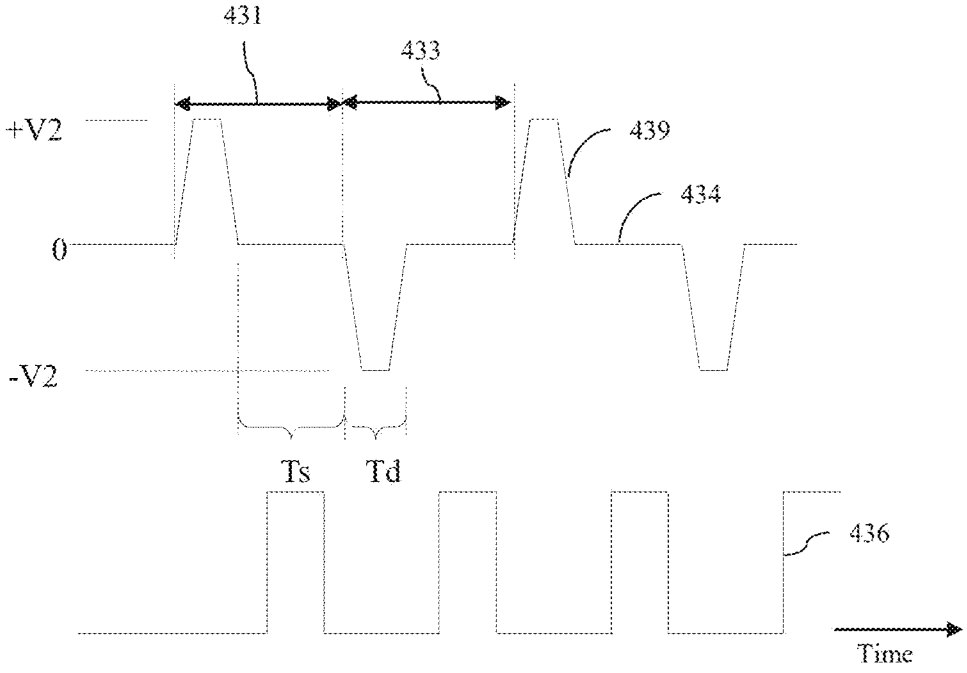

As illustrated in FIG. 11C, the waveform of the drive voltage can be other than a square wave. Using for example a waveform 434 with a trapezoidal waveform profile 439 reduces the high frequency Fourier components and reduces the electrical interference from the driving of the liquid crystal retarder 301. Advantageously signal to noise ratio of the touch measurement may be improved.

Figure 11D:
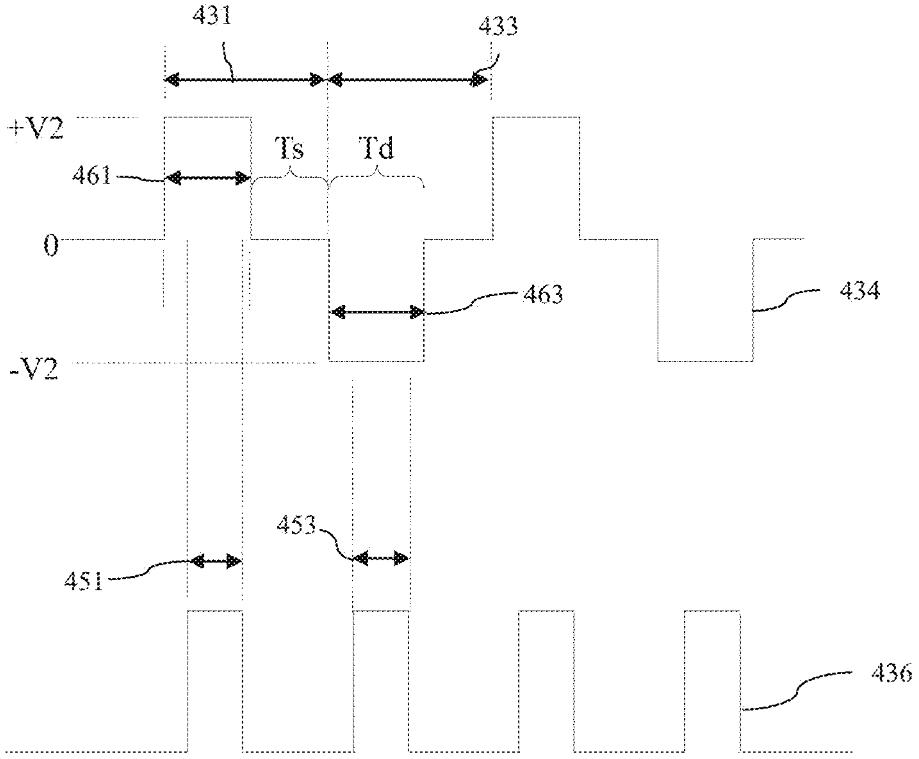

By way of comparison with FIG. 11A, FIG. 11D illustrates that the peaks of the at least one pulse 461 of positive polarity and the peaks of the at least one pulse 463 of negative polarity are the said periods 451, 453 where the drive voltage is constant.

A method of controlling a touch input display device 100 thus comprises: a SLM 48 arranged to output light 400; a display polariser 218 arranged on the output side of the SLM 48; an additional polariser 318 arranged on the output side of the display polariser 218; a switchable liquid crystal retarder 301 comprising a layer 314 of liquid crystal material 414 arranged between the display polariser 218 and the additional polariser 318; at least one passive polar control retarder 330 arranged between the switchable liquid crystal retarder 301 and the additional polariser 318; switchable retarder control electrodes 413, 415 arranged to apply a voltage for controlling the switchable liquid crystal retarder 301; and at least one touch electrode array 500, 502 arranged in at least one layer on the output side of the switchable retarder control electrodes 413, 415, wherein the method comprises: applying a drive voltage to the switchable retarder control electrodes 413, 415 for controlling the switchable liquid crystal retarder 301, wherein the drive voltage has a waveform 434 including periods 451, 453, 455 where the drive voltage is constant; and addressing the at least one touch electrode array 413, 415 for capacitive touch sensing during at least one of the periods 451, 453, 455 where the drive voltage is constant.

It may be desirable to further increase the frequency of the measurements of the touch position.

Figure 12A:
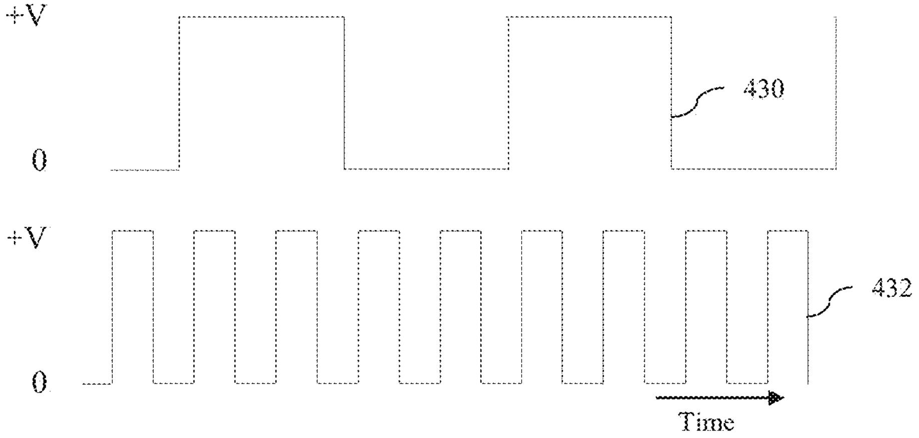
FIG. 12A is a graph illustrating driving waveforms for driving of a switchable liquid crystal retarder comprising a zero volt driven electrode and an alternating voltage waveform driven electrode.
Figure 12B:
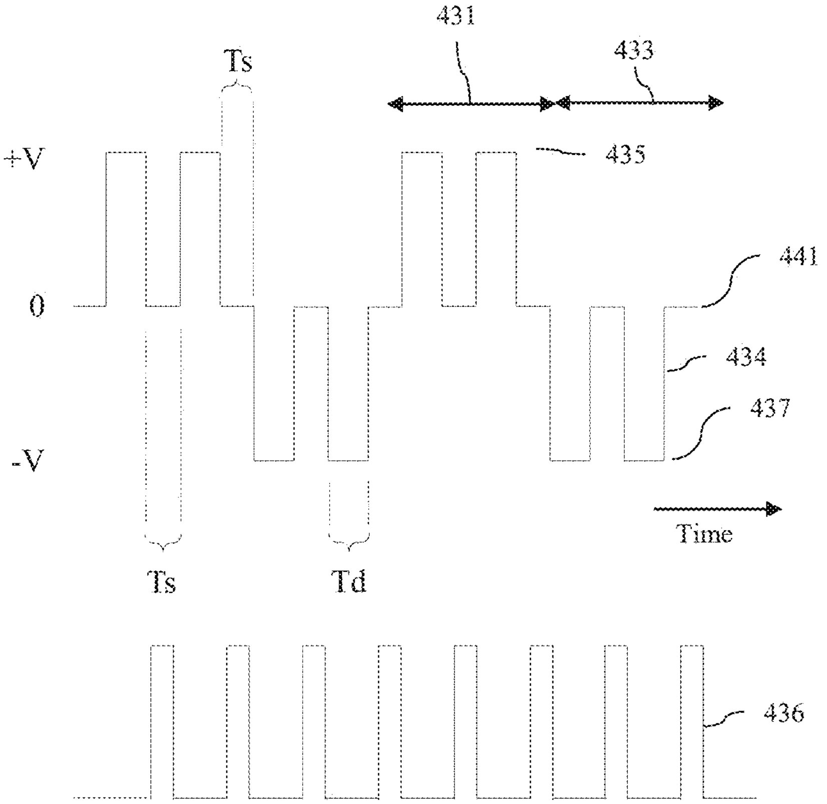
FIG. 12B is a graph illustrating a resultant voltage waveform provided across the liquid crystal retarder for the driving waveforms of FIG. 12A.

FIG. 12A is a schematic graph illustrating two further example driving voltage waveforms 430, 432; and FIG. 12B is a schematic graph illustrating a resultant voltage waveform 434. Features of the embodiments of FIGS. 12A-B not discussed in further detail may be assumed to correspond to the features with equivalent reference numerals as discussed above, including any potential variations in the features.

Each of the first and second addressing phases 431, 433 comprises a drive voltage level 441 intermediate the positive maximum voltage 435 and negative minimum voltage 437. The intermediate voltage level 441 is zero volts. In other words, the voltage waveform 434 in the first phase 431 comprises at least one positive voltage level 435 and a zero voltage level 441; and the resultant waveform 434 of the drive voltage in the second phase 433 comprises at least one negative voltage level 437 and a zero voltage level 441.

The root mean square (RMS) value of the waveform 434 of the drive voltage is arranged to provide a constant liquid crystal optical alignment state of the liquid crystal retarder and the arithmetic average of the waveform 434 of the drive voltage is zero.

As illustrated an increased density or frequency of time slots Ts in which the signal applied to and measured from the touch electrode arrays may be provided. Increasing the density of the measurement time slots Ts can reduce the latency of the touch signal measurement which improves the reliability of the touch interaction when the finger 25 or fingers are moving. Providing the signals applied to and measured from the touch electrode arrays 500, 502 while the voltage on the switchable liquid crystal retarder is at the same constant value improves the signal to noise ratio of the touch measurement system and advantageously improves reliability.

In some circumstances it would be desirable to make the touch signal measurements at a voltage other than ground.

Figure 13A:
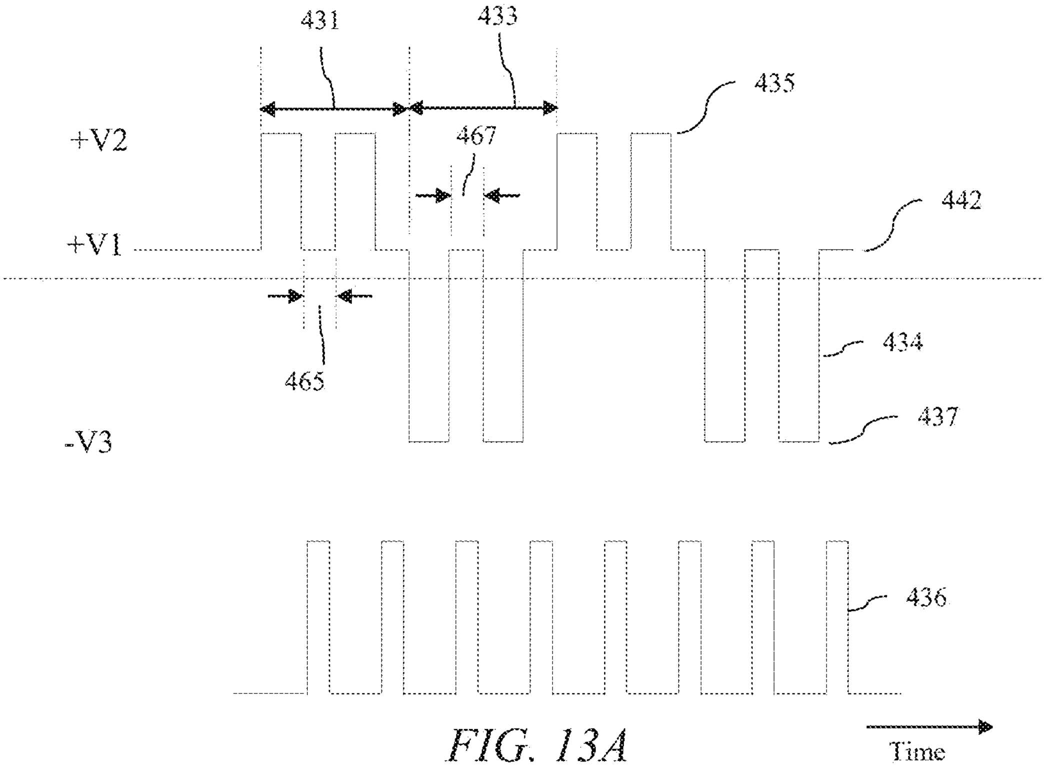
FIG. 13A and FIG. 13B are graphs illustrating resultant voltage waveforms provided across the liquid crystal retarder with three and four drive voltage levels respectively.
Figure 13B:
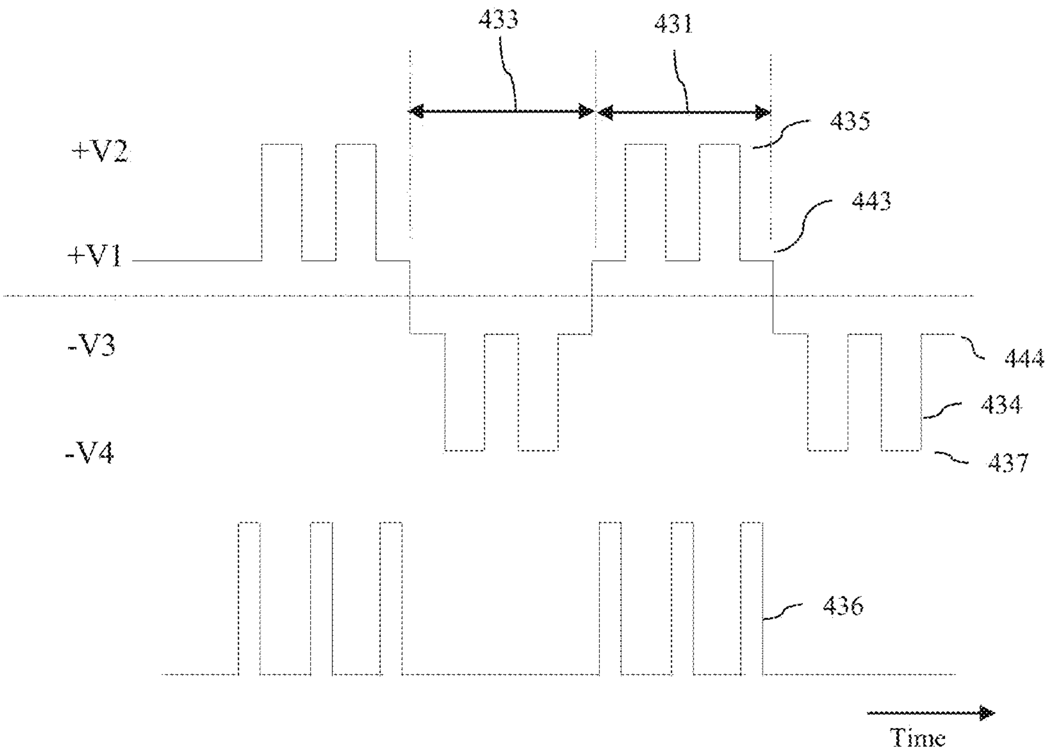

FIGS. 13A-B are schematic graphs illustrating resultant voltage waveforms provided across the liquid crystal retarder with three and four drive voltage levels respectively. Features of the embodiments of FIGS. 13A-B not discussed in further detail may be assumed to correspond to the features with equivalent reference numerals as discussed above, including any potential variations in the features.

The at least one additional period 465 of the positive addressing phase 431 and the at least one additional period 467 of the negative addressing phase 433 have a level V1 of non-zero magnitude.

In FIG. 13A the voltage waveform 434 in the first phase 431 comprises a first positive voltage level 435 and a second voltage level 442; and the resultant waveform 434 of the drive voltage in the second phase 433 comprises at least one negative voltage level 437 and the second voltage level 442.

In FIG. 13B the waveform 434 of the drive voltage in the first phase 431 comprises more than one positive voltage level 435, 443; and the waveform 434 of the drive voltage in the second phase 433 comprises more than one negative voltage level 444, 437.

The measurement of the touch signals may be done while the resultant voltage waveform 434 is away from ground in case the ground signal has a lot of high frequency electrical noise. Advantageously the reliability of the touch signal detection may be improved.

Figure 14:
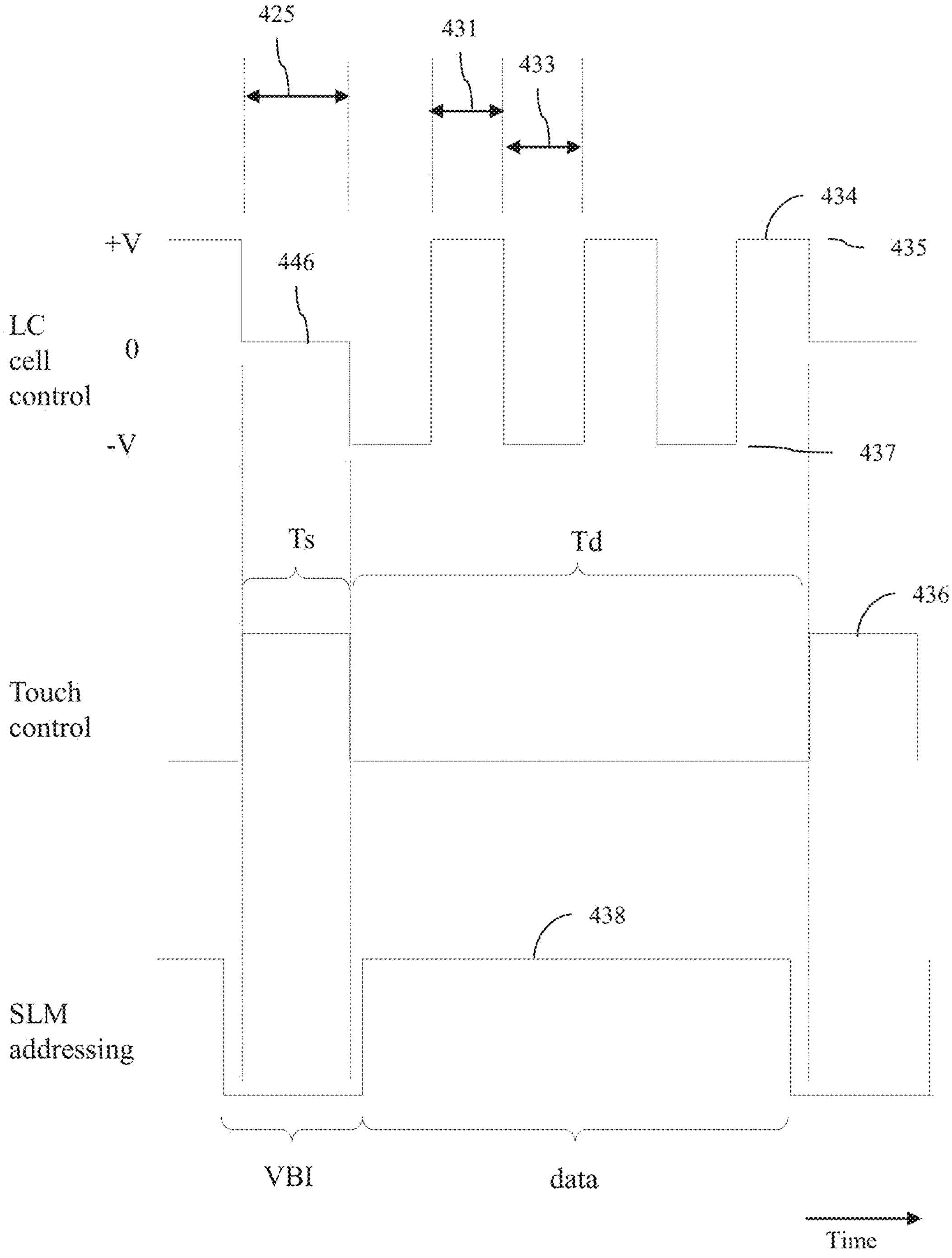
FIG. 14 is a graph illustrating a resultant voltage waveform provided across the liquid crystal retarder, corresponding timing of a control signal for application to and measurement from the touch electrode arrays, and synchronisation with the vertical blanking interval of the SLM.

FIG. 14 is a schematic graph illustrating a resultant voltage waveform 434 provided across the liquid crystal retarder, corresponding timing of a control signal waveform 436 for application to and measurement from the touch electrode arrays 500, 502, and synchronisation with the vertical blanking interval (VBI) of the SLM 48. Features of the embodiment of FIG. 14 not discussed in further detail may be assumed to correspond to the features with equivalent reference numerals as discussed above, including any potential variations in the features.

In comparison to the two-phase addressing waveforms 434 of other embodiments herein, the voltage waveform 434 comprises a third addressing phase 425 comprising an intermediate drive voltage level 446 intermediate the positive maximum voltage 435 and negative minimum voltage 437. The intermediate voltage level 446 is illustrated as zero.

The control system 400 is arranged to address the SLM 48 using an addressing scheme including a vertical blanking interval VBI, and the control system 400 being arranged to address the at least one touch electrode array 500, 502 during the vertical blanking interval VBI.

Thus the waveform 436 applied to the switchable liquid crystal retarder is synchronised with respect to the addressing of the SLM 48. The addressing waveform 438 of the SLM 48 comprises a vertical blanking interval (VBI) and the waveform 436 applied to and measured from the touch electrode arrays 500, 502 is provided during the vertical blanking interval (VBI). Advantageously the signal to noise ratio of the touch detection may be improved because there is reduced interference from the high frequency signals that comprise the data addressing of the SLM 48.

When the position of the switchable liquid crystal retarder is between the SLM 48 and the touch electrode arrays then the electrodes of the switchable liquid crystal retarder can substantially shield the electrical noise effect of the high frequency SLM data phase 438 from the touch detection circuit so that synchronising to the SLM may not be provided. Synchronising to the VBI of the SLM 48 reduces the frequency of the positional updates from the touch electrode system and therefore increases the position lag error for a moving finger. This is particularly an issue when the addressing frequency of the SLM is reduced below say 60 Hz, for example to save power.

It may be desirable to provide a touch measurement update rate that is different to the addressing of the SLM 48, for example for high speed movement of finger 25.

Figure 15:
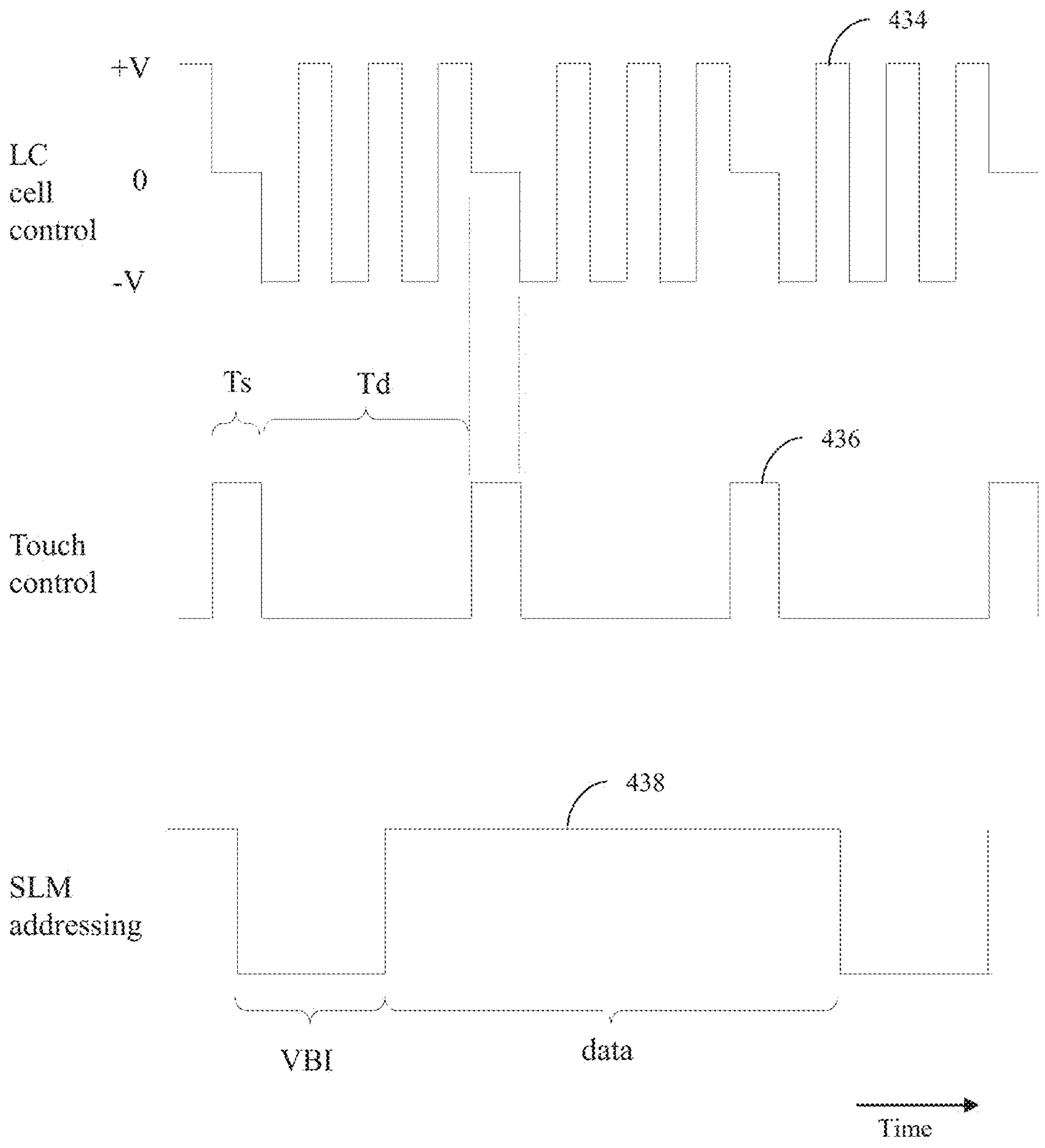
FIG. 15 is a graph illustrating a resultant voltage waveform provided across the liquid crystal retarder, corresponding timing of a control signal for application to and measurement from the touch electrode arrays, asynchronously with the driving of the SLM.

FIG. 15 is a schematic graph illustrating a resultant voltage waveform provided 434 across the liquid crystal retarder, corresponding timing of a control signal waveform 436 for application to and measurement from the touch electrode arrays 500,502 asynchronously with the driving waveform 438 of the SLM 48. Features of the embodiment of FIG. 15 not discussed in further detail may be assumed to correspond to the features with equivalent reference numerals as discussed above, including any potential variations in the features.

Advantageously increased response speed and reduced lag may be provided by the touch system. In addition, the driving signal to the SLM 48 can be operated independently of the touch panel and be provided by separate suppliers without the need for their electrical integration. The shielding of the SLM 48 electrical noise from the touch electrode arrays 500 means that the and signal to noise ratio may be maintained without limiting the touch panel update frequency to the VBI periods of the SLM 48 addressing and allowing these components to be operated independently without synchronisation. In particular the touch panel control and measurement signals can be independent of and compatible with variable addressing refresh rates of the SLM 48, for example as used in "Freesync™" technology compatible SLMs.

Figure 16A:
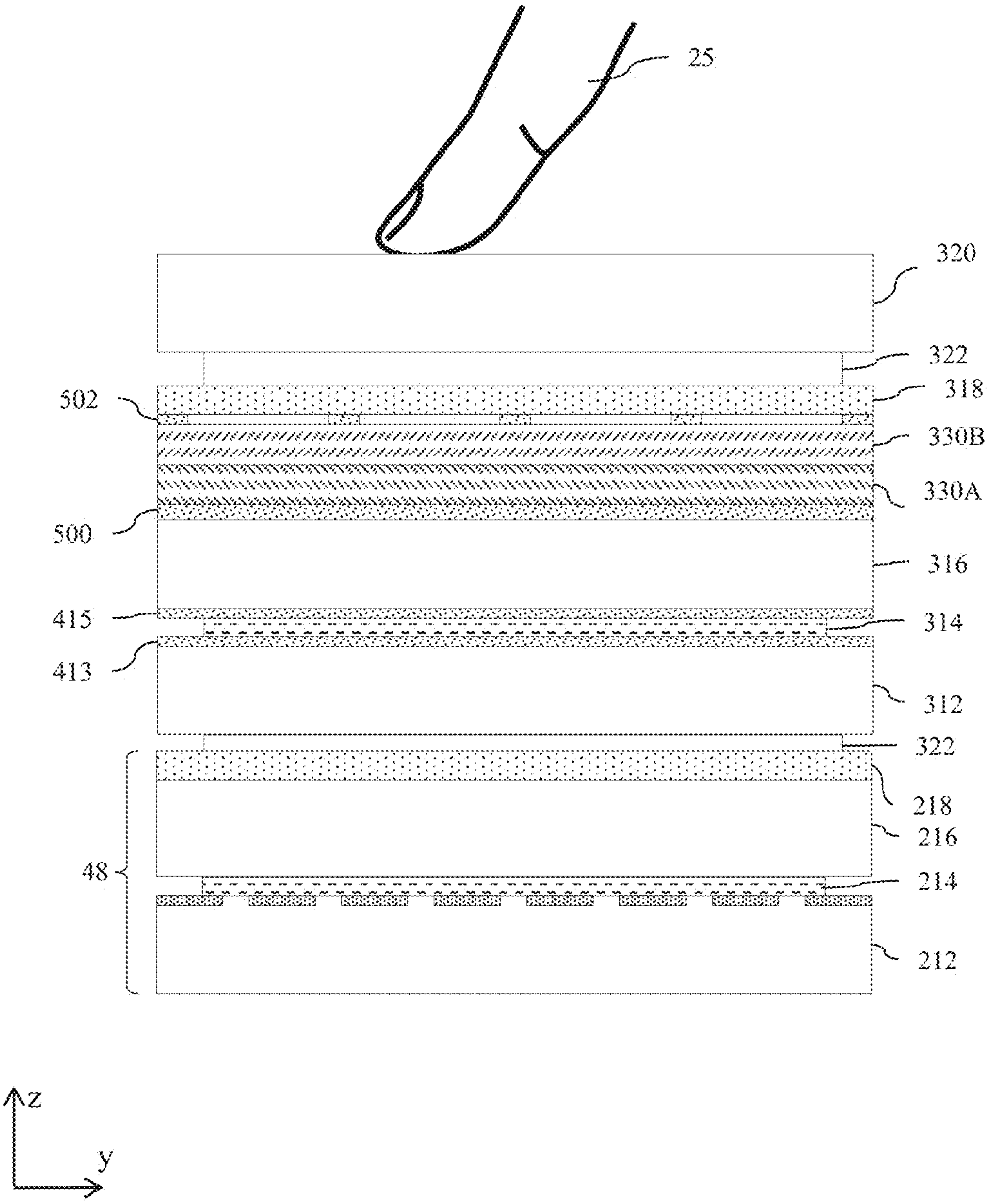
FIG. 16A is a diagram illustrating in side view a touch input display device wherein the dielectric layer is provided by a pair of crossed A-plates.
Figure 16B:
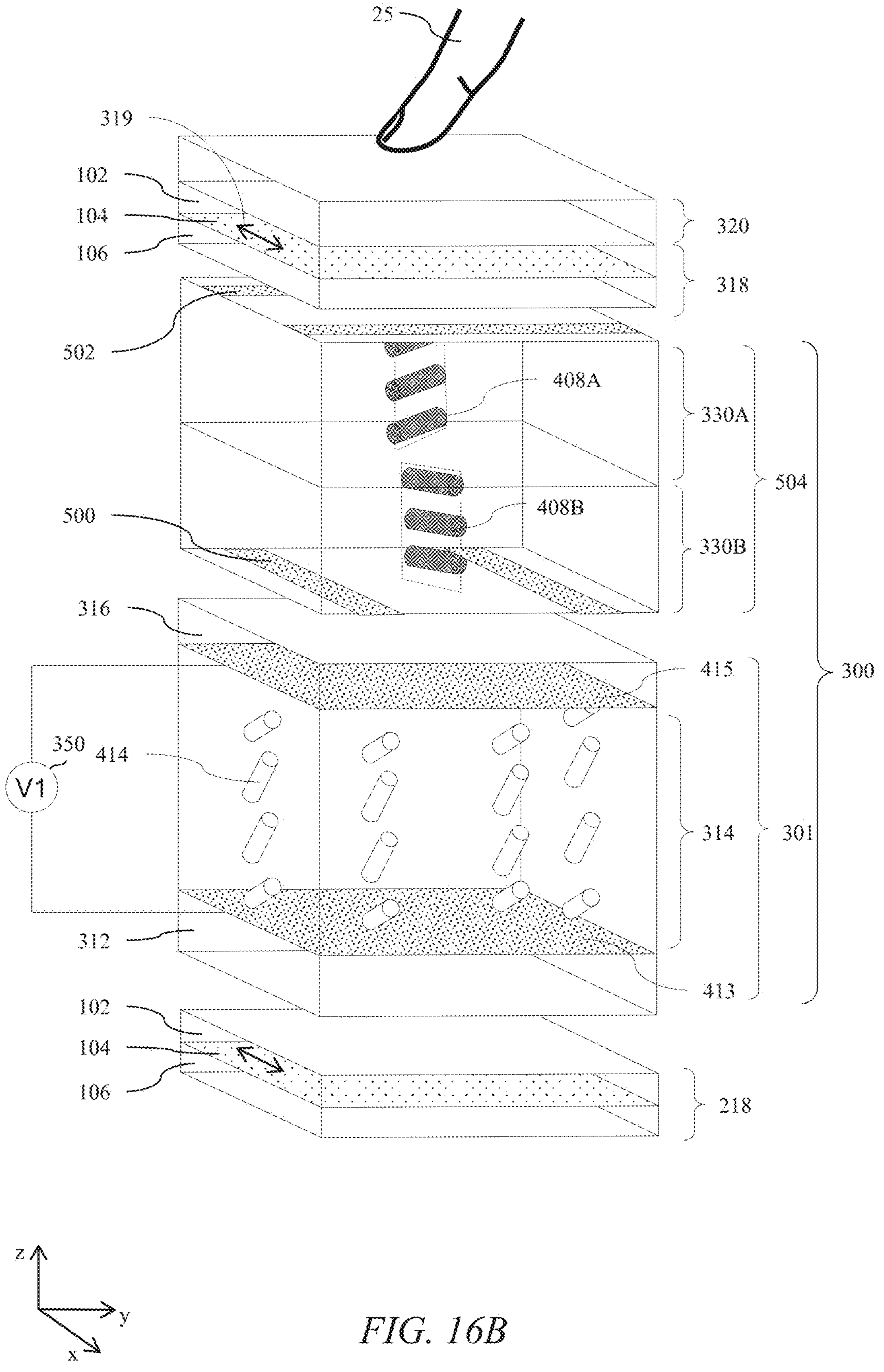
FIG. 16B is a diagram illustrating in perspective side view a touch input display device wherein the dielectric layer is provided by a pair of crossed A-plates.

Other structures of switchable directional displays comprising touch electrode arrays will now be described FIG. 16A is a schematic diagram illustrating in side view a touch input display device wherein the dielectric layer 504 is provided by a pair of crossed A-plates; FIG. 16B is a schematic diagram illustrating in side view a touch input display device wherein the dielectric layer is provided by a pair of crossed A-plates 330A, 330B. Thus the dielectric layer 504 comprises at least one passive polar control retarder. Features of the embodiments of FIGS. 16A-B not discussed in further detail may be assumed to correspond to the features with equivalent reference numerals as discussed above, including any potential variations in the features.

The display device 100 comprises more than one passive polar control retarder 330A, 330B and said at least one dielectric layer 504 comprises all the passive polar control retarders 330A, 330B. The touch electrode array comprises a pair of touch electrode arrays 500, 502 formed on outer surfaces of respective ones of the pair of passive uniaxial retarders 330A, and said at least one dielectric layer 504 comprises the pair of passive uniaxial retarders 330A, 330B.

Advantageously crossed A-plates retarders 330A, 330B may achieve wide field of view for high visual security levels. Electrodes may conveniently be provided on one side of the A-plate retarders 330A. 330B in a roll to roll fabrication method with low cost. The retarders 330A, 330B may be attached by solvent bonding, to reduce thickness and complexity and increase robustness to environmental and mechanical stress.

FIGS. 16A-B further illustrate that the reflective polariser 302 may be omitted to provide a display with off-axis luminance control. Off-axis reflectivity is reduced for arrangements in which side reflections are considered undesirable. Advantageously thickness and cost may be reduced.

Figure 16C:
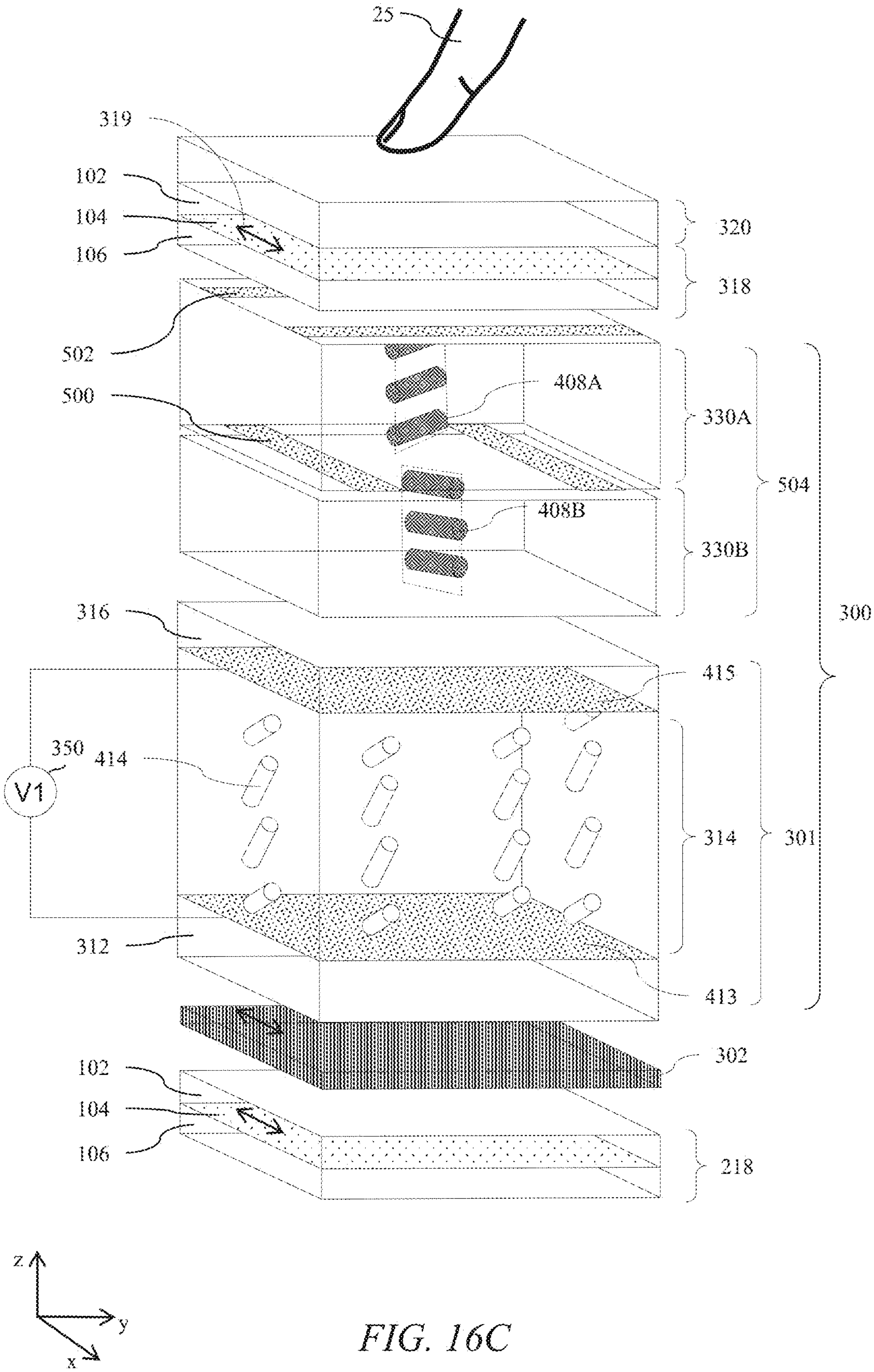
FIG. 16C is a diagram illustrating in perspective side view a touch input display device wherein the dielectric layer is provided by one of a pair of crossed A-plates.

FIG. 16C is a schematic diagram illustrating in side view a touch input display device wherein the dielectric layer is provided by one of a pair of crossed A-plate passive polar control retarder 330A. Thus the dielectric layer 504 comprises at least one passive polar control retarder. Features of the embodiment of FIG. 16C not discussed in further detail may be assumed to correspond to the features with equivalent reference numerals as discussed above, including any potential variations in the features.

The at least one passive retarder comprises a pair of passive uniaxial retarders 330A. 330B having optical axes in the plane of the passive uniaxial retarders that are crossed. Said at least one dielectric layer 504 comprises the passive polar control retarder 330A wherein the display device 100 comprises two passive polar control retarders 330A, 330B.

In comparison to the arrangements of FIG. 1A and FIG. 2A, the dielectric layer 504 comprises the pair of crossed A-plate passive polar control retarders 330A, 330B. The A-plates may be bonded in contact, for example by solvent bonding where a low thickness structure is advantageously provided. Advantageously thickness may be reduced. In comparison to the arrangement of FIG. 16B, the electrode arrays 500, 502 are formed on a single substrate that may reduce fabrication cost as only a single element is provided with electrodes. Further the dielectric thickness is reduced that may improve operating characteristics for touch screen capacitive sensing. Advantageously at least one of the electrode arrays 500 may be protected by the other of the passive polar control retarders 330B.

It may be desirable to provide compensation retarders 330 that are not A-plates.

Figure 17:
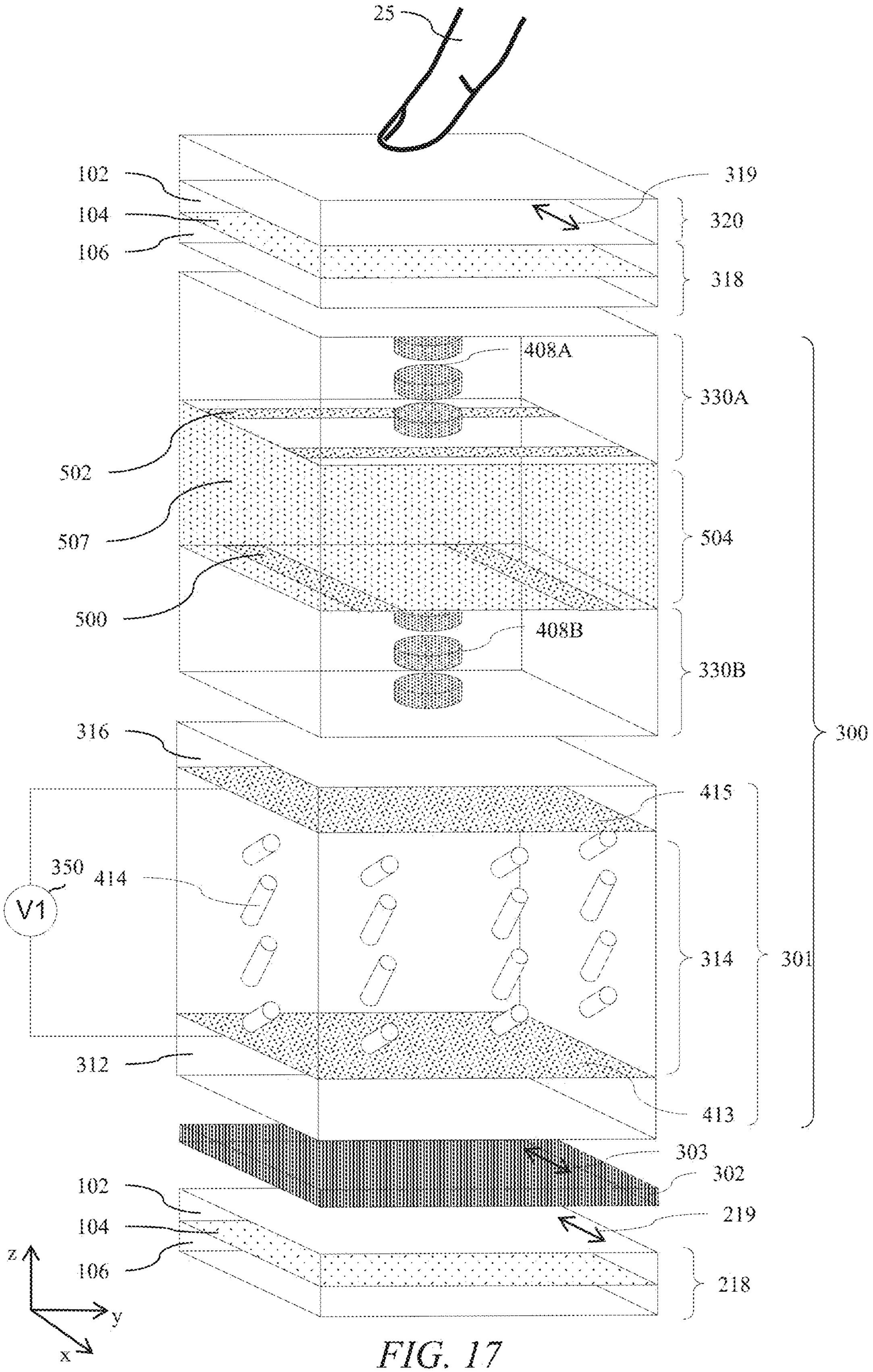
FIG. 17 is a diagram illustrating in a perspective side view a touch input display device wherein the dielectric layer is provided between two C-plates.

FIG. 17 is a schematic diagram illustrating in a perspective side view a touch input display device wherein the dielectric layer is provided between a pair of C-plates 330A. 330B, that is a pair of passive uniaxial retarders each having its optical axis perpendicular to the plane of the retarder. Features of the embodiment of FIG. 17 not discussed in further detail may be assumed to correspond to the features with equivalent reference numerals as discussed above, including any potential variations in the features. The pair of retarders 330A, 330B comprise a pair of passive uniaxial retarders each having its optical axis perpendicular to the plane of the retarder. Dielectric material 507 may be provided in the dielectric layer 504 between the electrode arrays 500, 502 and may be an adhesive material for example.

In comparison to FIG. 16B, the polar region for high image visibility of FIGS. 3A-3D may be improved, for example to increase viewing freedom in the public mode of operation. Further the material or materials processing of the C-plates may be different to that of the A-plates of FIG. 2A, and may provide different adhesion of transparent electrodes such as ITO. Further the electrode orientations are not desirably aligned to the stretch direction in the plane of retarder, reducing cost and complexity.

Figure 18A:
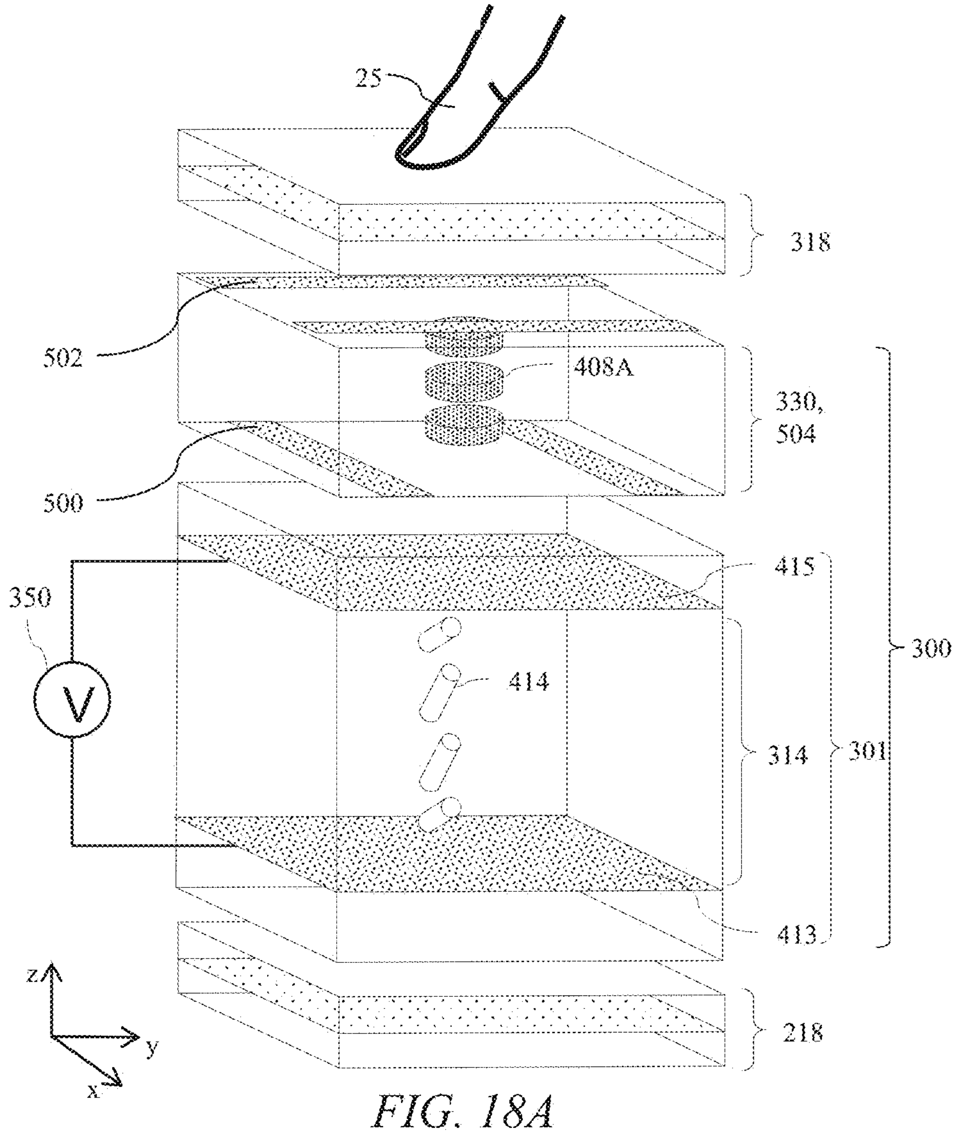
FIG. 18A is a diagram illustrating in a perspective side view a touch input display device wherein the dielectric layer is provided by a C-plate.
Figure 18B:
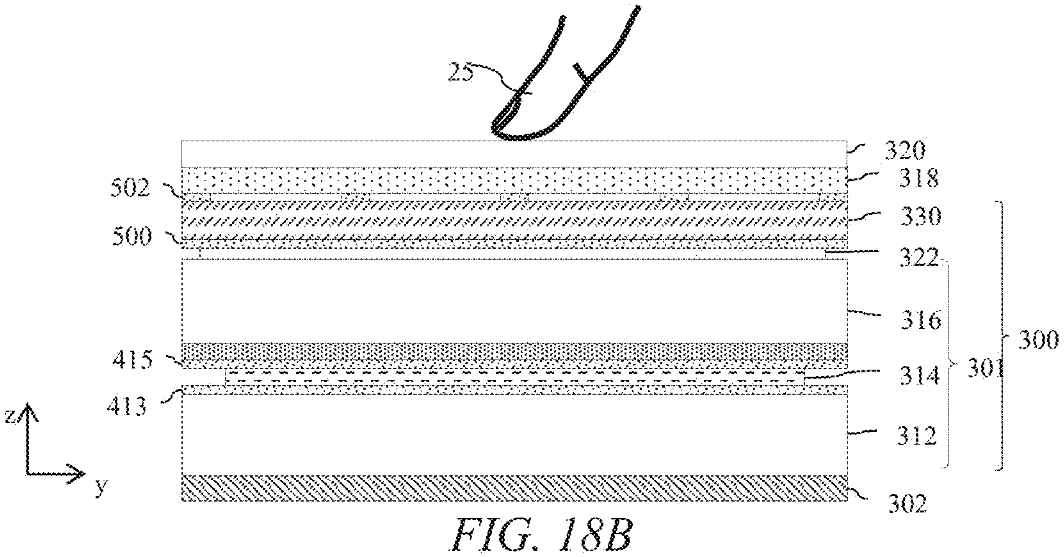
FIG. 18B is a diagram illustrating in side view the touch input display device of FIG. 18A.

FIG. 18A is a schematic diagram illustrating in a perspective side view a touch input display device wherein the dielectric layer 504 is provided by a single C-plate 330 having its optical axis perpendicular to the plane of the retarder; and FIG. 18B is a schematic diagram illustrating in side view the touch input display device of FIG. 18A. An illustrative embodiment is given in TABLE 2. Features of the embodiment of FIGS. 18A-B not discussed in further detail may be assumed to correspond to the features with equivalent reference numerals as discussed above, including any potential variations in the features.

TABLE 2

| | Passive polar control retarder 330 | | Active LC polar control retarder 301 | | | | |
|---|---|---|---|---|---|---|---|
| Mode | Type | Δn · d/ nm | Alignment layers | Pretilt/ deg | Δn · d/ nm | Δε | Voltage/ V |
| Public | Negative C | −700 | Homeotropic | 88 | 810 | −4.3 | 0 |
| Privacy | | | Homeotropic | 88 | | | 2.2 |

The passive polar control retarder 330 comprises a passive uniaxial retarder having an optical axis perpendicular to the plane of the passive uniaxial retarder 330. The dielectric layer 504 comprises the passive polar control retarder 330. Touch electrode arrays 500, 502 are arranged on opposite sides of the passive polar control retarder 330. Advantageously the number of films may be reduced, reducing thickness, cost and complexity.

A single passive polar control retarder 330 provides the dielectric layer 504. Advantageously the thickness, cost and complexity of the display device is reduced. Field of view for high image visibility in public mode may be increased and field of view for high visual security level in privacy mode of operation may be increased by use of the C-plate.

It may be desirable to provide reduction of luminance in both lateral and elevation directions.

Figure 19A:
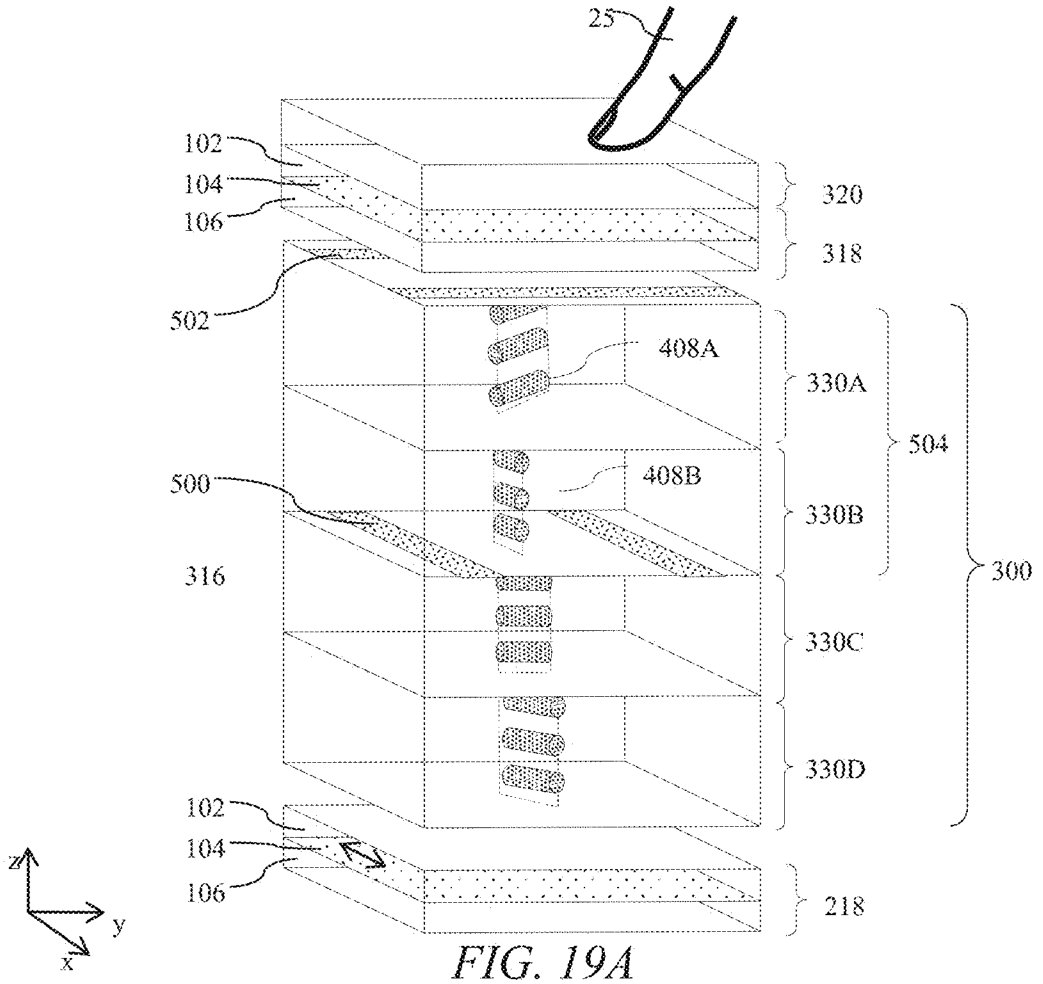
FIG. 19A is a diagram illustrating in a perspective side view a touch input non-switchable privacy display device wherein the dielectric layer is provided between two A-plates.
Figure 19B:
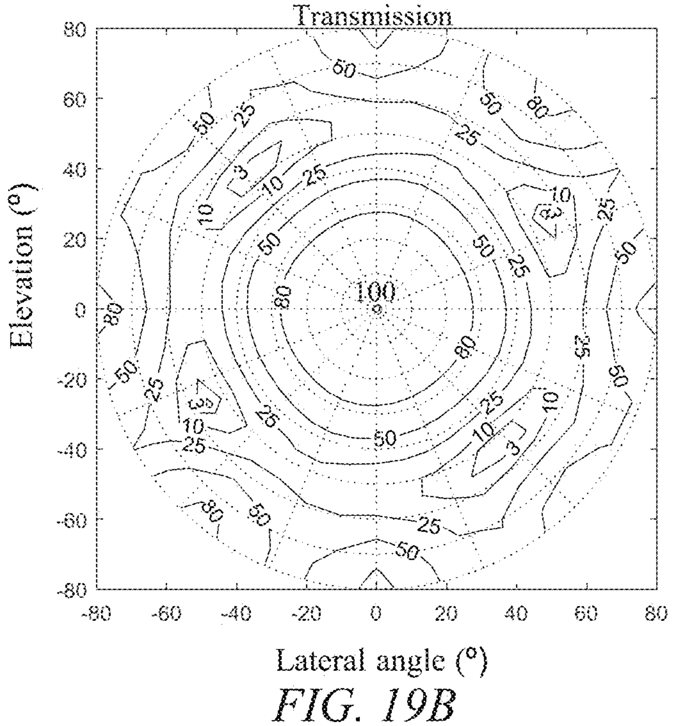
FIG. 19B is a graph illustrating the variation of output transmission of the plural passive polar control retarders with polar direction for transmitted light rays in FIG. 19A.

FIG. 19A is a schematic diagram illustrating in side perspective view an optical stack of a passive polar control retarders 330A-D comprising two pairs of crossed A-plates; and FIG. 19B is a schematic graph illustrating the variation of output transmission with polar direction for transmitted light rays in the passive retarder of FIG. 19A, comprising the structure illustrated in TABLE 3. Features of the arrangements of FIGS. 19A-B not discussed in further detail may be assumed to correspond to the features with equivalent reference numerals as discussed above, including any potential variations in the features.

TABLE 3

| Passive polar control retarder 330 | | | | |
|---|---|---|---|---|
| Layer | Type | Out-of-plane angle/° | In-plane angle/° | Δn · d/ nm |
| 330A | Positive A | 0 | 45 | 700 |
| 330B | | | 90 | |
| 330C | | | 0 | |
| 330D | | | 135 | |

The retarder thus comprises a pair of passive polar control retarders 330A, 330D which have optical axes in the plane of the retarders that are crossed. The pair of retarders each comprise plural A-plates having respective optical axes aligned at different angles from each other. The pair of passive polar control retarders 330B, 330C have optical axes that each extend at 90° and 0°, respectively, with respect to an electric vector transmission direction that is parallel to the electric vector transmission 211 of the display polariser 210.

The pair of passive polar control retarders 330A, 330D have optical axes that extend at 45° and at 135°, respectively, with respect to an electric vector transmission direction 211 that is parallel to the electric vector transmission of the display polariser 218 respectively.

The display further comprises an additional pair of passive polar control retarders 330B, 330C disposed between the first-mentioned pair of passive polar control retarders 330A, 330D and which have optical axes in the plane of the retarders that are crossed. The additional pair of passive polar control retarders 330B, 330C have optical axes that each extend at 0° and at 90°, respectively, with respect to an electric vector transmission direction 211, 317 that is parallel to the electric vector transmission of the display polariser 210, 316.

As described for example with reference to FIGS. 16B-C electrode arrays 500, 502 may be formed on the surface of one or two of the passive polar control retarders 330A, 330B, 330C, 330D.

The present embodiment provides a transmission profile that has some rotational symmetry. Advantageously a privacy display may be provided with reduced visibility of image from a wide field of view for lateral or elevated viewing positions of a snooper. Further, such an arrangement may be used to achieve enhanced privacy operation for landscape and portrait operation of a mobile display. Such an arrangement may be provided in a vehicle to reduce stray light to off-axis passengers, and also to reduced light falling on windscreen and other glass surfaces in the vehicle.

In comparison to the switchable embodiments provided herein the switchable liquid crystal retarder is omitted. Touch electrode arrays 500, 502 are provided to enable touch control of a passive privacy display. Advantageously the thickness and cost of the display can be reduced.

Arrangements wherein the touch electrode arrays are formed on or in the transparent substrates 312, 316 of the switchable liquid crystal retarder will now be described.

Figure 20:
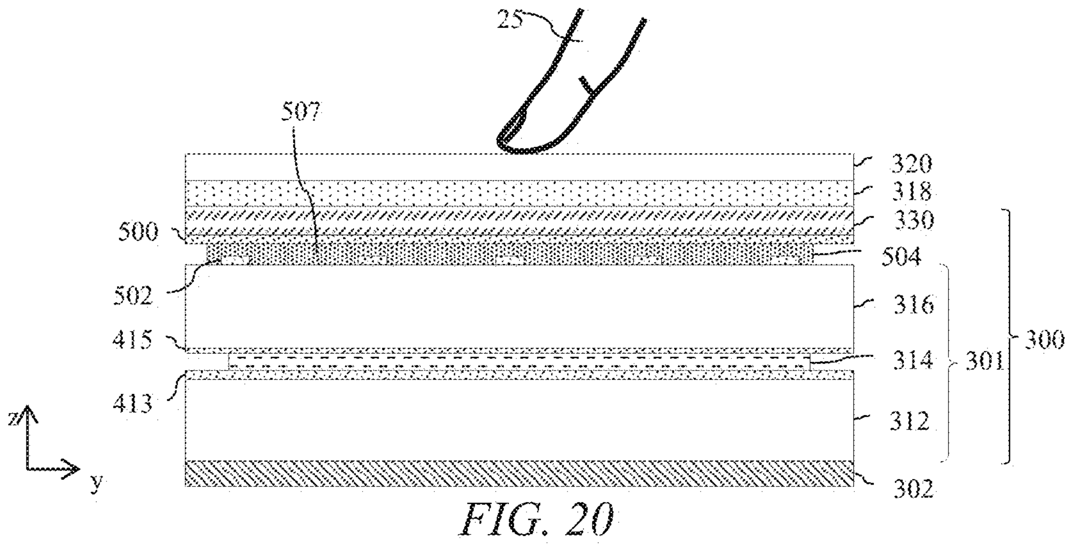
FIG. 20 is a diagram illustrating in side view a touch input display device wherein the dielectric layer between the touch electrode arrays is provided between a passive retarder and the output surface of the switchable liquid crystal retarder.

FIG. 20 is a schematic diagram illustrating in side view a touch input display device 100 wherein the dielectric layer 504 between the touch electrode arrays 500, 502 is provided between a passive polar control retarder 330 that may be a C-plate or crossed A-plates 330A, 330B and the output surface of the output transparent support substrate 316 of the switchable liquid crystal retarder 301. Features of the embodiment of FIG. 20 not discussed in further detail may be assumed to correspond to the features with equivalent reference numerals as discussed above, including any potential variations in the features.

The touch input display device 100 further comprises between input and output transparent support substrates 312, 316, the layer 314 of liquid crystal material 414 being arranged between the input and output transparent support substrates, and the at least one touch electrode array being arranged on the output side of the output transparent support substrate 316. The substrate 316 may have the electrode pattern of touch electrode array 502 formed on its light output side and the passive polar control retarder 330 may have the touch electrode array 500 formed on its input side for output light from the SLM 48. Dielectric material 507, that may for example be an inorganic material such a silicon dioxide and/or an adhesive is provided between the touch electrode arrays 500, 502.

Advantageously a single retarder may be provided with an electrode on a single surface, reducing thickness, cost and complexity. Further transparent electrodes may be conveniently formed on transparent substrates 316 during fabrication of the switchable liquid crystal retarder 301.

It may be desirable to provide electrode arrays 500, 502, 415 on only one side of the transparent output substrate 316.

Figure 21A:
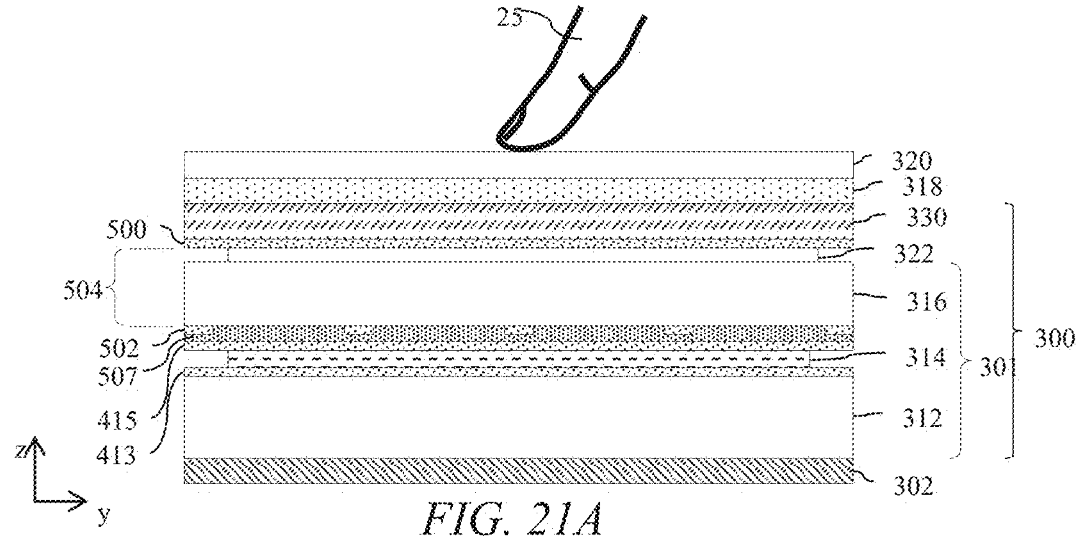
FIG. 21A is a diagram illustrating in side view a touch input display device wherein the dielectric layer between the touch electrode arrays is provided by the output transparent support substrate and an adhesive layer.

FIG. 21A is a schematic diagram illustrating in side view a touch input display device 100 wherein the dielectric layer 504 between the touch electrode arrays 500, 502 is provided by the output transparent support substrate 316 and adhesive layer 322. The electrode array 500 is formed on the passive polar control retarder 330 and the electrode 502 is formed on the transparent substrate 316.

Dielectric material 507, that may for example be an inorganic material such a silicon dioxide is provided between the touch electrode array 502 and liquid crystal control electrode 415. Electrical interference between the two electrodes 502, 415 may be reduced using the waveforms of the present embodiments described above.

Advantageously electrodes 415, 502 are formed on only one side of the transparent support substrate 316, reducing complexity of fabrication of the substrate 316, and reducing cost.

Figure 21B:
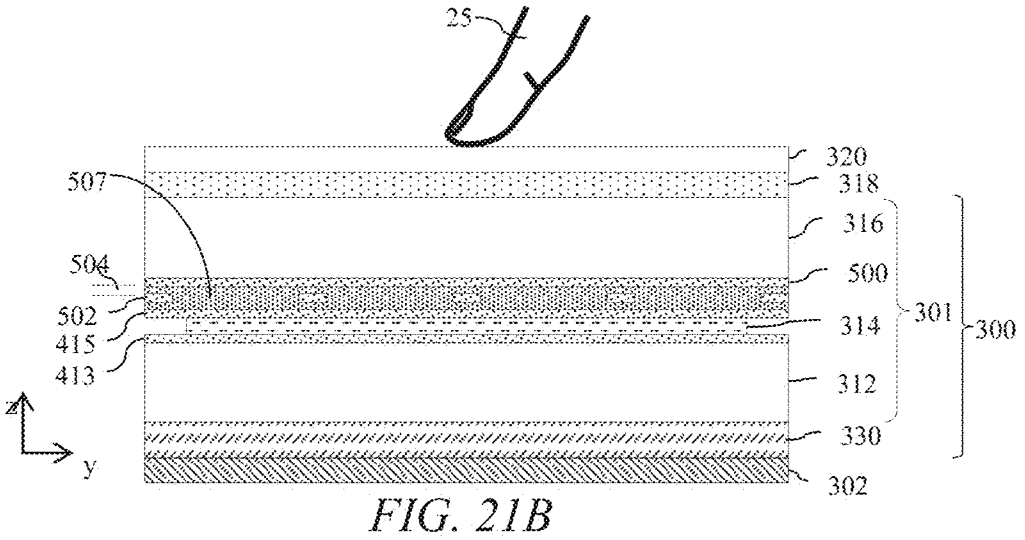
FIG. 21B is a diagram illustrating in side view a touch input display device wherein the touch electrode arrays are provided between one of the liquid crystal control electrodes and the output transparent support substrate of the switchable liquid crystal retarder.

FIG. 21B is a schematic diagram illustrating in side view a touch input display device 100 wherein the touch electrode arrays 500, 502 and dielectric layer 504 s provided between one of the liquid crystal control electrode 415 and the output transparent support substrate 316 of the switchable liquid crystal retarder. Electrical interference between the electrodes 500, 502, 415 may be reduced using the waveforms of the present embodiments described above. Advantageously all the electrodes 415, 500, 502 may be formed on one side of a substrate, reducing cost and complexity. In comparison to FIG. 21C below, in the arrangements of FIG. 21A-B the support substrate 316 may be processed with touch electrode arrays 500, 502 only on one side, advantageously reducing complexity and increasing process yield.

Figure 21C:
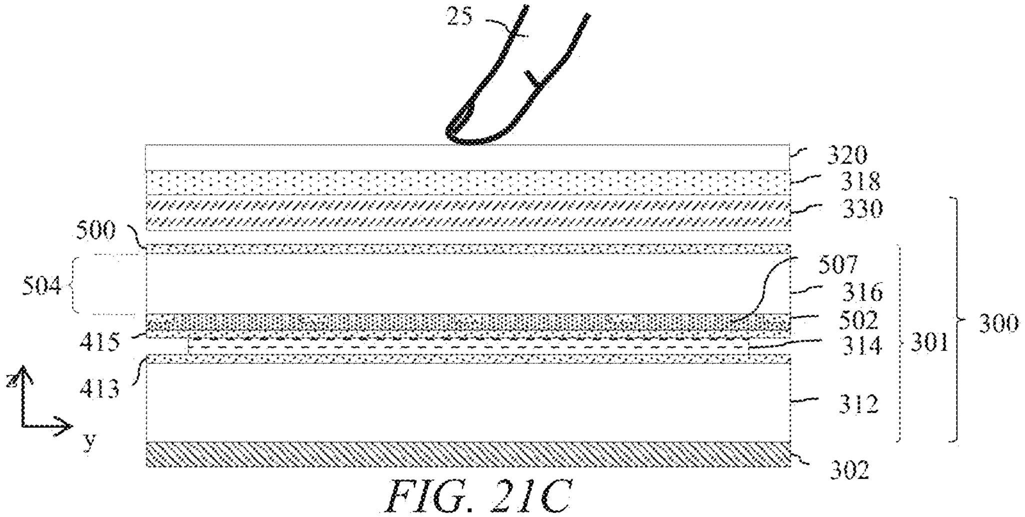
FIG. 21C is a diagram illustrating in a perspective side view a touch input display device wherein the dielectric layer between the touch electrode arrays is provided by the output transparent support substrate of the switchable liquid crystal retarder.

FIG. 21C is a schematic diagram illustrating in a perspective side view a touch input display device 100 that is similar to FIG. 21A, however the electrode array 500 is formed on the output side of the substrate 316. Advantageously the electrode structure formed near the liquid crystal layer is simpler than FIG. 21B. Features of the embodiments of FIGS. 21A-C not discussed in further detail may be assumed to correspond to the features with equivalent reference numerals as discussed above, including any potential variations in the features.

Figure 22:
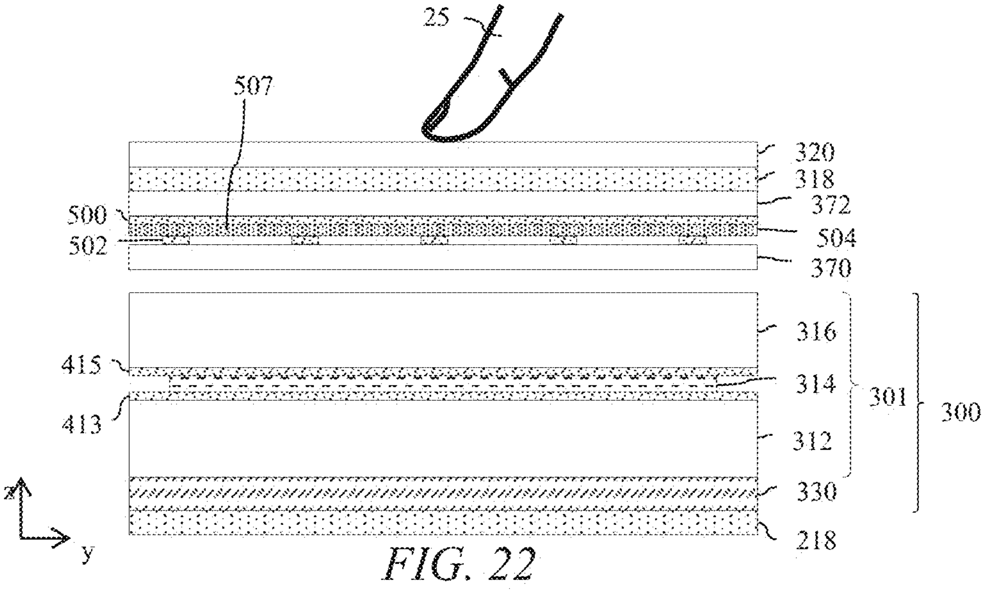
FIG. 22 is a diagram illustrating in a perspective side view a touch input switchable privacy display device wherein the touch electrode arrays are arranged between the liquid crystal polar control retarder and additional polariser.

FIG. 22 is a schematic diagram illustrating in a perspective side view a touch input switchable privacy display device 100 wherein the touch electrode arrays 500, 502 are arranged between the liquid crystal polar control retarder 301 and additional polariser 318. In comparison to embodiments above, the passive polar control retarder 330 is arranged between the liquid crystal retarder 301 and the display output polariser 218. Transparent substrates 370, 372 are provided that have electrode arrays 500, 502 formed on respective surfaces, with dielectric layer 504 formed therebetween. The transparent substrates 370, 372 may have low birefringence of may have optical axis aligned parallel or orthogonal to the polariser 318 for example. Electrical interference between the electrodes 500, 502, 413, 415 may be reduced using the waveforms of the present embodiments described above. Features of the embodiment of FIG. 22 not discussed in further detail may be assumed to correspond to the features with equivalent reference numerals as discussed above, including any potential variations in the features.

Advantageously passive control retarders 330 that do not have surface properties that are suitable for forming transparent electrodes 500, 502 may be provided. Further the electrode structure formed on the transparent substrate 316 has reduced complexity in comparison to the arrangement of FIGS. 21B-C.

The operation of polar control retarder layers between parallel polarisers for off-axis illumination will now be described further. In the various devices described above, at least one polar control retarder is arranged between the reflective polariser 318 and the additional polariser 218 in various different configurations. In each case, the at least one polar control retarder is configured so that it does not affect the luminance of light passing through the reflective polariser 318, the at least one polar control retarder, and the additional polariser 218 along an axis along a normal to the plane of the polar control retarder(s) but it does reduce the luminance of light passing through the reflective polariser 318, the at least one polar control retarder, and the additional polariser 218 along an axis inclined to a normal to the plane of the polar control retarder(s), at least in one of the switchable states of the compensated switchable polar control polar control retarder 300. There will now be given a description of this effect in more detail, the principles of which may be applied in general to all of the devices described above.

Figure 23A:
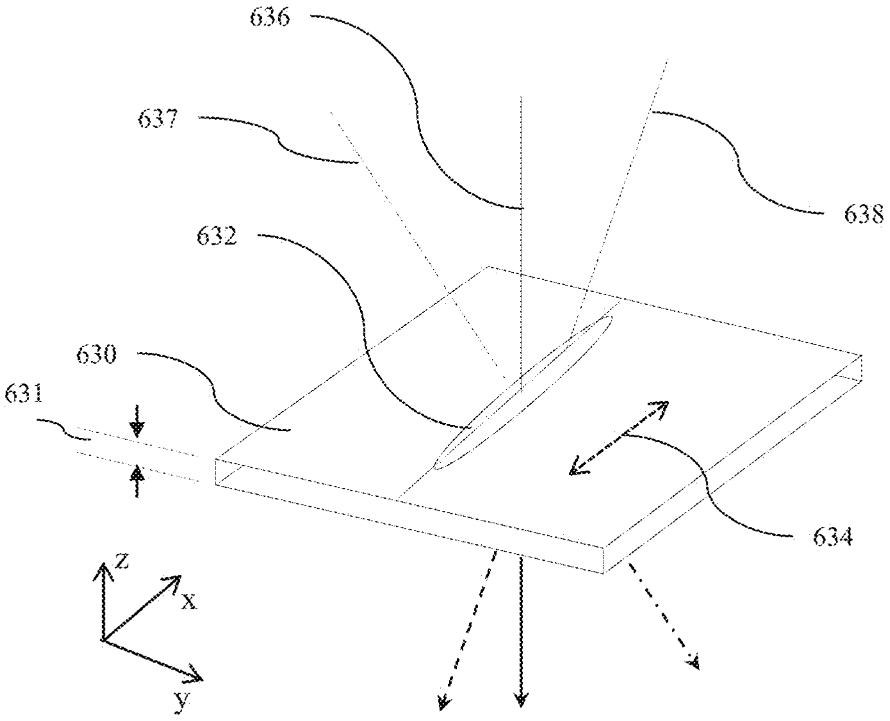
FIG. 23A is a diagram illustrating in perspective view illumination of a retarder layer by off-axis light.

FIG. 23A is a schematic diagram illustrating in perspective view illumination of a polar control retarder layer by off-axis light. Polar control retarder 630 may comprise birefringent material, represented by refractive index ellipsoid 632 with optical axis direction 634 at 0 degrees to the x-axis, and have a thickness 631. Features of the arrangements of FIGS. 23A-25E below that are not discussed in further detail may be assumed to correspond to the features with equivalent reference numerals as discussed above, including any potential variations in the features.

Normal light rays 636 propagate so that the path length in the material is the same as the thickness 631. Light rays 637 are in the y-z plane have an increased path length; however the birefringence of the material is substantially the same as the rays 636. By way of comparison light rays 638 that are in the x-z plane have an increased path length in the birefringent material and further the birefringence is different to the normal ray 636.

The retardance of the polar control retarder 630 is thus dependent on the angle of incidence of the respective ray, and also the plane of incidence, that is rays 638 in the x-z will have a retardance different from the normal rays 636 and the rays 637 in the y-z plane.

The interaction of polarized light with the polar control retarder 630 will now be described. To distinguish from the first and second polarization components during operation in a directional backlight 101, the following explanation will refer to third and fourth polarization components.

Figure 23B:
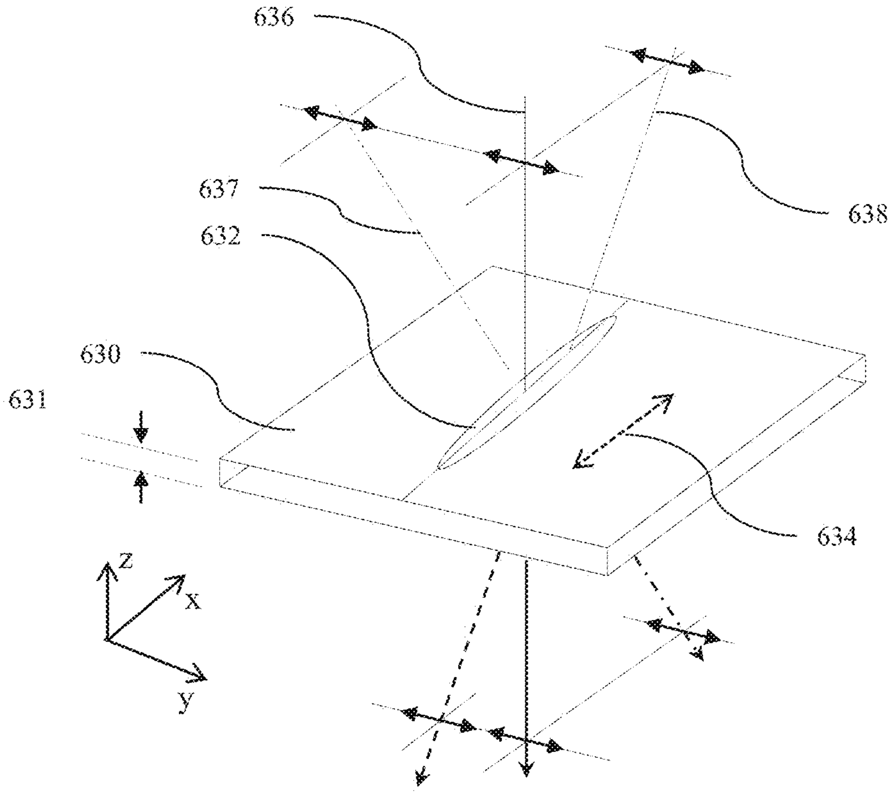
FIG. 23B is a diagram illustrating in perspective view illumination of a retarder layer by off-axis light of a first linear polarization state at 0 degrees.
Figure 23C:
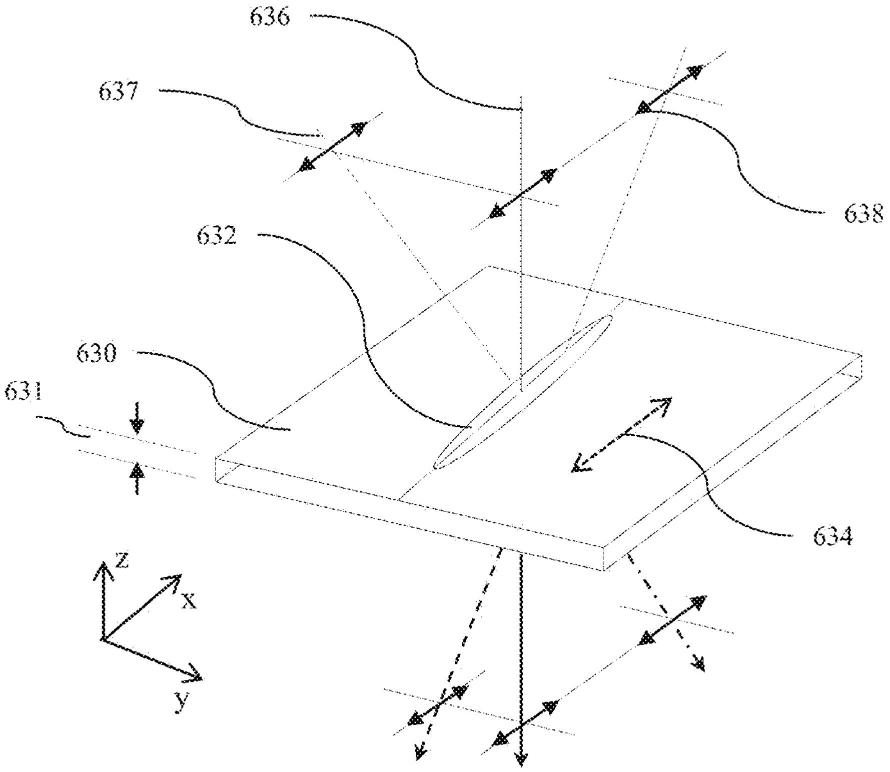
FIG. 23C is a diagram illustrating in perspective view illumination of a retarder layer by off-axis light of a first linear polarization state at 90 degrees.

FIG. 23B is a schematic diagram illustrating in perspective view illumination of a polar control retarder layer by off-axis light of a third linear polarization state at 90 degrees to the x-axis and FIG. 23C is a schematic diagram illustrating in perspective view illumination of a polar control retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638. Thus, the polar control retarder 630 introduces no phase shift to polarisation components of light passed by the polariser on the input side of the polar control retarder 630 along an axis along a normal to the plane of the polar control retarder 630. Accordingly, the polar control retarder 630 does not affect the luminance of light passing through the polar control retarder 630 and polarisers (not shown) on each side of the polar control retarder 630. Although FIGS. 29A-C relate specifically to the polar control retarder 630 that is passive, a similar effect is achieved by the polar control retarders in the devices described above.

Figure 23D:
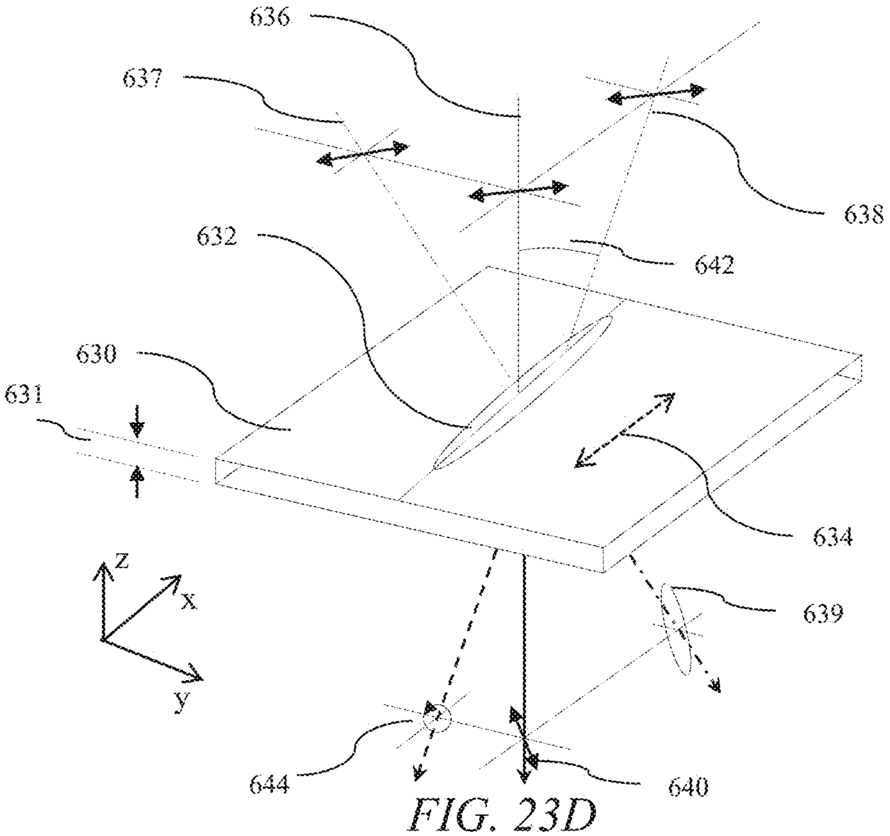
FIG. 23D is a diagram illustrating in perspective view illumination of a retarder layer by off-axis light of a first linear polarization state at 45 degrees.

FIG. 23D is a schematic diagram illustrating in perspective view illumination of a polar control retarder 630 layer by off-axis light of a linear polarization state at 45 degrees. The linear polarization state may be resolved into third and fourth polarization components that are respectively orthogonal and parallel to optical axis 634 direction. The polar control retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642. Thus, the polar control retarder 630 introduces a phase shift to polarisation components of light passed by the polariser on the input side of the polar control retarder 630 along an axis corresponding to ray 638 that is inclined to a normal to the plane of the polar control retarder 630. Although FIG. 29D relates to the polar control retarder 630 that is passive, a similar effect is achieved by the polar control retarders described above, in a switchable state of the switchable liquid crystal polar control retarder corresponding to the privacy mode.

To illustrate the off-axis behaviour of polar control retarder stacks, the angular luminance control of C-plates 330A. 330B between an additional polariser 318 and output display polariser 218 will now be described for various off-axis illumination arrangements with reference to the operation of a C-plate between the parallel polarisers 218, 210 will now be described.

Figure 24A:
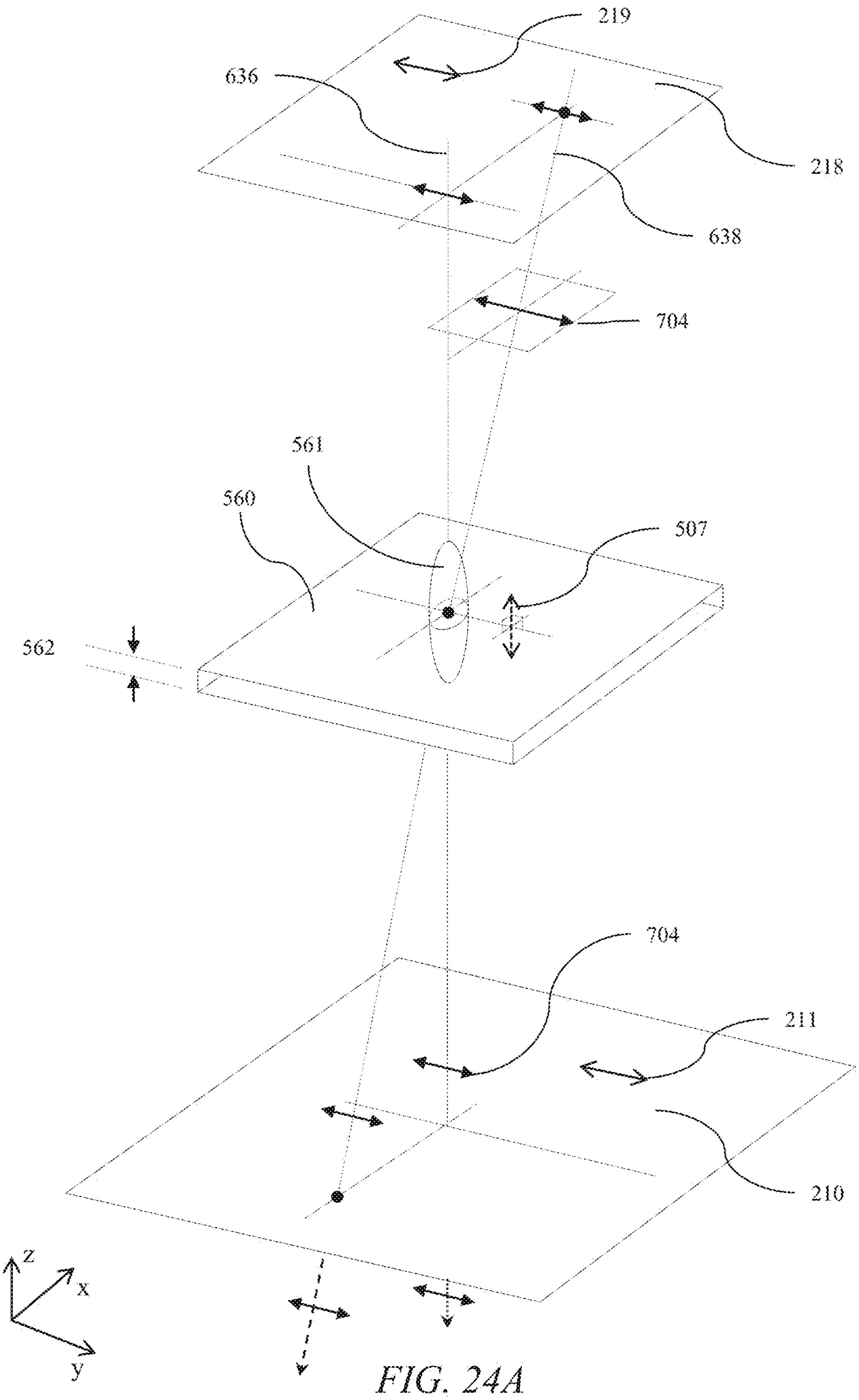
FIG. 24A is a diagram illustrating in perspective view illumination of a C-plate retarder by off-axis polarised light with a positive elevation.

FIG. 24A is a schematic diagram illustrating in perspective view illumination of a C-plate layer by off-axis polarised light with a positive elevation. Incident linear polarisation component 704 is incident onto the birefringent material 632 of the polar control retarder 560 that is a C-plate with optical axis direction 507 that is perpendicular to the plane of the polar control retarder 560. Polarisation component 704 sees no net phase difference on transmission through the liquid crystal molecule and so the output polarisation component is the same as component 704. Thus a maximum transmission is seen through the polariser 210. Thus the polar control retarder 560 having an optical axis 561 perpendicular to the plane of the polar control retarder 560, that is the x-y plane. The polar control retarder 560 having an optical axis perpendicular to the plane of the polar control retarder comprises a C-plate.

Figure 24B:
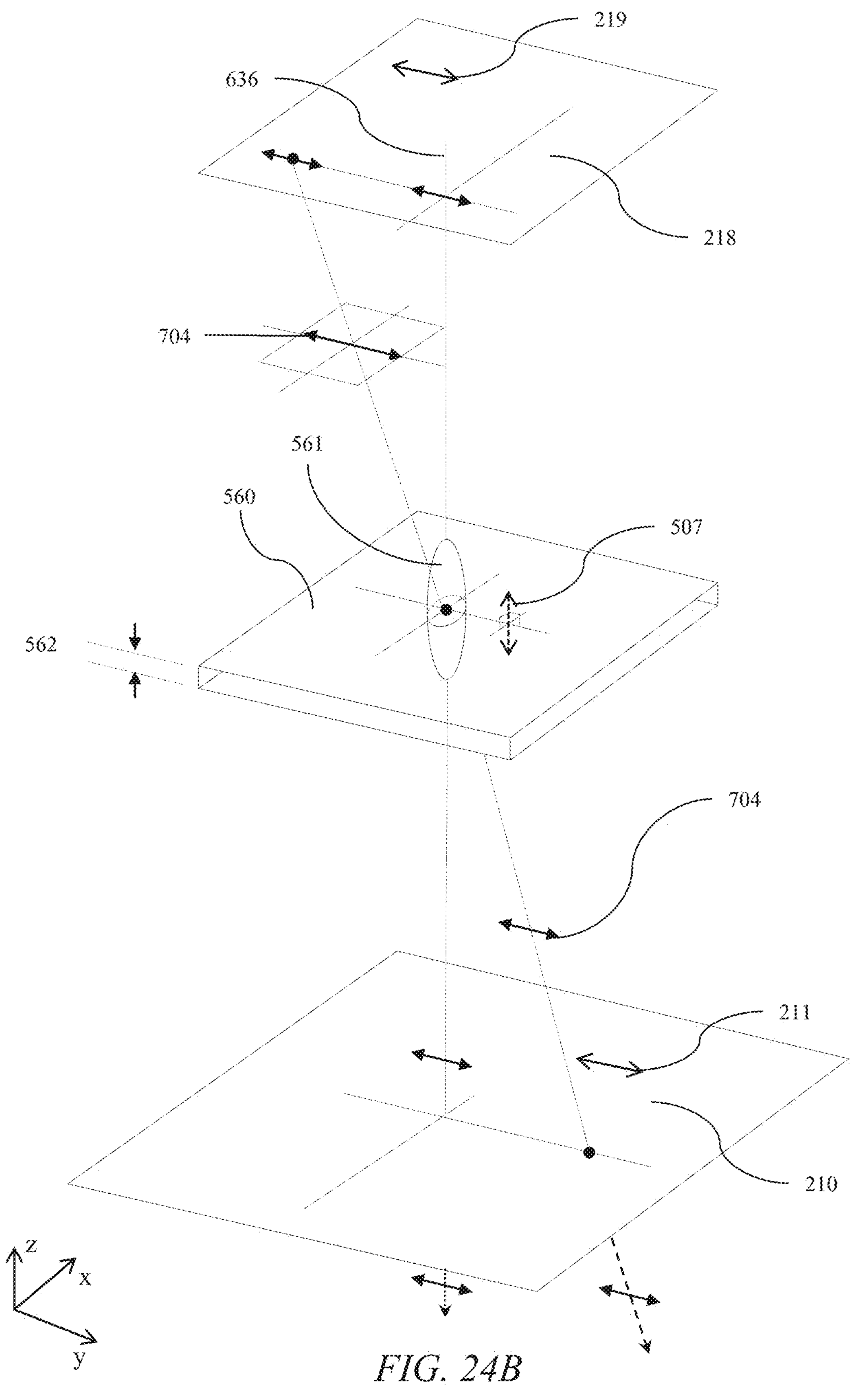
FIG. 24B is a diagram illustrating in perspective view illumination of a C-plate retarder by off-axis polarised light with a negative lateral angle.

FIG. 24B is a schematic diagram illustrating in perspective view illumination of a C-plate layer by off-axis polarised light with a negative lateral angle. As with the arrangement of FIG. 24A, polarisation state 704 sees no net phase difference and is transmitted with maximum luminance. Thus, the polar control retarder 560 introduces no phase shift to polarisation components of light passed by the polariser on the input side of the polar control retarder 560 along an axis along a normal to the plane of the polar control retarder 560. Accordingly, the polar control retarder 560 does not affect the luminance of light passing through the polar control retarder 560 and polarisers (not shown) on each side of the polar control retarder 560. Although FIGS. 29A-C relate specifically to the polar control retarder 560 that is passive, a similar effect is achieved by the polar control retarders in the devices described above.

Figure 24C:
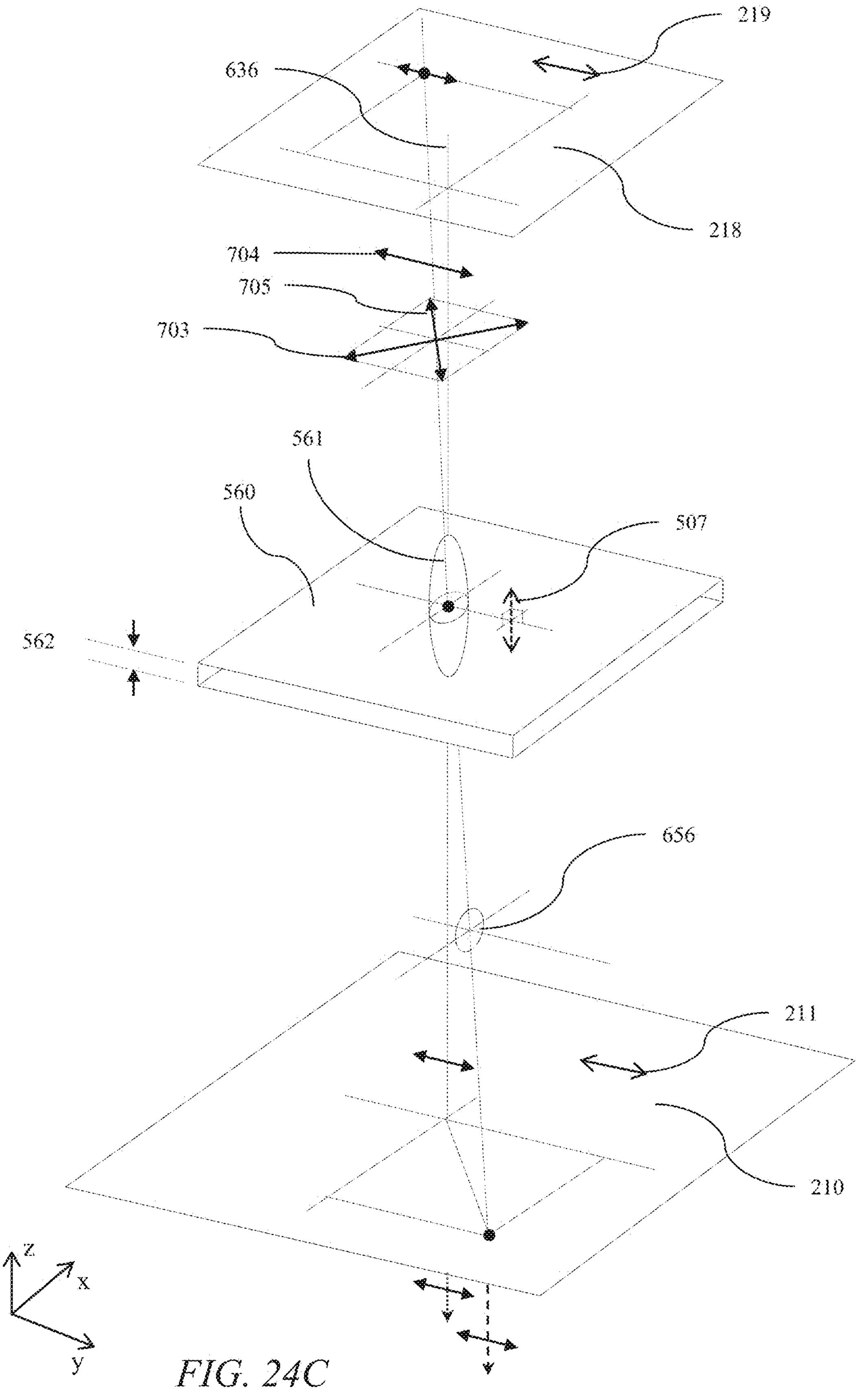
FIG. 24C is a diagram illustrating in perspective view illumination of a C-plate retarder by off-axis polarised light with a positive elevation and negative lateral angle.

FIG. 24C is a schematic diagram illustrating in perspective view illumination of a C-plate layer by off-axis polarised light with a positive elevation and negative lateral angle. In comparison to the arrangement of FIGS. 24A-B, the polarisation state 704 resolves onto eigenstates 703, 705 with respect to the birefringent material 632 providing a net phase difference on transmission through the polar control retarder 560. The resultant elliptical polarisation component 656 is transmitted through polariser 210 with reduced luminance in comparison to the rays illustrated in FIGS. 24A-B.

Figure 24D:
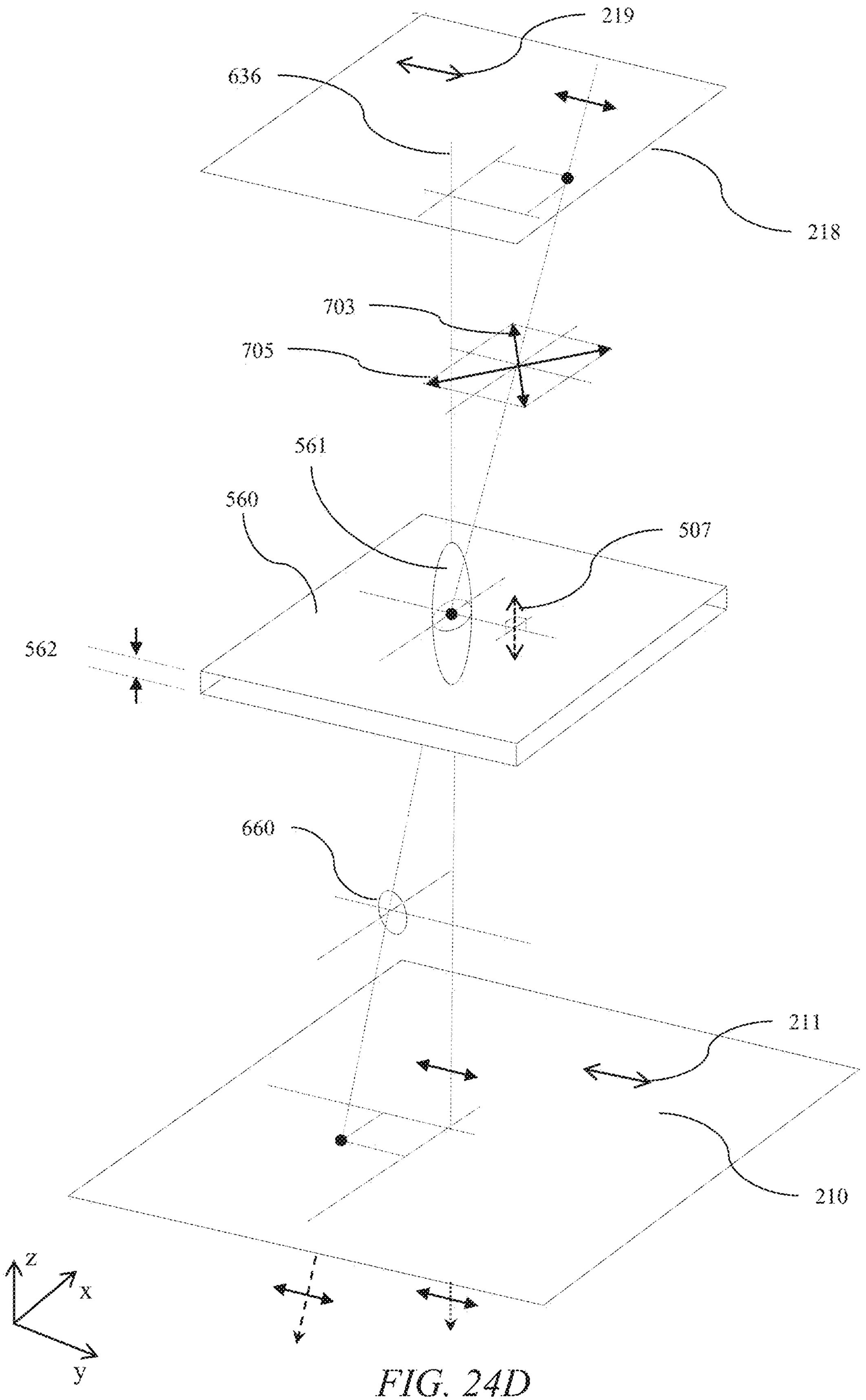
FIG. 24D is a diagram illustrating in perspective view illumination of a C-plate retarder by off-axis polarised light with a positive elevation and positive lateral angle.

FIG. 24D is a schematic diagram illustrating in perspective view illumination of a C-plate layer by off-axis polarised light with a positive elevation and positive lateral angle. In a similar manner to FIG. 24C, the polarisation component 704 is resolved into eigenstates 703, 705 that undergo a net phase difference, and elliptical polarisation component 660 is provided, which after transmission through the polariser reduces the luminance of the respective off-axis ray. Thus, the polar control retarder 560 introduces a phase shift to polarisation components of light passed by the polariser on the input side of the polar control retarder 560 along an axis that is inclined to a normal to the plane of the polar control retarder 560. Although FIG. 29D relates to the polar control retarder 560 that is passive, a similar effect is achieved by the polar control retarders described above, in a switchable state of the switchable liquid crystal polar control retarder corresponding to the privacy mode.

Figure 24E:
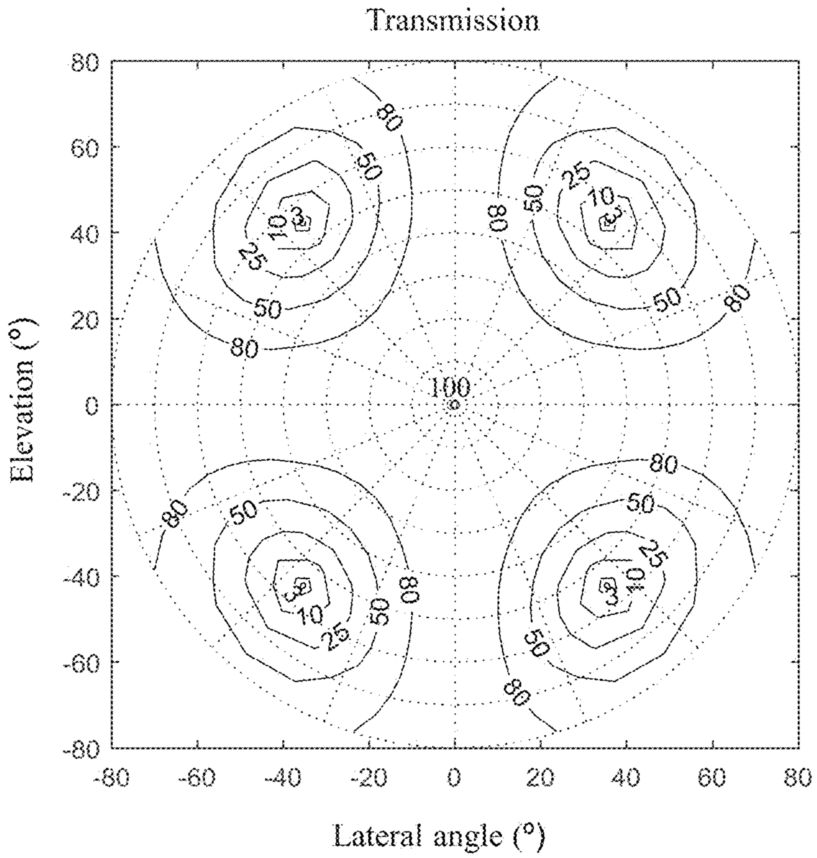
FIG. 24E is a graph illustrating the variation of output transmission with polar direction for transmitted light rays in FIGS. 24A-D.

FIG. 24E is a schematic graph illustrating the variation of output transmission with polar direction for transmitted light rays in FIGS. 24A-D. Thus, the C-plate may provide luminance reduction in polar quadrants. In combination with switchable liquid crystal layer 314 described elsewhere herein, (i) removal of luminance reduction of the C-plate may be provided in a first wide angle state of operation (ii) extended polar region for luminance reduction may be achieved in a second privacy state of operation.

To illustrate the off-axis behaviour of polar control retarder stacks, the angular luminance control of crossed A-plate passive polar control retarders 330A, 330B between an additional polariser 318 and output display polariser 218 will now be described for various off-axis illumination arrangements.

Figure 25A:
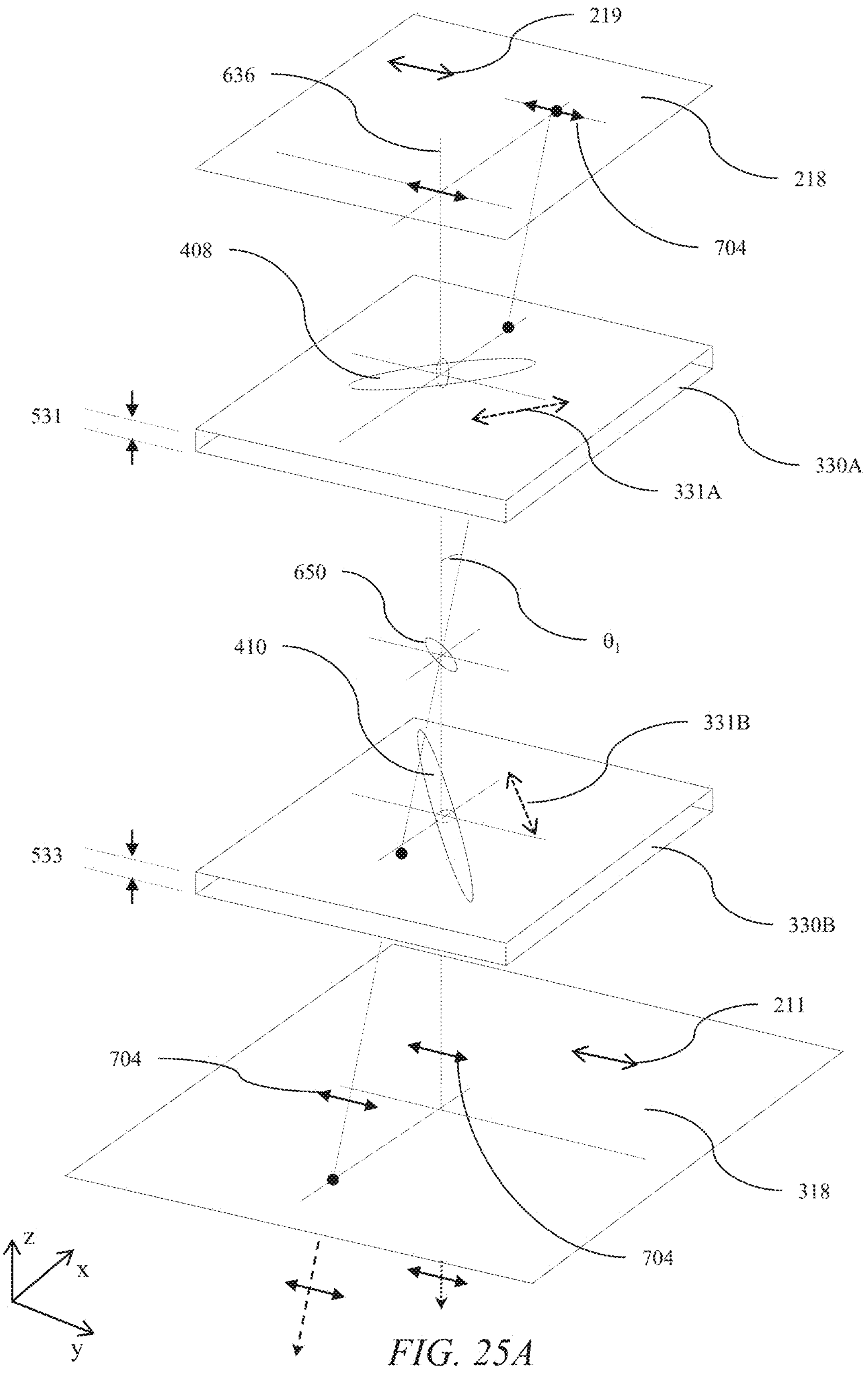
FIG. 25A is a diagram illustrating in perspective view illumination of crossed A-plate retarder layers by off-axis polarised light with a positive elevation.

FIG. 25A is a schematic diagram illustrating in perspective view illumination of crossed A-plate retarder layers by off-axis polarised light with a positive elevation. Linear polariser 218 with electric vector transmission direction 219 is used to provide a linear polarisation state 704 that is parallel to the lateral direction onto first A-plate 330A of the crossed A-plate passive polar control retarders 330A, 330B. The optical axis direction 331A is inclined at +45 degrees to the lateral direction. The retardance of the polar control retarder 330A for the off-axis angle $\theta_1$ in the positive elevation direction provides a resultant polarisation component 650 that is generally elliptical on output. Polarisation component 650 is incident onto the second A-plate 330B of the crossed A-plate passive polar control retarders 330A, 330B that has an optical axis direction 331B that is orthogonal to the optical axis direction 331A of the first A-plate 330A. In the plane of incidence of FIG. 25A, the retardance of the second A-plate 330B for the off-axis angle $\theta_1$ is equal and opposite to the retardance of the first A-plate 330A. Thus a net zero retardation is provided for the incident polarisation component 704 and the output polarisation component is the same as the input polarisation component 704.

The output polarisation component is aligned to the electric vector transmission direction of the additional polariser 318, and thus is transmitted efficiently. Advantageously substantially no losses are provided for light rays that have zero lateral angle angular component so that full transmission efficiency is achieved.

Figure 25B:
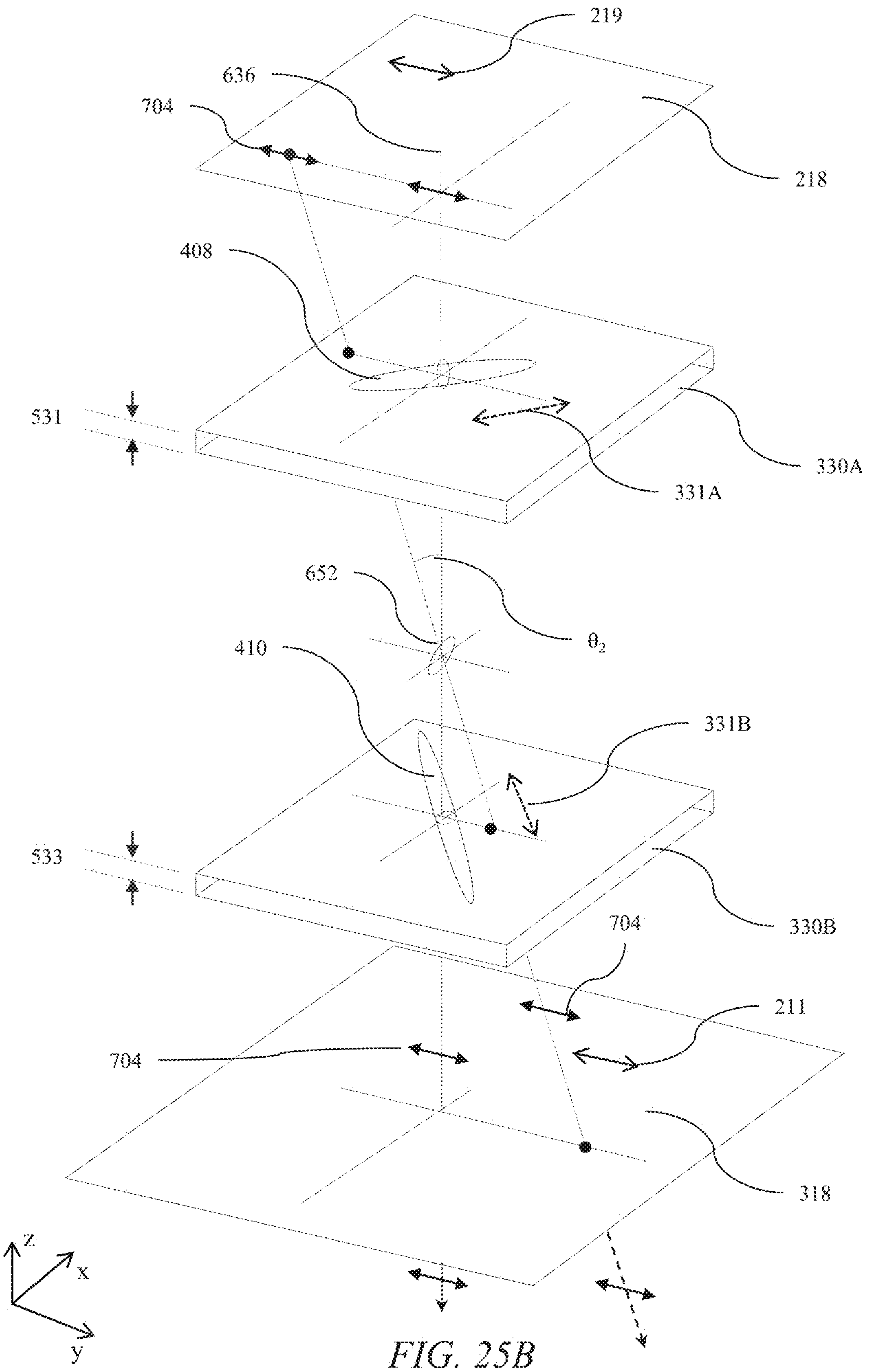
FIG. 25B is a diagram illustrating in perspective view illumination of crossed A-plate retarder layers by off-axis polarised light with a negative lateral angle.

FIG. 25B is a schematic diagram illustrating in perspective view illumination of crossed A-plate retarder layers by off-axis polarised light with a negative lateral angle. Thus input polarisation component is converted by the first A-plate 330A to an intermediate polarisation component 652 that is generally an elliptical polarisation state. The second A-plate 330B again provides an equal and opposite retardation to the first A-plate so that the output polarisation component is the same as the input polarisation component 704 and light is efficiently transmitted through the polariser 318.

Thus the polar control retarder comprises a pair of retarders 330A, 330B which have optical axes in the plane of the retarders 330A, 330B that are crossed, that is the x-y plane in the present embodiments. The pair of retarders 330A, 330B have optical axes 331A, 331B that each extend at 45° with respect to an electric vector transmission direction that is parallel to the electric vector transmission of the polariser 318.

Advantageously substantially no losses are provided for light rays that have zero elevation angular component so that full transmission efficiency is achieved.

Figure 25C:
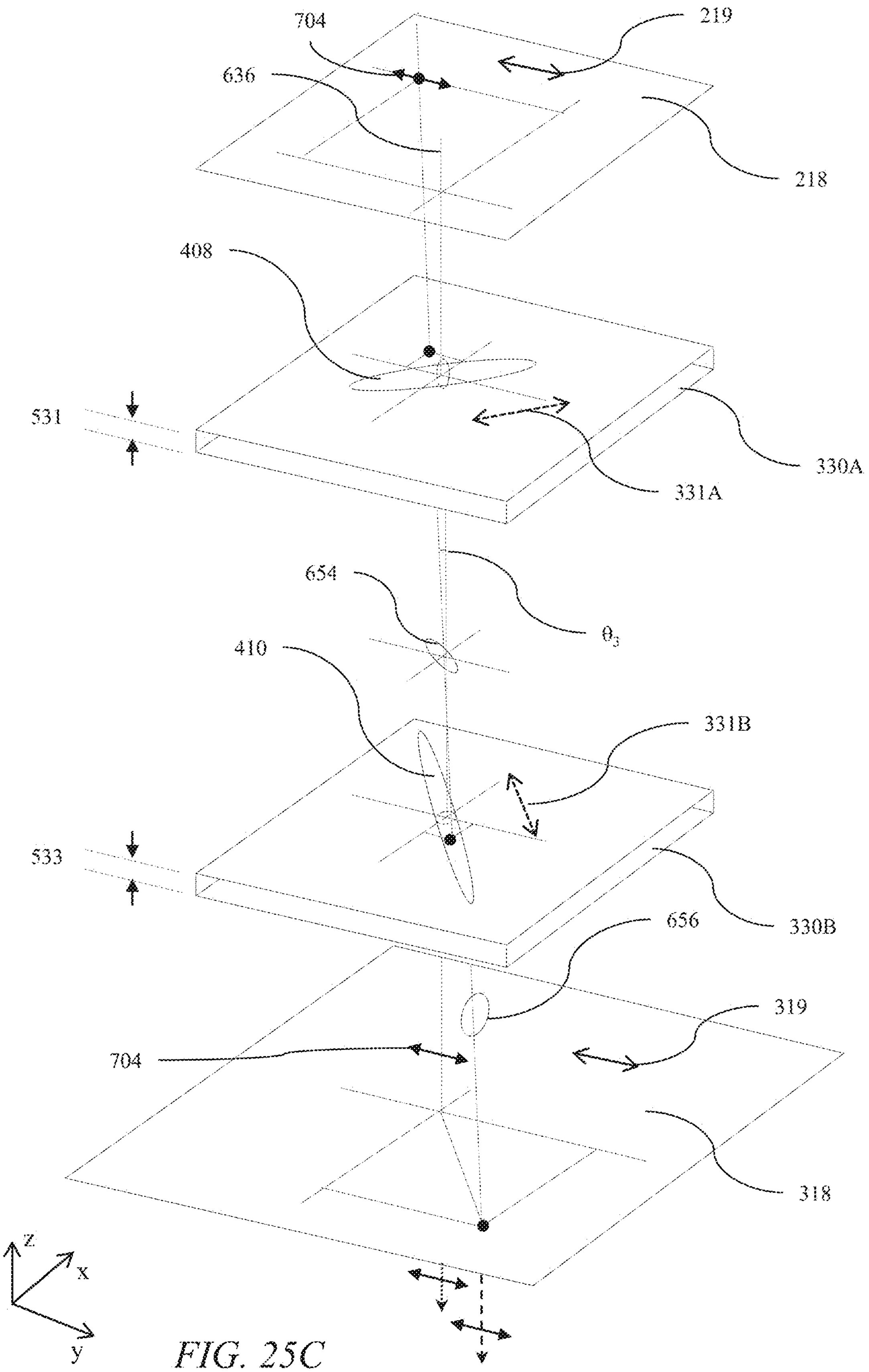
FIG. 25C is a diagram illustrating in perspective view illumination of crossed A-plate retarder layers by off-axis polarised light with a positive elevation and negative lateral angle.

FIG. 25C is a schematic diagram illustrating in perspective view illumination of crossed A-plate retarder layers by off-axis polarised light with a positive elevation and negative lateral angle. Polarisation component 704 is converted to an elliptical polarisation component 654 by first A-plate 330A. A resultant elliptical component 656 is output from the second A-plate 330B. Elliptical component 656 is analysed by input polariser 318 with reduced luminance in comparison to the input luminance of the first polarisation component 704.

Figure 25D:
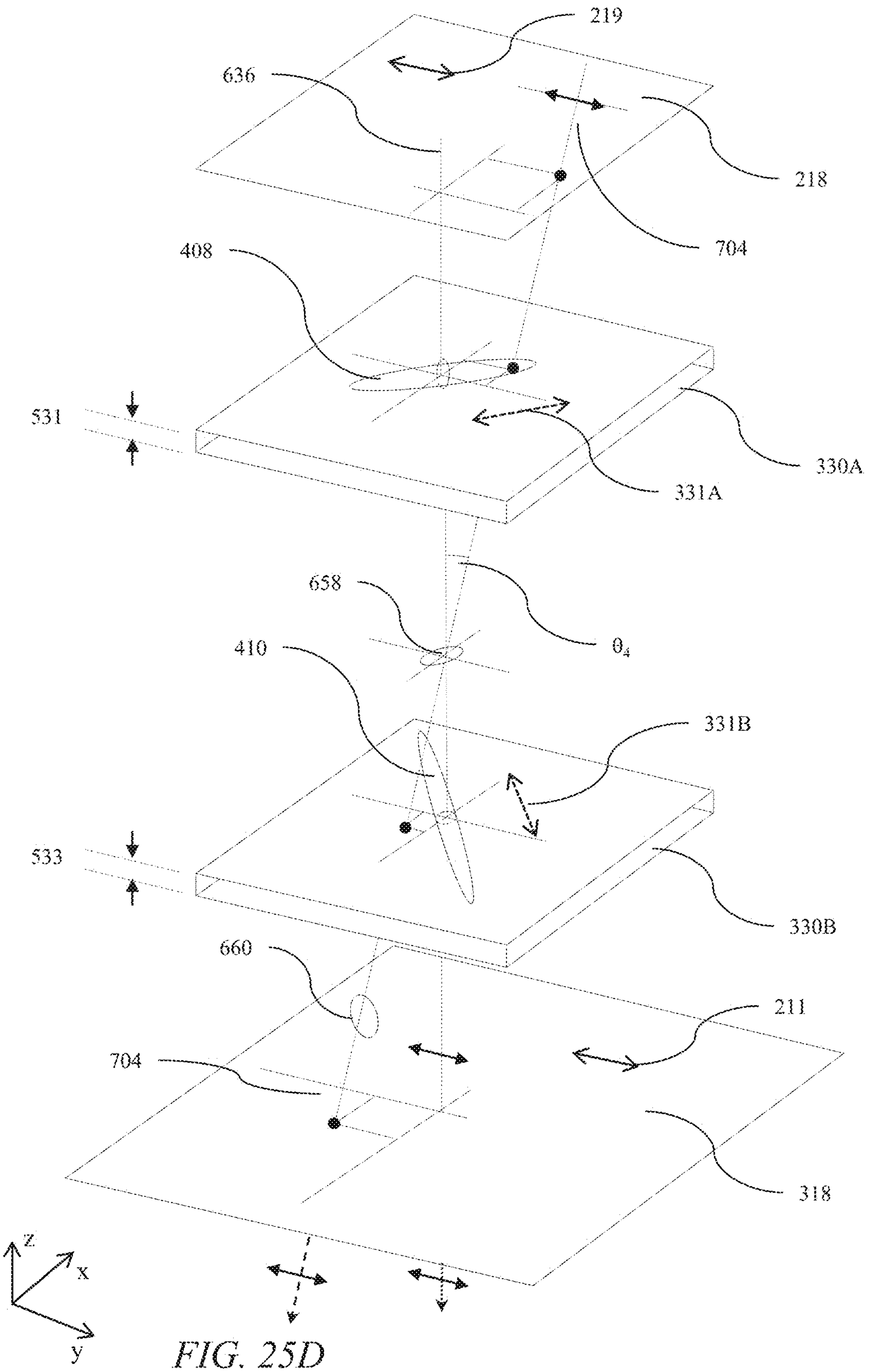
FIG. 25D is a diagram illustrating in perspective view illumination of crossed A-plate retarder layers by off-axis polarised light with a positive elevation and positive lateral angle.

FIG. 25D is a schematic diagram illustrating in perspective view illumination of crossed A-plate retarder layers by off-axis polarised light with a positive elevation and positive lateral angle. Polarisation components 658 and 660 are provided by first and second A-plate passive polar control retarders 330A, 330B as net retardance of first and second retarders does not provide compensation.

Thus luminance is reduced for light rays that have non-zero lateral angle and non-zero elevation components. Advantageously display privacy can be increased for snoopers that are arranged in viewing quadrants while luminous efficiency for primary display users is not substantially reduced.

Figure 25E:
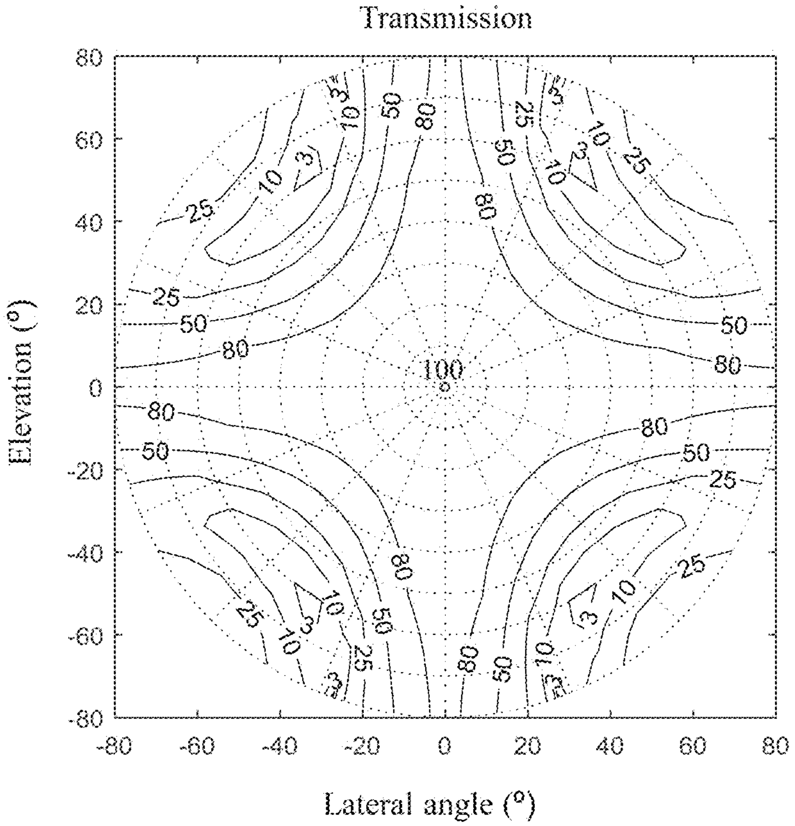
FIG. 25E is a graph illustrating the variation of output transmission with polar direction for transmitted light rays in FIGS. 25A-D.

FIG. 25E is a schematic graph illustrating the variation of output transmission with polar direction for transmitted light rays in FIGS. 25A-D. In comparison to the arrangement of FIG. 24E, the area of luminance reduction is increased for off-axis viewing. However, the switchable liquid crystal layer 314 may provide reduced uniformity in comparison to the C-plate arrangements for off-axis viewing in the first public mode state of operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A touch input display device comprising:

a spatial light modulator (SLM) arranged to output light;

a display polariser arranged on an output side of the SLM, wherein the display polariser is a linear polariser;

an additional polariser arranged on an output side of the display polariser, wherein the additional polariser is a linear polariser;

a switchable liquid crystal retarder comprising a layer of liquid crystal material arranged between the display polariser and the additional polariser;

switchable retarder control electrodes arranged to apply a voltage for controlling a state of the switchable liquid crystal retarder;

at least one touch electrode array arranged in a layer on an output side of the switchable retarder control electrodes; and an output transparent support substrate, wherein the at least one touch electrode array is arranged between the switchable retarder control electrodes and the output transparent support substrate.

2. The touch input display device of claim 1, wherein the at least one touch electrode array is arranged between the switchable retarder control electrodes and the additional polariser.

3. The touch input display device of claim 2, further comprising a passive retarder arranged between the switchable liquid crystal retarder and the additional polariser.

4. The touch input display device of claim 3, wherein the at least one touch electrode array is formed on a surface of the passive retarder.

5. The touch input display device of claim 3, wherein the at least one touch electrode array comprises a pair of touch electrode arrays arranged in layers separated by at least one dielectric layer.

6. The touch input display device of claim 5, wherein the display device comprises one passive retarder and the at least one dielectric layer comprises the one passive retarder.

7. The touch input display device of claim 6, wherein each of the pair of touch electrode arrays are formed on a respective surface of the one passive retarder.

8. The touch input display device of claim 5, wherein the display device comprises more than one passive retarder, and the at least one dielectric layer comprises one of the passive retarders or at least two of the passive retarders.

9. The touch input display device of claim 8, wherein each of the pair of touch electrode arrays are formed on a respective surface of one of the passive retarders.

10. The touch input display device of claim 5, wherein the at least one dielectric layer comprises at least one additional layer that is not a retarder.

11. The touch input display device of claim 10, wherein the pair of touch electrode arrays and the at least one dielectric layer are arranged between the switchable retarder control electrodes and the at least one passive retarder.

12. The touch input display device of claim 10, wherein one of the touch electrode arrays is formed on a surface of the passive retarder in the case that the display device comprises one passive retarder or on a surface of one of the passive retarders in the case that the display device comprises more than one passive retarder.

13. The touch input display device of claim 1, wherein the at least one touch electrode array comprises a pair of touch electrode arrays arranged in layers separated by at least one dielectric layer.

14. The touch input display device of claim 1, wherein the at least one passive retarder comprises a passive uniaxial retarder having an optical axis perpendicular to the plane of the passive uniaxial retarder.

15. The touch input display device of claim 1, further comprising an input transparent support substrate, wherein the layer of liquid crystal material is arranged between the input transparent support substrate and the output transparent support substrate.

16. The touch input display device of claim 1, wherein the switchable retarder control electrodes are arranged on both sides of the layer of liquid crystal material.

17. The touch input display device of claim 1, further comprising a reflective polariser arranged between the display polariser and the switchable liquid crystal retarder.

18. The touch input display device of claim 1, further comprising a control system, wherein the control system is arranged to apply a drive voltage to the switchable retarder control electrodes for controlling the switchable liquid crystal retarder, and the control system is arranged to address the at least one touch electrode array for capacitive touch sensing.

19. The touch input display device of claim 1, wherein the spatial light modulator comprises a liquid crystal display having a liquid crystal layer disposed between first and second substrates.

20. A method of controlling a touch input display device comprising:

a spatial light modulator (SLM) arranged to output light;

a display polariser arranged on an output side of the SLM, wherein the display polariser is a linear polariser;

an additional polariser arranged on an output side of the display polariser, wherein the additional polariser is a linear polariser;

a switchable liquid crystal retarder comprising a layer of liquid crystal material arranged between the display polariser and the additional polariser;

switchable retarder control electrodes arranged to apply a voltage for controlling the switchable liquid crystal retarder;

at least one touch electrode array arranged in a layer on an output side of the switchable retarder control electrodes; and an output transparent support substrate, wherein the at least one touch electrode array is arranged between the switchable retarder control electrodes and the output transparent support substrate;

wherein the method comprises:

applying a drive voltage to the switchable retarder control electrodes for controlling the switchable liquid crystal retarder, wherein the drive voltage has a waveform including periods where the drive voltage is constant; and addressing the at least one touch electrode array for capacitive touch sensing during at least one of the periods where the drive voltage is constant.

* * * * *